United States Patent
Hasegawa et al.

(10) Patent No.: US 10,656,467 B2
(45) Date of Patent: May 19, 2020

(54) LIQUID CRYSTAL MODULE

(71) Applicant: SHARP KABUSHIKI KAISHA, Sakai, Osaka (JP)

(72) Inventors: Masahiro Hasegawa, Sakai (JP); Koji Murata, Sakai (JP); Yuichi Kawahira, Sakai (JP); Takako Koide, Sakai (JP); Akira Sakai, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 47 days.

(21) Appl. No.: 16/147,386

(22) Filed: Sep. 28, 2018

(65) Prior Publication Data

US 2019/0094593 A1 Mar. 28, 2019

(30) Foreign Application Priority Data

Sep. 28, 2017 (JP) .................. 2017-188805

(51) Int. Cl.
*G02F 1/13363* (2006.01)
*G02F 1/1335* (2006.01)
(Continued)

(52) U.S. Cl.
CPC ....... *G02F 1/13363* (2013.01); *G02B 6/0053* (2013.01); *G02F 1/133502* (2013.01);
(Continued)

(58) Field of Classification Search
CPC ........... G02F 1/13363; G02F 1/133528; G02F 1/133634; G02F 1/133502; G02F 2001/133531; G02F 2001/133565; G02F 2001/133638; G02F 2001/133562; G02F 2001/133541; G02F 2413/11; G02F 2413/02; G02F 2413/03; G02F 2413/13;
(Continued)

(56) References Cited

U.S. PATENT DOCUMENTS

2010/0271567 A1  10/2010 Usukura et al.
2019/0346607 A1* 11/2019 Murata .................. G02B 5/30

FOREIGN PATENT DOCUMENTS

JP  H08-068997 A   3/1996
JP  2008-032841 A  2/2008
WO  2009/084177 A1 7/2009

* cited by examiner

*Primary Examiner* — Charles S Chang
(74) *Attorney, Agent, or Firm* — ScienBiziP, P.C.

(57) ABSTRACT

Provided is a liquid crystal module being excellent in durability and manufacturing cost and exhibiting reduced variations in peak luminance that are caused depending on an azimuth angle during black display when the polar angle is large. The liquid crystal module includes: a liquid crystal panel including a first polarizer, a first substrate, a liquid crystal layer, an in-cell retardation layer ($\lambda/4$ plate of nx>ny=nz), a second substrate, an out-cell retardation layer ($\lambda/4$ plate of nx>ny≥nz), and a second polarizer, from a back side toward an observation side; and a backlight. The backlight includes a first prism sheet including a first ridge line, and a second prism sheet provided on a back side from the first prism sheet and including a second ridge line orthogonal to the first ridge line. The first ridge line is parallel to an azimuth at which the liquid crystal panel has a maximized transmittance in an oblique direction during black display.

5 Claims, 26 Drawing Sheets

(51) Int. Cl.
*F21V 8/00* (2006.01)
*G02F 1/1343* (2006.01)
*G02F 1/13357* (2006.01)

(52) U.S. Cl.
CPC .. *G02F 1/133528* (2013.01); *G02F 1/133634* (2013.01); *G02F 1/134363* (2013.01); *G02F 2001/133531* (2013.01); *G02F 2001/133541* (2013.01); *G02F 2001/133562* (2013.01); *G02F 2001/133565* (2013.01); *G02F 2001/133607* (2013.01); *G02F 2001/133638* (2013.01); *G02F 2203/01* (2013.01); *G02F 2413/02* (2013.01); *G02F 2413/03* (2013.01); *G02F 2413/08* (2013.01); *G02F 2413/11* (2013.01); *G02F 2413/13* (2013.01)

(58) Field of Classification Search
CPC ........... G02F 2413/08; G02F 1/134363; G02F 3302/01; G02F 2001/133607; G02B 6/0053
USPC ................................. 349/117–121
See application file for complete search history.

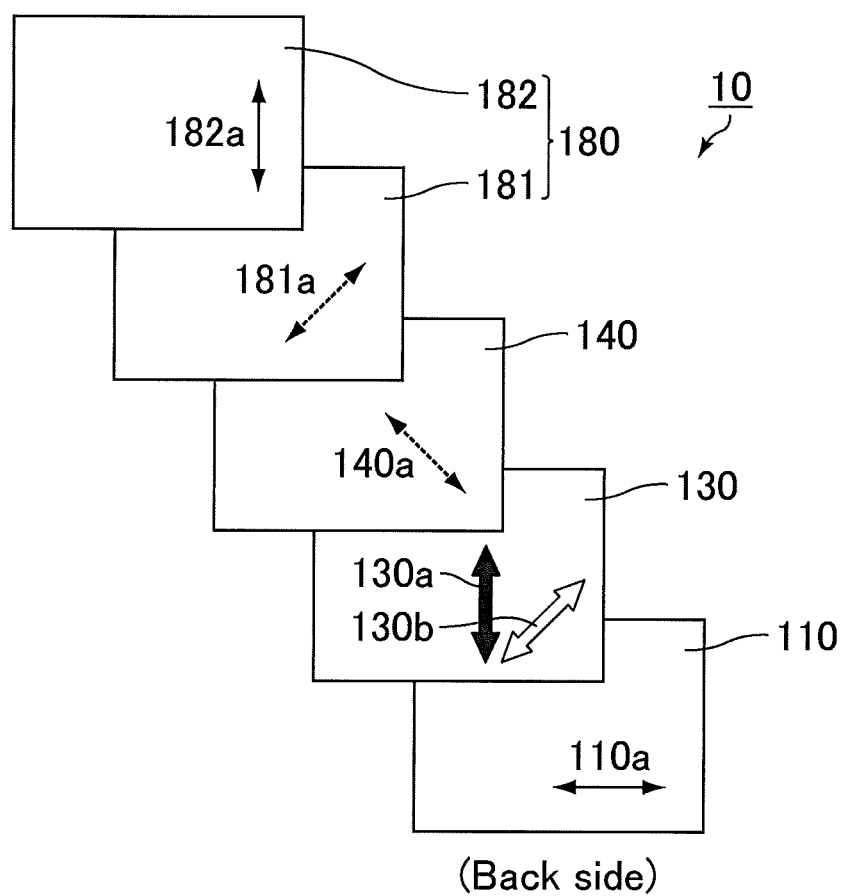

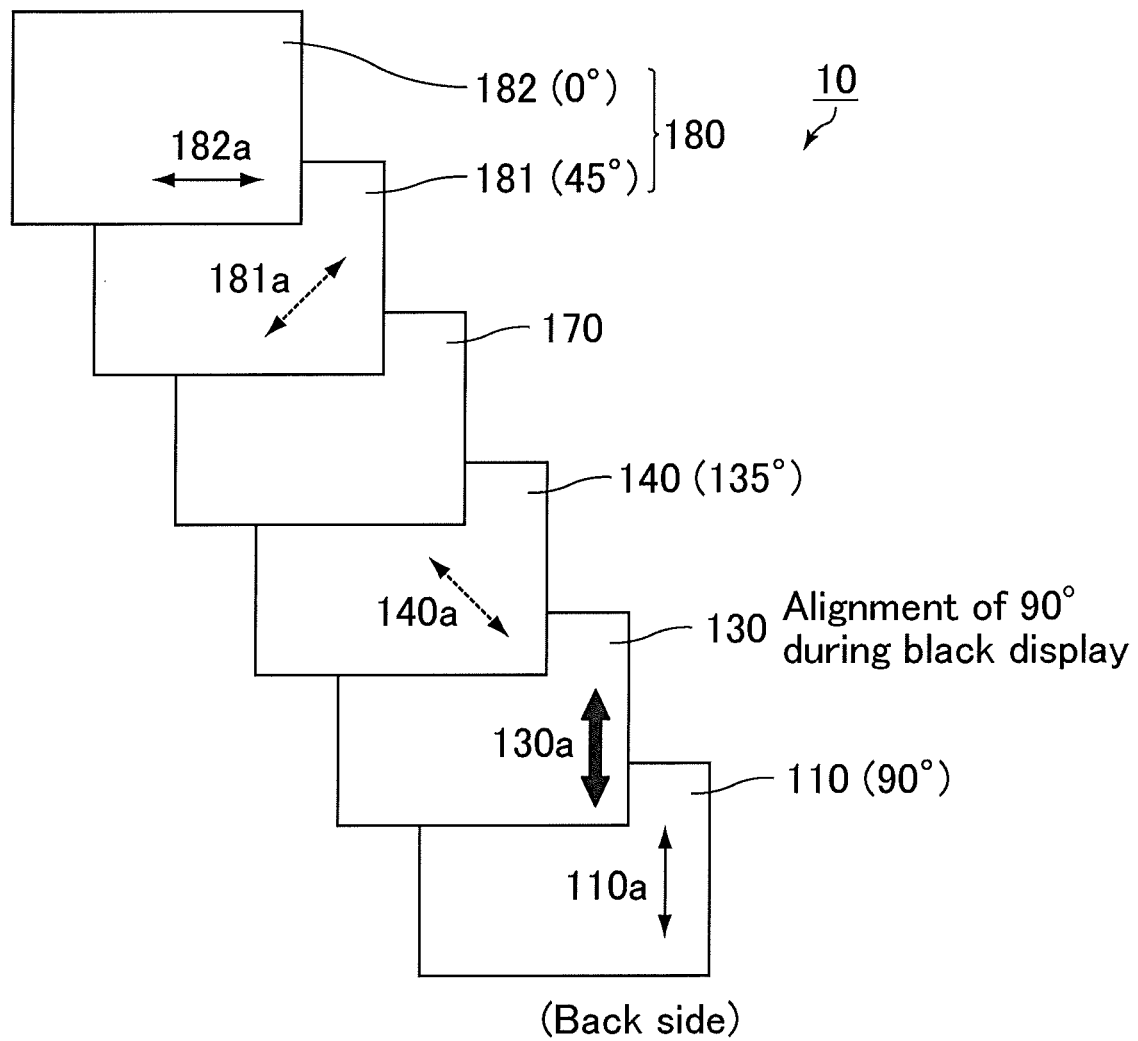

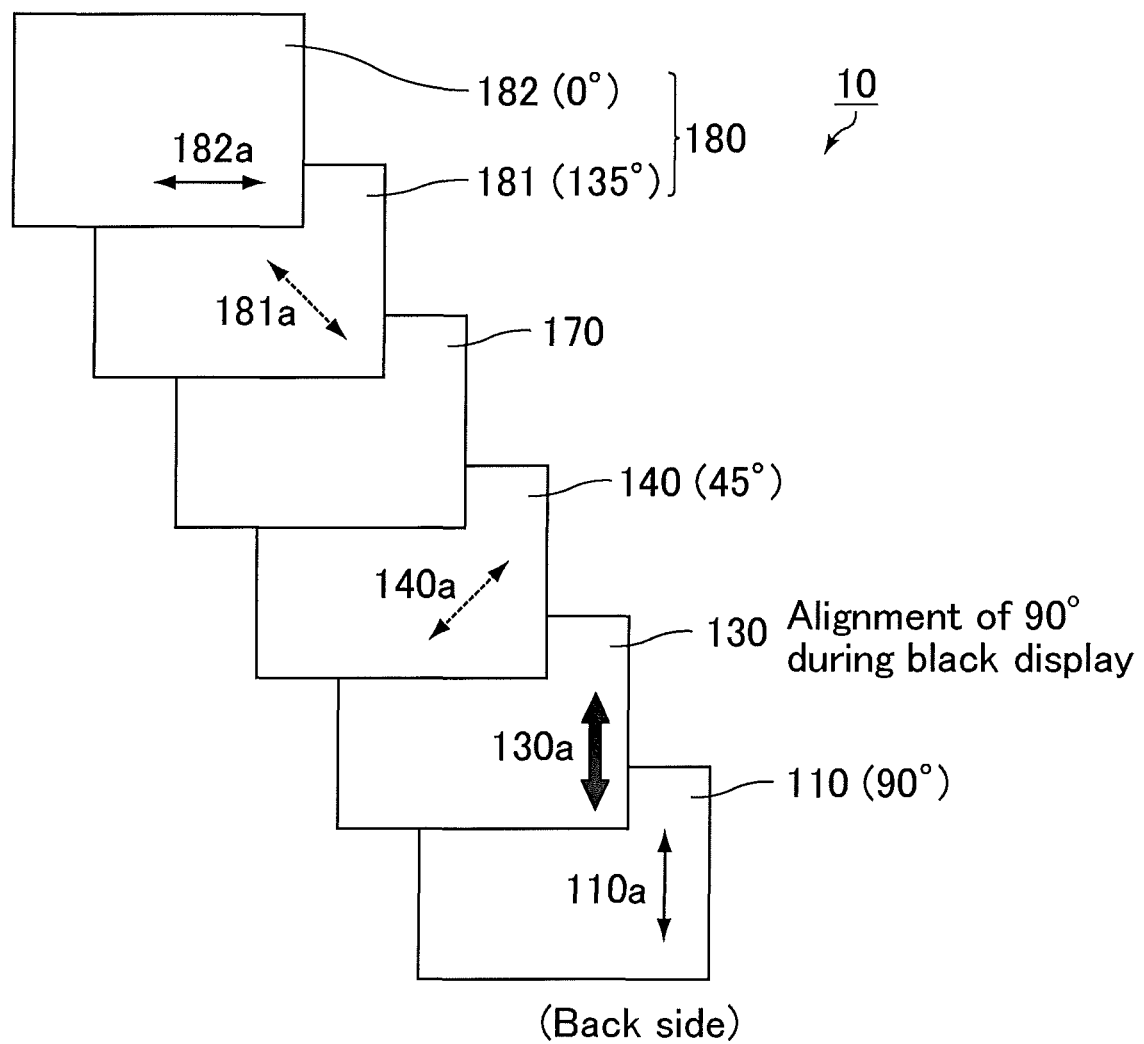

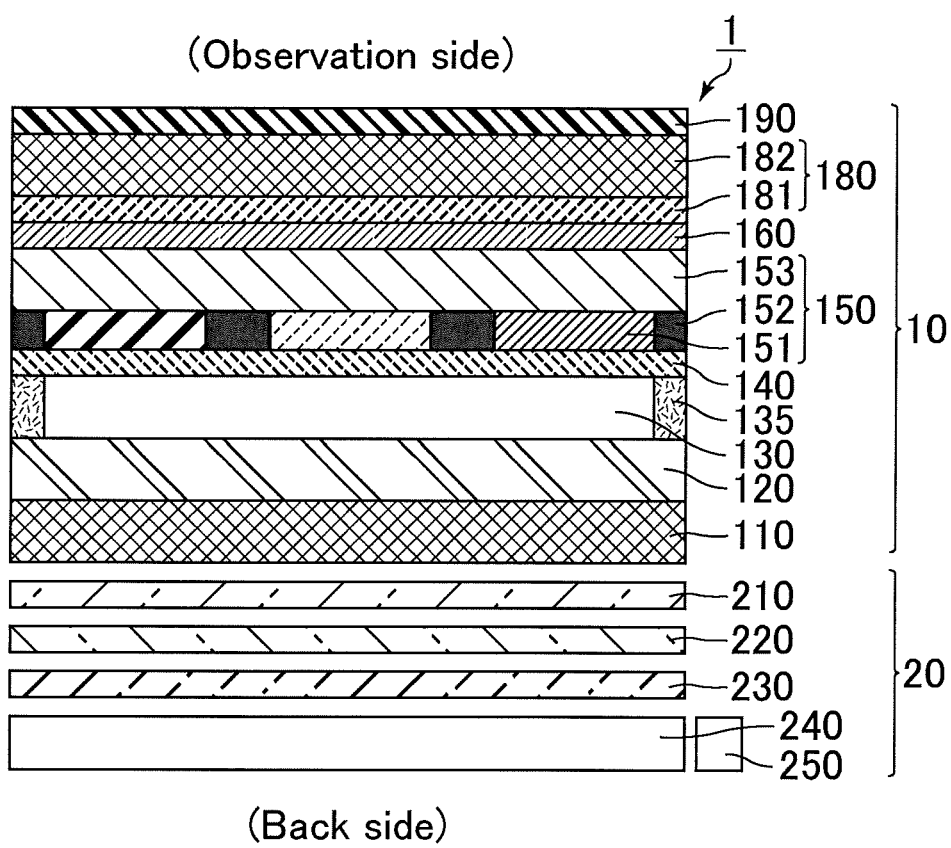

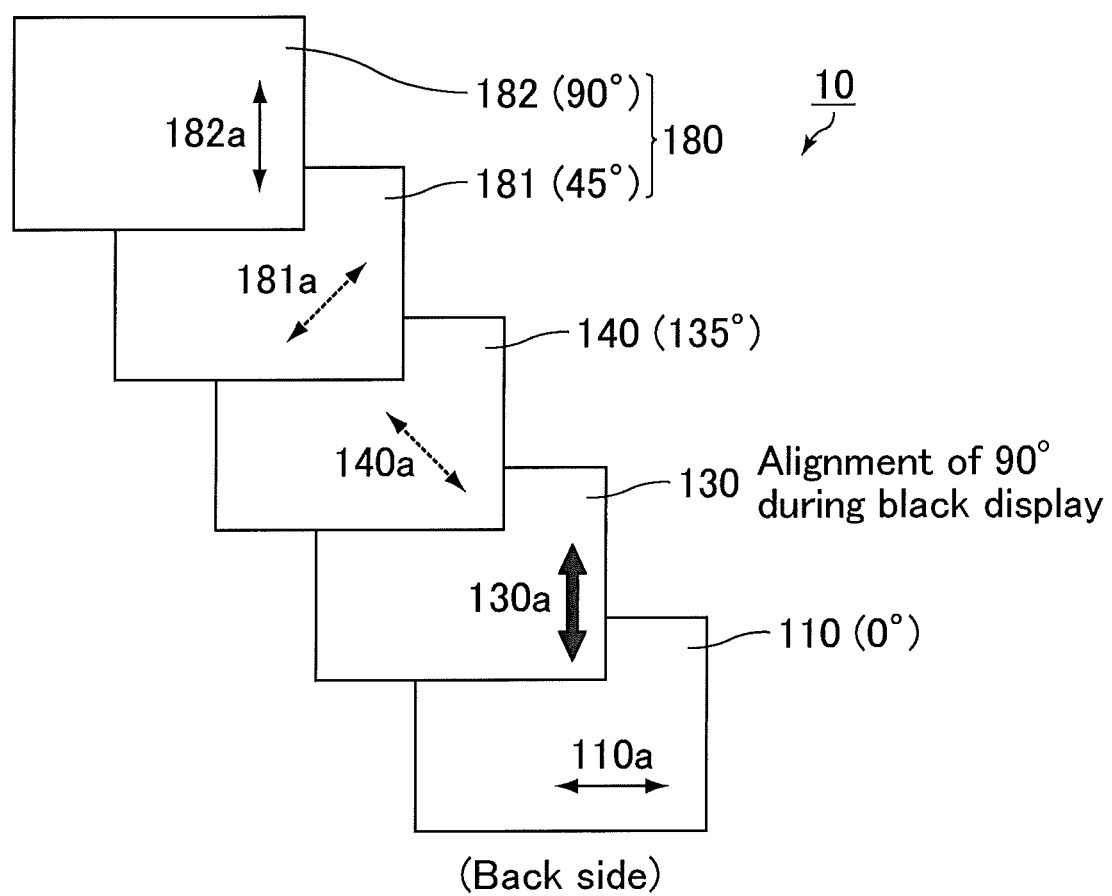

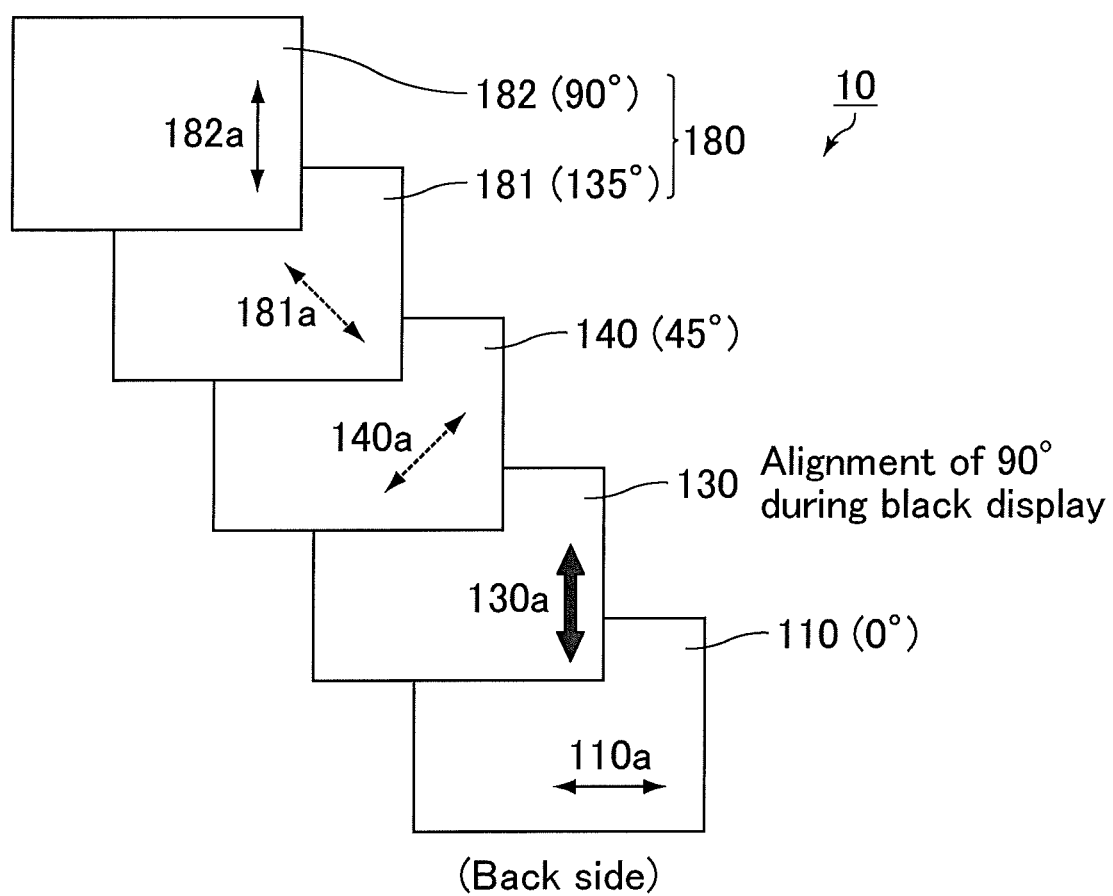

(Observation side)

(Back side)

(Back side)

(Observation side)

(Observation side)

(Back side)

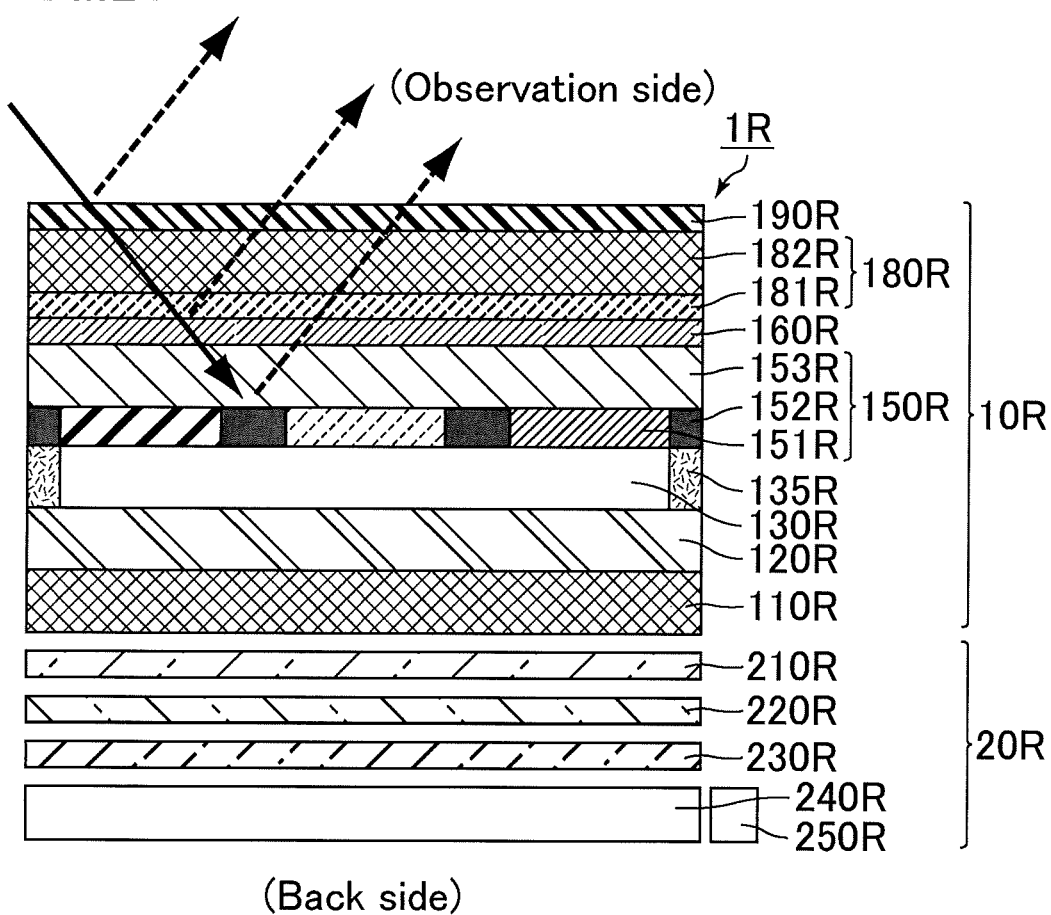

Transmittance differs depending on azimuth angle (Observation side)

(Back side)

(Observation side)

(Back side)

LIQUID CRYSTAL MODULE

CROSS-REFERENCE TO RELATED APPLICATIONS

The present application claims priority under 35 U.S.C. § 119 to Japanese Patent Application No. 2017-188805 filed on Sep. 28, 2017, the contents of which are incorporated herein by reference in their entirety.

BACKGROUND OF THE INVENTION

Field of the Invention

The present invention relates to a liquid crystal module. More particularly, the present invention relates to a liquid crystal module including a prism sheet.

Description of Related Art

A liquid crystal module (liquid crystal display device) is a display device that uses a liquid crystal composition for display. A representative display method of the liquid crystal module is to irradiate a liquid crystal panel in which a liquid crystal composition is sealed between a pair of substrates with light from a backlight, and apply a voltage to the liquid crystal composition to change an alignment of liquid crystal molecules, thereby controlling an amount of light transmitted through the liquid crystal module. Having features such as thinness, light weight, and low power consumption, such a liquid crystal module is used in electronic devices such as televisions, smart phones, tablet terminals, and car navigation systems.

The backlight used in the liquid crystal module includes, for example, a light source, a diffusion plate configured to diffuse light from the light source, and a prism sheet. As a liquid crystal module including a prism sheet, for example, JP H08-68997 A discloses a liquid crystal display device provided with a liquid crystal display element, and a backlight assembly configured to illuminate the liquid crystal display element. In the liquid crystal display device, the backlight assembly at least has a diffusion plate, and two prism sheets disposed between the diffusion plate and the liquid crystal display element and having a large number of fine prism grooves on a surface of the liquid crystal display element side. Further, a predetermined angle is provided in a groove direction of the prism grooves of the two prism sheets and in a repetition direction of pixels of the liquid crystal display element, and the groove directions of the prism grooves of the two prism sheets are arranged to be orthogonal to each other.

WO 2009/084177 A discloses a liquid crystal display device having an illumination device provided with a light source, a light guide plate, and a prism sheet having a plurality of prisms. In the illumination device, the prism sheet includes anisotropic particles having diffusion anisotropy, and an array direction of the plurality of prisms and a longitudinal direction of the anisotropic particles are displaced by an angle of larger than 0 degrees to smaller than 5 degrees in a plane direction of the prism sheet.

JP 2008-32841 A discloses a liquid crystal display device in which, assuming that a direction of a pixel array of a liquid crystal display panel constituting the liquid crystal display device is defined as an $X_1$ direction, and that a triangular pillar-shaped prism element array constituting a prism sheet of a backlight module extends in an $X_2$ direction, the $X_1$ direction and the $X_2$ direction are not perfectly coincident with each other.

BRIEF SUMMARY OF THE INVENTION

FIG. 20 is a schematic cross-sectional view of a liquid crystal module of Comparative Embodiment 1. FIG. 21 is a schematic cross-sectional view of a liquid crystal module of Comparative Embodiment 2.

A liquid crystal module 1R of Comparative Embodiment 1 is an example of a fringe field switching (FFS) mode liquid crystal module, which is currently used, and includes a liquid crystal panel 10R and a backlight 20R in order from an observation side, as shown in FIG. 20. The liquid crystal panel 10R of the liquid crystal module 1R of Comparative Embodiment 1 includes, in order from the back side toward the observation side: a first polarizer 110R; a first substrate (TFT substrate) 120R including thin-film transistors (TFTs); a liquid crystal layer 130R; a second substrate (CF substrate) 150R including a color filter (CF); a transparent conductive film (e.g., indium tin oxide (ITO) thin film) 160R; and a second polarizer 182R. The liquid crystal layer 130R is sealed with a sealing material 135R. The second substrate 150R is provided with a color filter layer 151R, a black matrix layer 152R, and an insulating substrate 153R.

The liquid crystal module 1R of Comparative Embodiment 2 is a liquid crystal module in which an antireflection film and an out-cell retardation layer are provided in the liquid crystal module 1R of Comparative Embodiment 1. That is, the liquid crystal module 1R of Comparative Embodiment 2 has a similar configuration to the liquid crystal module 1R of Comparative Embodiment 1 except that an out-cell retardation layer 181R is provided between the transparent conductive film 160R and the second polarizer 182R, and an antireflection film 190R is provided on the observation side of the second polarizer 182R.

When the liquid crystal module 1R of Comparative Embodiment 1 shown in FIG. 20 is used in a light environment such as outdoors, a displayed image is difficult to visually recognize since a screen reflects light strongly. This is greatly influenced by, as shown in FIG. 20, reflection on the surface of the second polarizer 182R, interface reflection in the black matrix layer 152R of the second substrate 150R of the liquid crystal panel 10R, and interface reflection in the transparent conductive film 160R disposed on the surface of the liquid crystal panel 10R for countermeasure against display defects due to static electricity.

Examples of a method for suppressing these interface reflections include the following two methods. A first method may be, as shown in FIG. 21, a method of employing the antireflection film 190R in order to suppress reflection on the surface of the second polarizer 182R. A second method for suppressing the interface reflection may be, as shown in FIG. 21, a method of employing a circularly polarizing plate 180R which is a combination of the out-cell retardation layer 181R as a λ/4 plate and the second polarizer 182R in order to suppress reflection at the interface between the transparent conductive film 160R and the black matrix layer 152R.

When an out-cell retardation layer as a λ/4 plate is provided as shown in FIG. 21 in order to suppress reflection at the interface, a λ/4 plate having a slow axis orthogonal to the out-cell retardation layer may be further provided to cancel retardation of the out-cell retardation layer. Conventionally, in a vertical alignment (VA) mode liquid crystal module, two λ/4 plates are arranged above and below the liquid crystal panel such that their slow axes are orthogonal to each other. However, adopting this configuration in the FFS mode liquid crystal module with liquid crystal molecules always aligned in the plane causes the transmittance to become constant irrespective of an alignment azimuth of the liquid crystal molecules, disabling monochrome display. Therefore, the FFS mode liquid crystal module cannot use the configuration adopted in the VA mode liquid crystal module.

FIGS. 22A and 22B are views relating to a liquid crystal module of Comparative Embodiment 3, in which FIG. 22A is a schematic cross-sectional view and FIG. 22B is a schematic perspective exploded view. FIG. 23 is a graph showing the result of simulating the normalized transmittance during black display of a liquid crystal panel of the liquid crystal module of Comparative Embodiment 3. Simulation of the normalized transmittance is at a polar angle of 60°. The simulation of the normalized transmittance has been performed using a backlight having a normalized luminance of 1.0 at an azimuth angle of 0° to 360° at a polar angle of 60°. As shown in FIG. 22, the liquid crystal module 1R of Comparative Embodiment 3 has a similar configuration to the liquid crystal module 1R of Comparative Embodiment 2 except that an in-cell retardation layer 140R is provided between the liquid crystal layer 130R and the second substrate 150R. That is, in the liquid crystal module 1R of Comparative Embodiment 3, the in-cell retardation layer 140R is provided between the second substrate 150R and the liquid crystal layer 130R, and the out-cell retardation layer 181R is provided on the observation side of the second substrate 150R. The in-cell retardation layer 140R and the out-cell retardation layer 181R in the liquid crystal module 1R of Comparative Embodiment 3 are $\lambda/4$ plates, and the slow axis of the in-cell retardation layer 140R and the slow axis of the out-cell retardation layer 181R are orthogonal to each other.

In the liquid crystal module 1R of Comparative Embodiment 3, the second polarizer 182R and the out-cell retardation layer 181R can be used in combination to function as the circularly polarizing plate 180R, and the circularly polarizing plate 180R cuts reflection in the transparent conductive film 160R and reflection in the black matrix layer 152R. In addition, reflection on a surface of the second polarizer 182R can be cut by the antireflection film 190R. Furthermore, since the slow axes of the in-cell retardation layer 140R and the out-cell retardation layer 181R are orthogonal to each other, the retardations of the in-cell retardation layer 140R and the out-cell retardation layer 181R can be mutually canceled. This enables a state equivalent to a state substantially without the in-cell retardation layer 140R and the out-cell retardation layer 181R during transmissive display. This can provide optical characteristics equivalent to an ordinary FFS mode while achieving low reflection.

However, in Comparative Embodiment 3, when the luminance of the liquid crystal module 1R is measured from a direction in which the polar angle is large for black display, the luminance varies depending on the azimuth angle, and the variations in luminance increase as the polar angle in a measurement direction increases. This is because, in each of the in-cell retardation layer 140R and the out-cell retardation layer 181R, which are $\lambda/4$ plates, three principal refractive indexes nx, ny, and nz satisfy the relationship of nx>ny≥nz, that is, both the in-cell retardation layer 140R and the out-cell retardation layer 181R are A plates satisfying the relationship of nx>ny≥nz, and as shown in FIG. 23, the normalized transmittance of the liquid crystal panel 10R of the liquid crystal module 1R of Comparative Embodiment 3 varies depending on the azimuth angle when the polar angle is large (e.g., at a polar angle of 60°).

One method for solving such a problem of luminance variations of the liquid crystal module 1R depending on the azimuth angle when the polar angle is large for black display is a method using a positive A plate (nx>ny=nz) for the in-cell retardation layer and using a negative A plate (ny<nx=nz) for the out-cell retardation layer. This mostly eliminates variations in transmittance of the liquid crystal panel that are caused depending on the azimuth angle during black display when the polar angle is large. However, the negative A plate still has problems in terms of manufacturing cost and durability of the film.

In the liquid crystal display device of JP H08-68997 A, moire stripes are suppressed by providing a predetermined angle in the groove direction of the prism grooves of the two prism sheets and the repetition direction of pixels of the liquid crystal display element, and arranging the groove directions of the two prism sheets to be orthogonal to each other. However, regarding the liquid crystal module including the prism sheet, JP H08-68997 A fails to examine the azimuth angle dependence (luminance change at a deep polar angle) of luminance during black display, which occurs when the polar angle is large. Similarly, WO 2009/084177 A and JP 2008-32841 A fails to examine the azimuth angle dependence of luminance of the liquid crystal module during black display, which occurs when the polar angle is large.

In view of the above state of the art, it is an object of the present invention to provide a liquid crystal module that is excellent in durability and manufacturing cost and exhibits reduced variations in peak luminance that are caused depending on the azimuth angle during black display when the polar angle is large.

The present inventors made various investigations concerning a liquid crystal module that is excellent in durability and manufacturing cost and exhibits reduced variations in peak luminance that are caused depending on the azimuth angle during black display when the polar angle is large, and consequently have noted the transmittance characteristics of the liquid crystal panel and the luminance characteristics of a backlight using a prism sheet. Then, the present inventors have found that it is possible to mutually compensate for the transmittance of the liquid crystal panel and the luminance of the backlight, and to suppress variations in peak luminance of the liquid crystal module that are caused depending on the azimuth angle during black display when the polar angle is large, even without a negative A plate, by aligning a ridge line of an uneven portion of the prism sheet arranged closest to the observation side in an azimuth at which the liquid crystal panel has a maximized transmittance in an oblique direction during black display. Thus, the present inventors have arrived at a fact that the above problems can be solved satisfactorily, and these findings have now led to completion of the present invention.

That is, one aspect of the present invention may be a liquid crystal module including: a liquid crystal panel having a first substrate, a second substrate provided on an observation side of the first substrate, a liquid crystal layer provided between the first substrate and the second substrate, a first polarizer provided on a back side of the first substrate, an in-cell retardation layer provided between the second substrate and the liquid crystal layer, and a circularly polarizing plate provided on the observation side of the second substrate; and a backlight provided on the back side of the liquid crystal panel, wherein the circularly polarizing plate includes a second polarizer and an out-cell retardation layer provided between the second substrate and the second polarizer; the in-cell retardation layer is a λ/4 plate, and has three principal refractive indexes satisfying a relationship of nx>ny=nz; the out-cell retardation layer is a λ/4 plate, and has three principal refractive indexes satisfying a relationship of nx>ny≥nz; the backlight includes a first prism sheet provided with an uneven portion including a first ridge line, and a second prism sheet provided on the back side from the first prism sheet and provided with an uneven portion including a second ridge line orthogonal to the first ridge line; and the first ridge line is parallel to an azimuth at which the liquid crystal panel has a maximized transmittance in an oblique direction during black display.

The liquid crystal panel may further include a positive C plate between the second substrate and the out-cell retardation layer; the circularly polarizing plate may be a left circularly polarizing plate; a liquid crystal molecule in the liquid crystal layer during black display may have an alignment azimuth parallel to an absorption axis of the first polarizer; and the liquid crystal module with an absorption axis of the second polarizer having an azimuth angle of 0° may satisfy the following Equation 1:

$$10\times\beta+35\leq\alpha\leq10\times\beta+45 \quad \text{(Equation 1)}$$

wherein α represents an azimuth angle of the first ridge line and β represents an NZ coefficient of the out-cell retardation layer.

The liquid crystal panel may further include a positive C plate between the second substrate and the out-cell retardation layer; the circularly polarizing plate may be a right circularly polarizing plate; a liquid crystal molecule in the liquid crystal layer during black display may have an alignment azimuth parallel to an absorption axis of the first polarizer; and the liquid crystal module with an absorption axis of the second polarizer having an azimuth angle of 0° may satisfy the following Equation 2:

$$-10\times\beta+135\leq\alpha\leq-10\times\beta+145 \quad \text{(Equation 2)}$$

wherein α represents an azimuth angle of the first ridge line and β represents an NZ coefficient of the out-cell retardation layer.

The circularly polarizing plate may be a right circularly polarizing plate, and a liquid crystal molecule in the liquid crystal layer during black display may have an alignment azimuth orthogonal to an absorption axis of the first polarizer, and when the absorption axis of the first polarizer is at an azimuth angle of 0°, the first ridge line may be at an azimuth angle α of 110° or more and 120° or less.

The circularly polarizing plate may be a left circularly polarizing plate, and a liquid crystal molecule in the liquid crystal layer during black display may have an alignment azimuth orthogonal to an absorption axis of the first polarizer, and when the absorption axis of the first polarizer is at an azimuth angle of 0°, the first ridge line may be at an azimuth angle α of 60° or more and 70° or less.

The present invention can provide a liquid crystal module that is excellent in durability and manufacturing cost and exhibits reduced variations in peak luminance that are caused depending on the azimuth angle during black display when the polar angle is large.

BRIEF DESCRIPTION OF THE DRAWINGS

FIG. 3 is a schematic perspective exploded view of a liquid crystal panel of the liquid crystal module of Embodiment 1;

FIGS. 4A and 4B are views relating to a backlight of the liquid crystal module of Embodiment 1, in which FIG. 4A is a schematic perspective exploded view of the backlight, and FIG. 4B is a schematic perspective view of a prism sheet of the backlight;

FIG. 6 is a schematic perspective exploded view of a liquid crystal panel of the liquid crystal module of Embodiment 2;

FIGS. 7A to 7C are views relating to the liquid crystal module of Embodiment 2, in which FIG. 7A is a graph showing an example of the normalized transmittance of the liquid crystal panel during black display, FIG. 7B is a graph showing an example of the normalized luminance of a backlight, and FIG. 7C is a graph showing an example of the normalized luminance of the liquid crystal module during black display;

FIG. 8 is a schematic perspective exploded view of a liquid crystal panel of a liquid crystal module of Embodiment 3;

FIG. 9 is a schematic cross-sectional view of a liquid crystal module of Embodiment 4;

FIG. 10-1 is a schematic perspective exploded view of a liquid crystal panel of the liquid crystal module of Embodiment 4;

FIGS. 10-2A to 10-2C are views relating to the liquid crystal module of Embodiment 4, in which FIG. 10-2A is a graph showing an example of the normalized transmittance of the liquid crystal panel during black display, FIG. 10-2B is a graph showing an example of the normalized luminance of a backlight, and FIG. 10-2C is a graph showing an example of the normalized luminance of the liquid crystal module during black display;

FIG. 11 is a schematic perspective exploded view of a liquid crystal panel of a liquid crystal module of Embodiment 5;

FIGS. 12A and 12B are views relating to a liquid crystal module of Examples 1-1 to 1-4, in which FIG. 12A is a schematic perspective exploded view of a liquid crystal panel of Examples 1-1 to 1-4, and FIG. 12B is a schematic cross-sectional view of a backlight of Examples 1-1 to 1-4;

FIGS. 14A and 14B are views relating to the liquid crystal module of Example 1-3, in which FIG. 14A is a graph showing the result of simulating the normalized transmittance during black display of a liquid crystal panel, and FIG. 14B is a graph showing the result of simulating the normalized luminance during black display of the liquid crystal module;

FIGS. 18A and 18B are views relating to the liquid crystal module of Example 3-4, in which FIG. 18A is a graph showing the result of simulating the normalized transmittance during black display of a liquid crystal panel, and FIG. 18B is a graph showing the result of simulating the normalized luminance during black display of the liquid crystal module;

FIG. 21 is a schematic cross-sectional view of a liquid crystal module of Comparative Embodiment 2;

FIGS. 22A and 22B are views relating to a liquid crystal module of Comparative Embodiment 3, in which FIG. 22A is a schematic cross-sectional view and FIG. 22B is a schematic perspective exploded view;

FIGS. 26A and 26B are views relating to the liquid crystal module of Comparative Example 1, in which FIG. 26A is a graph showing the result of simulating the normalized transmittance during black display of a liquid crystal panel, and FIG. 26B is a graph showing the result of simulating the normalized luminance during black display of the liquid crystal module;

FIGS. 29A and 29B are views relating to the liquid crystal module of Comparative Example 2, in which FIG. 29A is a graph showing the result of simulating the normalized transmittance during black display of a liquid crystal panel, and FIG. 29B is a graph showing the result of simulating the normalized luminance during black display of the liquid crystal module.

DETAILED DESCRIPTION OF THE INVENTION

Hereinafter, embodiments of the present invention will be described. The present invention is not limited to the contents described in the following embodiments, and changes of the design can be appropriately made within the scope of satisfying the configuration of the present invention.

Definitions of Terms and Symbols

Definitions of terms and symbols in this specification are as follows.
(1) Refractive Index (Nx, Ny, Nz)
The refractive index "nx" is a refractive index in a direction in which the in-plane refractive index is maximized (that is, the slow axis direction), "ny" is a refractive index in a direction orthogonal to the slow axis in the plane, and "nz" is a refractive index in the thickness direction. Unless otherwise specified, the refractive index refers to a value for light of a wavelength of 550 nm at 23° C.

Figure 1:
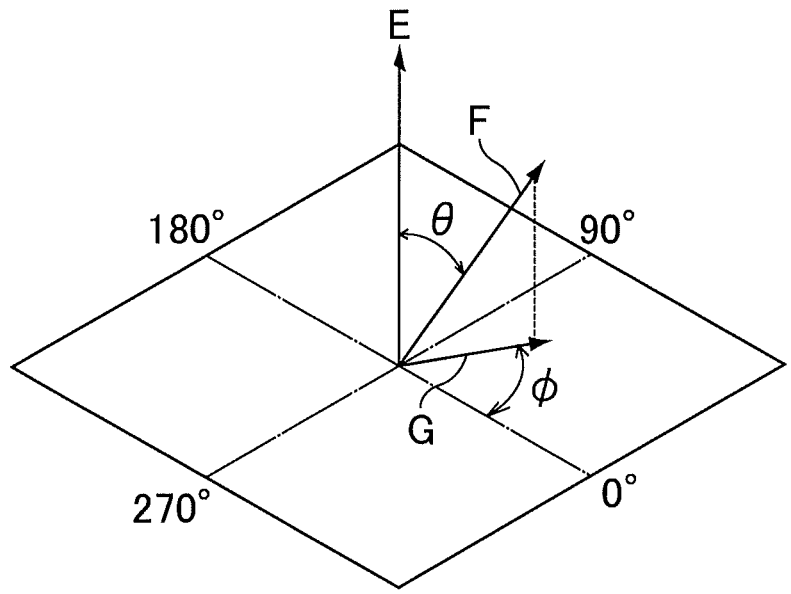
FIG. 1 is a view for describing the definitions of the polar angle and the azimuth angle in a liquid crystal module.

(2) In-Plane Retardation (Re)
The in-plane retardation (Re) refers to the in-plane retardation of a layer (film) at a wavelength of 550 nm at 23° C., unless otherwise specified. Re is obtained by Re=(nx−ny)×d, where d (nm) is the thickness of the layer (film). In this specification, "retardation" refers to the in-plane retardation unless otherwise specified.
(3) Retardation in Thickness Direction (Rth)
The retardation in the thickness direction (Rth) refers to the retardation in the thickness direction of the layer (film) at a wavelength of 550 nm at 23° C., unless otherwise specified. Rth is obtained by Rth={(nx+ny)/2−nz}×d, where d (nm) is the thickness of the layer (film). In this specification, the retardation in the thickness direction is also referred to as "thickness retardation".
(4) NZ Coefficient
The NZ coefficient is obtained by Nz=(nx−nz)/(nx−ny). The NZ coefficient is a numerical value indicating a degree of two axes of a retarder.
(5) λ/4 Plate
The λ/4 plate is a retarder that gives an in-plane retardation of ¼ wavelength (strictly, 137.5 nm) at least to light of a wavelength of 550 nm, and may be any retarder that gives an in-plane retardation of 100 nm or more and 176 nm or less. The light of a wavelength of 550 nm is light having a wavelength with the highest human visibility.
(6) Circularly Polarizing Plate
The circularly polarizing plate refers to a polarizing plate that converts incident unpolarized light into circularly polarized light. Here, circularly polarized light includes not only complete circularly polarized light (ellipticity (short axis/long axis)=1.00) but also elliptically polarized light having an ellipticity of 0.90 or more and less than 1.00.
(7) Observation Surface Side and Back Side
The observation side refers to a side closer to a screen (display surface) of the liquid crystal module, and the back side refers to a side farther from the screen (display surface) of the liquid crystal module.
(8) Polarizer
In this specification, the "polarizer" without "linear" indicates a linear polarizer, and it is distinguished from a circular polarizer (circularly polarizing plate).
(9) Polar Angle, Azimuth, and Azimuth Angle
FIG. 1 is a view for describing the definitions of the polar angle and the azimuth angle in a liquid crystal module. As shown in FIG. 1, with the normal direction E of a screen of a liquid crystal panel or a liquid crystal module as a reference, the angle formed by the measurement direction F and the normal direction E is defined as the polar angle θ, which usually takes an angle of 0° or more and 90° or less. The direction G, which is projection of the measurement direction F on the screen, is defined as the azimuth, which usually takes an angle of 0° or more and 360° or less. The angle from a reference direction (azimuth angle 0°) to the direction G on the screen is defined as the azimuth angle φ. The azimuth angle φ is a positive angle in the counterclockwise direction and a negative angle in the clockwise direction. Both the counterclockwise and the clockwise represent rotation directions when the screen is viewed from the observation side (front). The polar angle θ is also simply referred to as the polar angle. The azimuth angle φ is also simply referred to as the azimuth angle.

Embodiment 1

In addition to a twisted nematic (TN) mode in which liquid crystal molecules having positive anisotropy of dielectric constant are aligned in a twisted state by 90° when viewed from a substrate normal direction, and a vertical alignment (VA) mode in which liquid crystal molecules having negative anisotropy of dielectric constant are vertically aligned with respect to a substrate surface, examples of a display mode (liquid crystal alignment mode) of a liquid crystal module include an in-plane switching (IPS) mode and a fringe field switching (FFS) mode in which liquid crystal molecules having positive or negative anisotropy of dielectric constant are horizontally aligned with respect to a substrate surface to apply a lateral electric field to the liquid crystal layer, for reasons such as easiness of obtaining wide viewing angle characteristics.

The display mode in this embodiment is not particularly limited, and any of the above-described modes may be used, but the display module is desirably used in the FFS mode and the IPS mode, and more desirably used in the FFS mode. When two λ/4 plates are arranged above and below the liquid crystal panel such that their slow axes are perpendicular to each other, transmittance becomes constant irrespective of an alignment azimuth of the liquid crystal molecules, which disables monochrome display in the liquid crystal module of the FFS mode and the IPS mode in which the liquid crystal molecules are always aligned in the plane. However, according to this embodiment, even in the liquid crystal module of the FFS mode and the IPS mode, two λ/4 plates can be arranged in the liquid crystal module while monochrome display is achieved. In this embodiment, as an example, the FFS mode liquid crystal module will be described and explained.

Figure 2:
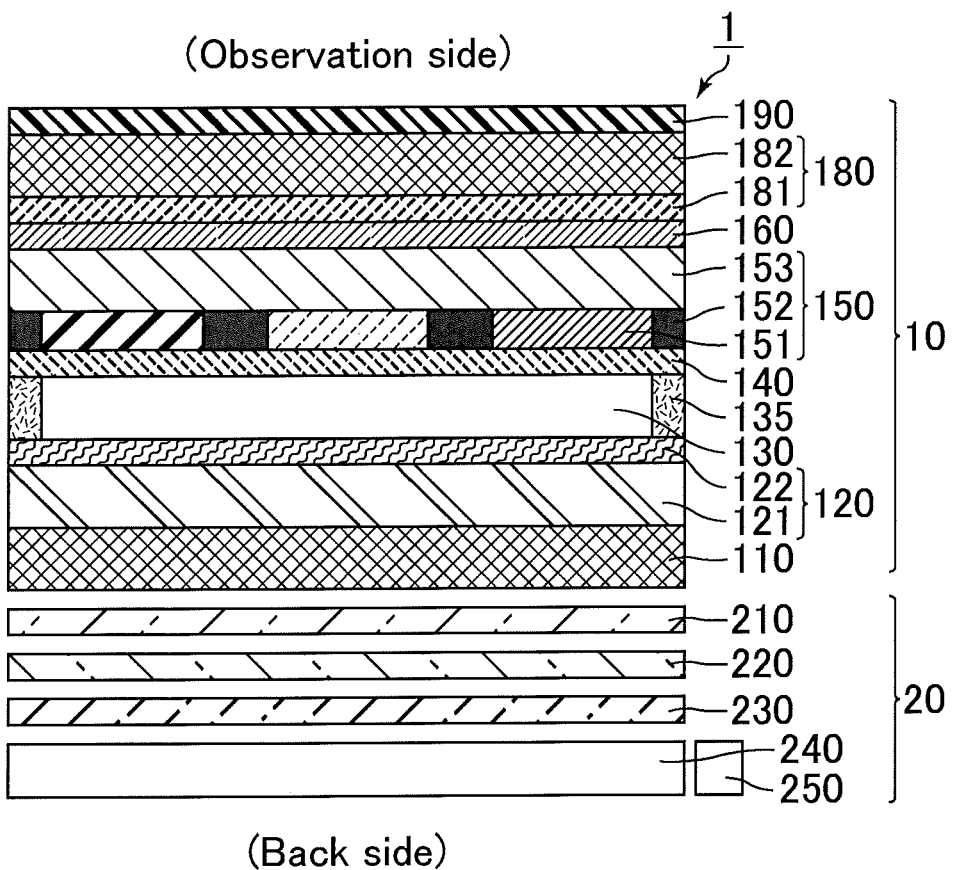
FIG. 2 is a schematic cross-sectional view of a liquid crystal module of Embodiment 1.

FIG. 2 is a schematic cross-sectional view of the liquid crystal module of Embodiment 1. As shown in FIG. 2, a liquid crystal module 1 of this embodiment includes a liquid crystal panel 10 and a backlight 20 in order from the observation side.

As shown in FIG. 2, the liquid crystal panel 10 of the liquid crystal module 1 of this embodiment includes, in order from the back side toward the observation side, a first polarizer 110, a first substrate 120, a liquid crystal layer 130, an in-cell retardation layer 140 as a λ/4 plate, a second substrate 150, a transparent conductive film (e.g., indium tin oxide (ITO) thin film) 160, a circularly polarizing plate 180, and an antireflection film 190.

The first substrate 120 has an insulating substrate 121 made of a transparent base material such as glass, thin-film transistors (TFTs) (not shown), and an electrode layer 122 in order from the back side toward the observation side. The first substrate 120 having the TFTs is also referred to as TFT substrate.

The second substrate 150 includes a color filter (CF) layer 151, a black matrix layer 152, and an insulating substrate 153 made of a transparent base material such as glass, in order from the back side toward the observation side. The color filter layer 151 is formed of a red color filter, a green color filter, and a blue color filter. The second substrate 150 having the color filter layer 151 is also referred to as CF substrate.

The liquid crystal layer 130 is sealed with a sealing material 135. The circularly polarizing plate 180 has an out-cell retardation layer 181 as a λ/4 plate, and a second polarizer 182 in order from the back side toward the observation side.

As shown in FIG. 2, the backlight 20 of the liquid crystal module 1 of this embodiment includes a first prism sheet 210, a second prism sheet 220, a diffusion sheet 230, and a light guide plate 240 in order from the observation side toward the back side. The backlight 20 further includes a light source 250 disposed on a side surface of the light guide plate 240.

FIG. 3 is a schematic perspective exploded view of the liquid crystal panel of the liquid crystal module of Embodiment 1. As shown in FIG. 3, the second polarizer 182 has an absorption axis 182a orthogonal to an absorption axis 110a of the first polarizer 110. That is, the first polarizer 110 and the second polarizer 182 are in a crossed Nicols arrangement relationship in which their polarization axes are orthogonal. Such a configuration can favorably achieve a black display state when no voltage is applied. In the liquid crystal layer 130, liquid crystal molecules when a voltage to cause black display is applied (during black display) are at an alignment azimuth 130a orthogonal to the absorption axis 110a of the first polarizer 110 or the absorption axis 182a of the second polarizer 182, and liquid crystal molecules when a voltage to cause white display is applied (during white display) are at an alignment azimuth 130b that forms an angle of about 45° with respect to the alignment azimuth 130a of the liquid crystal molecules during black display. The in-cell retardation layer 140 has a slow axis 140a that forms an angle of about 45° or about 135° with respect to the absorption axis 110a of the first polarizer 110. The out-cell retardation layer 181 has a slow axis 181a orthogonal to the slow axis 140a of the in-cell retardation layer 140.

In this specification, "two axes (any two out of the absorption axis 110a of the first polarizer 110, the absorption axis 182a of the second polarizer 182, the alignment azimuths 130a and 130b of the liquid crystal molecules, the slow axis 140a of the in-cell retardation layer 140, and the slow axis 181a of the out-cell retardation layer 181) are orthogonal" means that the angle (absolute value) between the two is within a range of 90±3°, desirably within a range of 90±1°, more desirably within a range of 90±0.5°, and particularly desirably 90° (completely orthogonal). "Two axes (any two out of the absorption axis 110a of the first polarizer 110, the absorption axis 182a of the second polarizer 182, the alignment azimuths 130a and 130b of the liquid crystal molecules, the slow axis 140a of the in-cell retardation layer 140, and the slow axis 181a of the out-cell retardation layer 181) are parallel" means that the angle (absolute value) between the two is within a range of 0±3°, desirably within a range of 0±1°, more desirably within a range of 0±0.5°, and particularly desirably 0° (completely parallel). "Two axes (any two out of the absorption axis 110a of the first polarizer 110, the absorption axis 182a of the second polarizer 182, the alignment azimuths 130a and 130b of the liquid crystal molecules, the slow axis 140a of the in-cell retardation layer 140, and the slow axis 181a of the out-cell retardation layer 181) form an angle of approximately 45°" means that the angle (absolute value) between the two is within a range of 45±3°, desirably within a range of 45±1°, more desirably within a range of 45±0.5°, and particularly desirably 45°. "Two axes (any two out of the absorption axis 110a of the first polarizer 110, the absorption axis 182a of the second polarizer 182, the alignment azimuths 130a and 130b of the liquid crystal molecules, the slow axis 140a of the in-cell retardation layer 140, and the slow axis 181a of the out-cell retardation layer 181) form an angle of approximately 135°" means that the angle (absolute value) between the two is within a range of 135±3°, desirably within a range of 135±1°, more desirably within a range of 135±0.5°, and particularly desirably 135°.

In this embodiment, the second polarizer 182 and the out-cell retardation layer 181 as a λ/4 plate can be combined to function as the circularly polarizing plate 180. The circularly polarizing plate 180 can cut reflection in the transparent conductive film 160 and reflection in the black matrix layer 152. In addition, reflection on a surface of the second polarizer 182 can be cut by the antireflection film 190.

Further, both the in-cell retardation layer 140 and the out-cell retardation layer 181 are λ/4 plates, and the slow axes of the in-cell retardation layer 140 and the out-cell retardation layer 181 are orthogonal to each other. Therefore, the retardation of the in-cell retardation layer 140 and the retardation of the out-cell retardation layer 181 can be mutually canceled, realizing a state substantially without the in-cell retardation layer 140 and the out-cell retardation layer 181. This can provide optical characteristics equivalent to those of an ordinary FFS mode while achieving low reflection. That is, since the slow axes of the two λ/4 plates (the in-cell retardation layer 140 and the out-cell retardation layer 181) disposed with the second substrate 150 interposed therebetween are orthogonal to each other, the retardations of the in-cell retardation layer 140 and the out-cell retardation layer 181 act in directions for mutually canceling, and the retardations are desirably mutually canceled and can be regarded as absent. As a result, considering transmissive display, it can be regarded as the same as the ordinary FFS mode.

The normalized transmittance in an oblique direction (that is, a polar angle exceeding 0°) during black display of the liquid crystal panel 10 in this embodiment differs depending on the azimuth angle φ (0° to 360°). This is because the in-cell retardation layer 140 is a positive A plate with three principal refractive indexes satisfying the relationship of nx>ny=nz; the out-cell retardation layer 181 is an A plate with three principal refractive indexes satisfying the relationship of nx>ny≥nz; the out-cell retardation layer 181 is not a negative A plate; and in this case, as described above, viewing angle compensation is insufficient in the in-cell retardation layer 140 and the out-cell retardation layer 181. A graph showing a relationship between the azimuth angle and the normalized transmittance of the liquid crystal panel 10 in an oblique direction during black display (hereinafter also referred to as normalized transmittance graph) has two peaks having the maximum transmittance (having the maximum peak transmittance), and the azimuths at which the two peaks having the maximum peak transmittance appear are opposite directions and form an angle of 180° with each other. This results from the fact that the axes of the polarizing plate and the retarder constituting the liquid crystal panel and the alignment direction of the liquid crystal molecules are all linear. For example, when the absorption axis of the linearly polarizing plate is parallel to the straight line connecting the azimuth angles 0° and 180°, the transmittances of the liquid crystal panel at the azimuth angles of 0° and 180° are equal to each other. This is not to be changed even if a retarder and a liquid crystal layer are provided in addition to the linearly polarizing plate. Therefore, in the azimuths forming an angle of 180° with each other, the liquid crystal panel has basically the same characteristics (optical characteristics). Further, the normalized transmittance graph has at least one peak having a lower peak transmittance than the maximum peak transmittance between the azimuth at which a first peak out of the two peaks having the maximum peak transmittance appears and the azimuth at which a second peak appears counterclockwise, and at least one peak having a lower peak transmittance than the maximum peak transmittance between the azimuth at which the second peak appears and the azimuth at which the first peak appears counterclockwise. A reason for having at least one peak having a transmittance lower than the maximum peak transmittance between the two peaks having the maximum peak transmittance in the liquid crystal panel 10 is considered as follows. That is, the reason is considered that, in this embodiment, while the out-cell retardation layer 181 (or a layer including the out-cell retardation layer 181 and a positive C plate described later) is used in order to cancel the retardation of the in-cell retardation layer 140 as the positive A plate, the transmittance varies depending on the azimuth since the out-cell retardation layer 181 (or the layer including the out-cell retardation layer 181 and a positive C plate described later) is not completely equivalent to the negative A plate.

Although the azimuth angle dependence of the normalized transmittance during black display of the liquid crystal panel 10 described above may theoretically occur at a polar angle larger than 0°, it can be usually measured with a polar angle of a certain degree, for example a polar angle of 30° or more. In this specification, the normalized transmittance is a transmittance normalized with the maximum value of the transmittance being 1. Further, in this specification, in obtaining the normalized transmittance of the liquid crystal panel 10, a backlight with the normalized luminance at the azimuth angle φ=0° to 360° being 1.0 is used at the same polar angle as in obtaining the normalized transmittance.

Figure 4A:
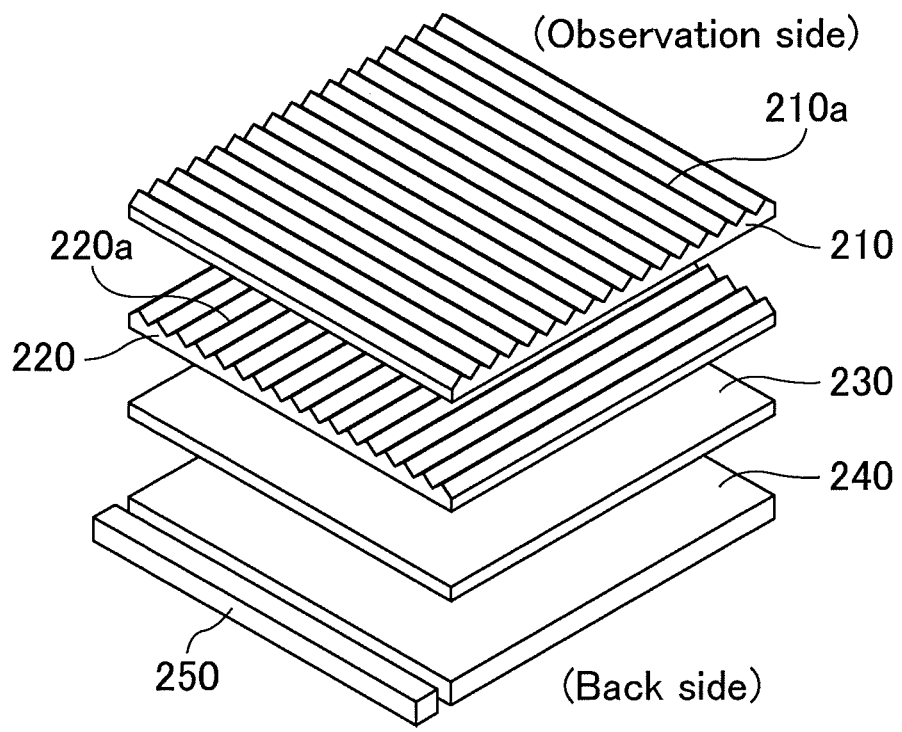
Figure 4B:
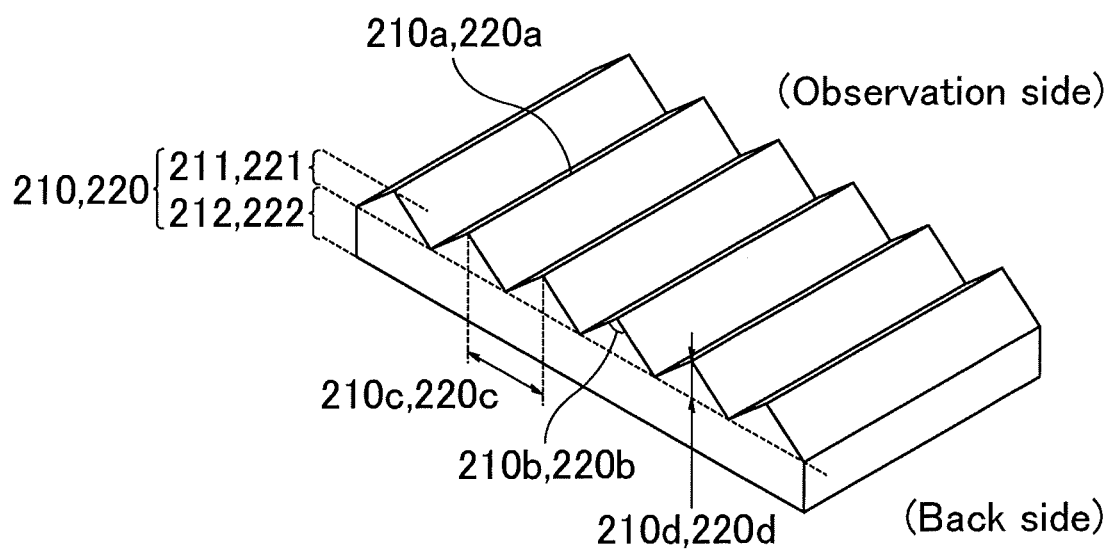

Next, the backlight 20 of this embodiment will be described. FIGS. 4A and 4B are views relating to the backlight of the liquid crystal module of Embodiment 1, in which FIG. 4A is a schematic perspective exploded view of the backlight, and FIG. 4B is a schematic perspective view of a prism sheet of the backlight. As shown in FIGS. 4A and 4B, the backlight 20 has, in order from the observation side toward the back side, the first prism sheet 210 including an uneven portion 211 having a first ridge line 210a, and a flat portion 212; the second prism sheet 220 including an uneven portion 221 having a second ridge line 220a orthogonal to the first ridge line 210a, and a flat portion 222; the diffusion sheet 230; and the light guide plate 240. On a side surface of the light guide plate 240, the light source 250 such as a light emitting diode (LED) is disposed. In this specification, "the first ridge line and the second ridge line are orthogonal" means that the angle (absolute value) between the two is within a range of 90±5°, desirably within a range of 90±3°, more desirably within a range of 90±1°, and particularly desirably 90° (completely orthogonal).

As shown in FIG. 4B, each of the flat portions 212 and 222 of the first and second prism sheets 210 and 220 has a structure with a flat surface on the observation side and the back side. Each of the uneven portions 211 and 221 of the first and second prism sheets 210 and 220 has a plurality of columnar structures having a longitudinal shape, and the longitudinal directions of the plurality of columnar structures are parallel to each other and parallel to the flat portions 212 and 222. The columnar structure is, for example, a triangular prism shape. In this embodiment, the first and second prism sheets 210 and 220 in which the columnar structure is a triangular prism shape, that is, in which the uneven portions 211 and 221 have a triangular prism shape will be described. The first and second ridge lines 210a and 220a of the first and second prism sheets 210 and 220 are linearly continuous apexes of protrusions of the uneven portions 211 and 221, and both are linear.

When the polar angle is large, for example, at a polar angle of 60°, the normalized luminance of the backlight 20 in this embodiment differs depending on the azimuth angle φ (0° to 360°), and the luminance in the azimuth of the second ridge line 220a of the second prism sheet 220, which is a prism sheet farther from the observation side, is higher than the luminance in the azimuth of the first ridge line 210a of the first prism sheet 210, which is a prism sheet on the observation side. More specifically, a normalized luminance graph of the backlight 20 has two peaks in which the peak luminance is minimum (having minimum peak luminance) in two azimuths parallel to the first ridge line 210a of the first prism sheet 210. Further, the normalized luminance graph has two peaks with the peak luminance higher than the minimum peak luminance (having the maximum peak luminance) in two azimuths parallel to the second ridge line 220a of the second prism sheet 220. Since the first ridge line 210a is orthogonal to the second ridge line 220a as described above, the two peaks having the minimum peak luminance are respectively located between the azimuth at which a first peak out of the two peaks having the maximum peak luminance appears and the azimuth at which a second peak appears counterclockwise, and between the azimuth at which the second peak appears and the azimuth at which the first peak appears counterclockwise. The azimuth at which a first peak out of the two peaks having the minimum peak luminance appears is mutually orthogonal to the azimuth at which the two peaks having the maximum peak luminance appear, and the azimuth at which a second peak out of the two peaks having the minimum peak luminance appears is mutually orthogonal to the azimuth at which the two peaks having the maximum peak luminance appear. In this specification, "azimuths at which the two peaks appear in the normalized luminance graph are orthogonal to each other" means that the angle (absolute value) between the two is within a range of 90±5°, desirably within a range of 90±3°, more desirably within a range of 90±1°, and particularly desirably 90°.

When the polar angle is large, the reason why the normalized luminance graph of the backlight 20 has the above-mentioned peaks can be considered as follows. The reason is that, while the prism sheet has a function of converging oblique luminance of the azimuth orthogonal to the ridge line in a front direction, inclining the polar angle θ causes a phenomenon called "side lobe" in which a decreased luminance rises again, and this side lobe is strongly affected by the prism sheet on the observation side of the two layered prism sheets, that is, the first prism sheet 210. That is, two peaks having the maximum peak luminance appear in two azimuths parallel to the second ridge line 220a of the second prism sheet 220, which are the azimuths orthogonal to the first ridge line 210a of the first prism sheet 210, and two peaks having the minimum peak luminance appear in two azimuths parallel to the first ridge line 210a of the first prism sheet 210, which are the azimuths orthogonal to the second ridge line 220a of the second prism sheet 220.

The azimuth angle dependence of the normalized luminance of the backlight 20 described above, that is, the side lobe occurs when the polar angle in the measurement direction is large. Specifically, it appears normally when the polar angle is 45° or more, and may occur more certainly when the polar angle is 60° or more and less than 90°.

In this embodiment, the liquid crystal module 1 is designed to, when the polar angle is large, mutually compensate for the amplitude of the transmittance of the liquid crystal panel 10 during black display with respect to the azimuth angle and the amplitude of the luminance of the backlight 20 with respect to the azimuth angle. More specifically, the first ridge line 210a of the first prism sheet 210 disposed closest to the observation side is disposed in parallel to the azimuth at which the liquid crystal panel 10 has a maximized transmittance (hereinafter also referred to as maximum transmittance azimuth) in an oblique direction during black display. Adopting such an aspect allows a peak having the maximum peak transmittance in the normalized transmittance graph to be superimposed on a peak having the minimum peak luminance in the normalized luminance graph, that is, when the polar angle is large, the azimuth at which the liquid crystal panel 10 has a maximized transmittance during black display can be aligned to the azimuth at which the backlight 20 has a minimized peak luminance, and the luminance of the liquid crystal module 1 can be suppressed in the azimuth at which the liquid crystal panel 10 has a maximized transmittance during black display.

Further, when the polar angle is large, in a range where the transmittance of the liquid crystal panel 10 is lower than the maximum peak transmittance during black display (between the azimuth at which a first peak out of the two peaks having the maximum peak transmittance appears and the azimuth at which a second peak appears counterclockwise, and between the azimuth at which the second peak appears and the azimuth at which the first peak appears counterclockwise), the azimuth at which the backlight 20 has a maximized peak luminance can be arranged, and the luminance of the liquid crystal module 1 can be increased in a range where the transmittance of the liquid crystal panel 10 is lower than the maximum transmittance during black display.

This allows, when the polar angle is large, mutual compensation for the transmittance of the liquid crystal panel 10 and the luminance of the backlight 20 during black display, and makes it possible to obtain the liquid crystal module 1 exhibiting reduced variations in peak luminance that are caused depending on the azimuth angle during black display, without a negative A plate having problems in manufacturing cost and durability. As described above, this embodiment is devised to improve the total performance of the liquid crystal module 1 by combining the transmittance characteristics of the liquid crystal panel 10 and the luminance characteristics of the backlight 20 using the first prism sheet 210 and the second prism sheet 220. Since such an effect of this embodiment is based on the azimuth angle dependence of the luminance of the backlight 20 by the side lobe described above, it can be usually obtained when the polar angle is large, specifically, when the polar angle is 45° or more, and it can be more certainly obtained when the polar angle is 60° or more and less than 90°.

In this specification, "the first ridge line 210a of the first prism sheet 210 is parallel to the azimuth at which the liquid crystal panel 10 has a maximized transmittance" means that the angle (absolute value) between the first ridge line 210a and the maximum transmittance azimuth is in a range of 0±5°, desirably within a range of 0±3°, more desirably within a range of 0±1°, and particularly desirably 0° (completely parallel).

In addition, the black display does not mean a state of displaying ideally perfect black (transmittance=0%), but means a state of displaying a lowest gray scale. Therefore, the liquid crystal panel 10 can have a transmittance that varies depending on the azimuth angle during black display as described above.

Further, the liquid crystal panel 10 theoretically has a maximum transmittance azimuth in an oblique direction, that is, at a polar angle exceeding 0°. However, when the polar angle is small, a difference between the maximum peak transmittance and the minimum peak transmittance (lowest peak transmittance) becomes small, and measuring the maximum transmittance azimuth is difficult. Therefore, the maximum transmittance azimuth of the liquid crystal panel 10 is desirably measured at a polar angle of a certain degree, for example, a polar angle of 30° or more and less than 90°, which makes it possible to more reliably obtain the maximum transmittance azimuth. Since the maximum transmittance azimuth is constant irrespective of the polar angle, even in arranging the first ridge line 210a of the first prism sheet 210 in parallel to the maximum transmittance azimuth specified by any polar angle, the parallel relationship between the maximum transmittance azimuth and the first ridge line 210a is not to be lost at other polar angles than the polar angle above. In addition, the maximum transmittance azimuth can be measured with, for example, a viewing angle measuring device (EZContrast, manufactured by ELDIM).

Hereinafter, each configuration will be further described.

(Liquid Crystal Panel)

The liquid crystal panel 10 desirably has a peak transmittance ratio of 0.3 or more and 0.9 or less. The peak transmittance ratio in this specification is defined as the ratio of the lowest peak transmittance among the peak transmittances other than the maximum transmittance to the maximum transmittance, with the highest transmittance among the transmittances at an azimuth angle $\varphi=0°$ to 360° and at a polar angle $\theta=60°$ taken as 1.

In the normalized transmittance graph of the liquid crystal panel 10 in an oblique direction during black display, as described above, two peaks having the maximum peak transmittance appear. However, the transmittances of the two peaks do not completely coincide with each other in some cases, and the two peaks having the maximum peak transmittance have only to satisfy that the transmittance of one peak is 90% or more and 110% or less of the transmittance of the other peak. When the pre-tilt angle of the liquid crystal molecules contained in the liquid crystal layer 130 (the angle formed by the long axes of the liquid crystal molecules with respect to the surfaces of the first substrate 120 and the second substrate 150) is 0°, the transmittances of the peaks PA1 and PA3 coincide with each other. When the pre-tilt angle is not 0°, the transmittances of the peaks PA1 and PA3 do not completely coincide with each other.

As described above, the normalized transmittance graph in an oblique direction during black display of the liquid crystal panel 10 in this embodiment has at least one peak having a peak transmittance lower than the maximum peak transmittance (hereinafter also referred to as first low transmittance peak) between the azimuth at which a first peak out of the two peaks having the maximum peak transmittance appears and the azimuth at which a second peak appears counterclockwise and at least one peak having a peak transmittance lower than the maximum peak transmittance (hereinafter also referred to as second low transmittance peak) between the azimuth at which the second peak appears and the azimuth at which the first peak appears counterclockwise. Each of the first and second low transmittance peaks is desirably 1 or more and 3 or less, more desirably 1 or more and 2 or less, and even more desirably 1.

In the normalized transmittance graph, the number of the first low transmittance peaks is the same as the number of the second low transmittance peaks. Further, in the normalized transmittance graph, peaks having substantially the same normalized transmittance appear every 180°. This also results from the fact that the axes of the polarizing plate and the retarder constituting the liquid crystal panel and the alignment direction of the liquid crystal molecules are all linear. In addition, substantially the same normalized transmittance means that the transmittance of one peak is 90% or more and 110% or less of the transmittance of the other peak in comparing the transmittances of two peaks.

(Backlight)

The backlight 20 desirably has a peak luminance ratio of 0.60 or more and 0.95 or less, and more desirably 0.65 or more and 0.90 or less. In this specification, the peak luminance ratio is defined as the ratio of the lowest peak luminance (minimum peak luminance) among the peak luminances other than the maximum luminance to the maximum peak luminance, with the highest peak luminance (maximum peak luminance) among the luminances at an azimuth angle $\varphi=0°$ to 360° and at a polar angle $\theta=60°$ taken as 1.

In the normalized luminance graph of the backlight 20 when the polar angle is large, as described above, two peaks having the maximum peak luminance appear. However, the luminances of the two peaks do not completely coincide with each other in some cases, and the two peaks having the maximum peak luminance have only to satisfy that the luminance of one peak is 90% or more and 110% or less of the luminance of the other peak. Further, in the normalized luminance graph of the backlight 20 when the polar angle is large, as described above, two peaks having the minimum peak luminance appear. However, the luminances of the two peaks do not completely coincide with each other in some cases, and the two peaks having the minimum peak luminance have only to satisfy that the luminance of one peak is 90% or more and 110% or less of the luminance of the other peak. Thus, the state where the luminances of the two peaks having the maximum peak luminance do not completely coincide with each other is considered to be an error caused by influence of slight deflection or the like of the sheet-shaped first and second prism sheets 210 and 220. The state where the luminances of the two peaks having the minimum peak luminance do not completely coincide with each other is also considered to be due to a similar reason.

(Polarizer)

The first polarizer 110 and the second polarizer 182 may be any appropriate polarizers according to the purpose. Examples thereof include a polyvinyl alcohol film, a partially formalized polyvinyl alcohol film, a product obtained by causing a hydrophilic polymer film, such as a partially saponified ethylene/vinyl acetate copolymer film, to adsorb a dichroic substance (dichroic dye) such as iodine or a dichroic dye and performing uniaxial stretching, and a polyene alignment film such as dehydrated polyvinyl alcohol and dehydrochlorinated polyvinyl chloride. A polarizer obtained by causing a polyvinyl alcohol film to adsorb a dichroic substance (dichroic dye) such as iodine and performing uniaxial stretching is particularly desirable because of a high polarization dichroic ratio. The thickness of these polarizers is not particularly limited, but is generally about 5 to 30 μm.

Each of the first polarizer 110 and the second polarizer 182 may be provided with a protective layer on each of the back side and the observation side. The protective layer is formed of any suitable film that can be used as a protective layer of a polarizer. Specific examples of a material as a main component of the film include cellulose resin such as triacetyl cellulose, and transparent resin such as cycloolefin resin. When a protective layer is provided on the liquid crystal layer 130 side of each of the first polarizer 110 and the second polarizer 182, the protective layer (inner protective layer) desirably has optical isotropy.

(First Substrate)

The first substrate 120 has the insulating substrate 121, scanning lines, data lines, TFTs connected to the scanning lines and the data lines, and the electrode layer 122 in order toward the liquid crystal layer 130 side. The electrode layer 122 has a planar common electrode, an insulating film, and a pixel electrode formed with a slit in order toward the liquid crystal layer 130 side. The arrangement of the common electrode and the pixel electrode may be switched, and the common electrode formed with the slit may be formed on the liquid crystal layer 130 side of the planar pixel electrode.

The liquid crystal module 1 of the FFS mode is described in this embodiment, but the liquid crystal module 1 may be a liquid crystal module of the IPS mode in which a common electrode having a comb teeth part and a pixel electrode having a comb teeth part are arranged to face each other such that the comb teeth parts mesh with each other in the electrode layer 122. The electrode pair of the common electrode and the pixel electrode in a liquid crystal module of both the FFS mode and the IPS mode generates a lateral electric field in the liquid crystal layer 130.

(Liquid Crystal Layer)

The liquid crystal layer 130 includes liquid crystal molecules. In the liquid crystal module 1 of this embodiment, the light transmission amount is controlled by applying a voltage to the liquid crystal layer 130 and changing the alignment state of the liquid crystal molecules according to the applied voltage. In the liquid crystal layer 130, the alignment of the liquid crystal molecules in a state where no voltage is applied is controlled to be parallel to the first substrate 120.

(Retardation Layer)

Each of the in-cell retardation layer 140 and the out-cell retardation layer 181 is a layer that changes the state of incident polarized light by providing retardation between two orthogonal polarization components with use of a birefringent material or the like. The in-cell retardation layer 140 is a $\lambda/4$ plate and is a positive A plate with three principal refractive indexes satisfying the relationship of nx>ny=nz. The out-cell retardation layer 181 is a $\lambda/4$ plate and is an A plate with three principal refractive indexes satisfying the relationship of nx>ny≥nz. Such an in-cell retardation layer 140 and the out-cell retardation layer 181 are better in terms of manufacturing cost and durability than a negative A plate. Here, "the three principal refractive indexes satisfying the relationship of nx>ny=nz" means that the NZ coefficient is 0.9 or more and 1.1 or less. Further, "the three principal refractive indexes satisfying the relationship of nx>ny≥nz" means that the NZ coefficient is 0.9 or more. The slow axis 140a of the in-cell retardation layer 140 and the slow axis 181a of the out-cell retardation layer 181 are orthogonal to each other.

The NZ coefficient ($\beta$) of the out-cell retardation layer 181 is desirably 1.0 or more and 2.5 or less, and more desirably 1.0 or more and 2.0 or less. When the NZ coefficient ($\beta$) exceeds 2.5, manufacturing of the out-cell retardation layer 181 as a $\lambda/4$ plate may become difficult in terms of materials.

The in-cell retardation layer 140 is desirably a retardation layer in which the alignment of the liquid crystal compound is fixed, in particular, a retardation layer in which a liquid crystal material such as a reactive mesogen is arranged on a film subjected to alignment treatment (alignment film). Such an embodiment enables reduction of the film thickness of the in-cell retardation layer 140 as the positive A plate, and suppression of the parallax color mixing of the liquid crystal module 1.

An example of a method for forming the in-cell retardation layer 140 may be a method in which a liquid crystal material containing a liquid crystal compound is applied to a substrate film subjected to alignment treatment, and the alignment is fixed. The liquid crystal compound is desirably polymerizable liquid crystal. As long as a desired retardation is developed, for example, a method without special alignment treatment on a substrate film or a method of peeling from a substrate film and transferring to another film after fixation of the alignment may be adopted. Further, a method without fixing the alignment of the liquid crystal material may be used.

The polymerizable liquid crystal is a compound having a polymerizable group and having liquid crystallinity. The polymerizable group means a group involved in the polymerization reaction, and is desirably a photopolymerizable group. Here, the photopolymerizable group means a group that may be involved in a polymerization reaction by an active radical, an acid, or the like generated from a photopolymerization initiator. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Desired among these are an acryloyloxy group, a methacryloyloxy group, a vinyloxy group, an oxiranyl group, and an oxetanyl group, and more desired is an acryloyloxy group. The liquid crystallinity may be achieved by a thermotropic liquid crystal or a lyotropic liquid crystal. When the thermotropic liquid crystal is classified according to the degree of order, either a nematic liquid crystal or a smectic liquid crystal may be adopted, but a thermotropic nematic liquid crystal is desirable from the viewpoint of easy film formation.

Specific examples of the polymerizable liquid crystal include a compound having a polymerizable group among the compounds described in "3.8.6 Network (completely cross-linked type)" and "6.5.1 Liquid Crystal Material, b. Polymerizable Nematic Liquid Crystal Material" of Liquid Crystal Handbook (edited by Liquid Crystal Handbook Editing Committee, published by Maruzen Co., Ltd. on Oct. 30, 2000), and polymerizable liquid crystals described in JP 2010-31223 A, JP 2010-270108 A, JP 2011-6360 A, and JP 2011-207765 A.

The out-cell retardation layer 181 can be formed in the same manner as the in-cell retardation layer 140. The out-cell retardation layer 181 can be formed, for example, by applying a liquid crystal material containing a liquid crystal compound to a substrate film subjected to alignment treatment, and fixing the alignment. Further, using a method of peeling from the base film and transferring to a linearly polarizing plate after the fixation of the alignment can provide the circularly polarizing plate 180 having the out-cell retardation layer 181 and the linearly polarizing plate (second polarizer 182). The out-cell retardation layer 181 can also be formed by a method of stretching a commercially available retardation film (e.g., Zeonor film (manufactured by Zeon Corporation)).

(Alignment Film)

An alignment film may be disposed on the liquid crystal layer 130 side of each of the first substrate 120 and the second substrate 150. The alignment film has a function of controlling the alignment of liquid crystal molecules in a state where no voltage is applied. In this embodiment, the alignment film is a horizontal alignment film that controls the alignment of liquid crystal molecules in a state where no voltage is applied so as to be parallel to the first substrate 120 and the second substrate 150.

(Transparent Conductive Film)

The transparent conductive film 160 is a layer disposed on the surface of the liquid crystal panel 10 for countermeasure against display defects due to static electricity, and can be formed by a sputtering method, for example. The transparent conductive film 160 includes a transparent conductive film material such as indium tin oxide (ITO), indium zinc oxide (IZO), zinc oxide (ZnO), tin oxide (SnO), or an alloy of these. The transparent conductive film 160 including ITO is also referred to as shield ITO.
(Circularly Polarizing Plate)

The circularly polarizing plate 180 has the out-cell retardation layer 181 and the second polarizer 182 in order from the back side toward the observation side. The slow axis 181*a* of the out-cell retardation layer 181 forms an angle of 45° counterclockwise or 45° clockwise with respect to the absorption axis 182*a* of the second polarizer 182. The circularly polarizing plate 180 has a function of converting light incident from the observation side into circularly polarized light, and can cut reflection in the transparent conductive film 160 and reflection in the black matrix layer 152.
(Antireflection Film)

The antireflection film 190 has a function of suppressing reflection on the surface of the second polarizer 182. Examples of the antireflection film 190 include an antireflection (AR) film, a low reflection (LR) film, and a moth-eye film. The AR film and the LR film are films that reduce the reflected light intensity by utilizing optical interference. The moth eye film is a film that forms a smooth refractive index distribution by providing an uneven structure with a period of several hundreds of nanometers smaller than the wavelength of light on the film and reduces the reflected light intensity.
(Prism Sheet)

As shown in FIGS. 4A and 4B, each of the first prism sheet 210 and the second prism sheet 220 has a function of collecting outgoing light from the diffusion sheet 230 in the front direction on the observation side of the liquid crystal module 1. The first prism sheet 210 includes the flat portion 212 and the uneven portion 211 arranged on the surface of the flat portion 212 on the observation side. The second prism sheet 220 includes the flat portion 222 and an uneven portion 221 arranged on the surface of the flat portion 222 on the observation side.

The first ridge line 210*a* and the second ridge line 220*a* of the first prism sheet 210 and the second prism sheet 220 are orthogonal to each other. Since the prism sheet converges the oblique luminance of the azimuth orthogonal to the ridge line in the front direction, arranging the first ridge line 210*a* and the second ridge line 220*a* so as to be orthogonal to each other enables more uniform improvement of luminance in the plane of the liquid crystal module 1. The first prism sheet 210 and the second prism sheet 220 each may be, for example, a BEF series manufactured by 3M.

The shape of the uneven portions 211 and 221 in a cross section orthogonal to the first and second ridge lines 210*a* and 220*a* is desirably a triangle, and is more desirably an isosceles triangle having equal lengths of two sides sandwiching an apex of a protrusion. In the backlight 20 of this embodiment, apex angles 210*b* and 220*b* and pitches 210*c* and 220*c* of the uneven portions 211 and 221 of the first and second prism sheets 210 and 220 do not greatly change the above luminance characteristics (azimuth angle dependence of luminance in a deep polar angle). Therefore, the apex angles 210*b* and 220*b*, the pitches 210*c* and 220*c*, protrusion heights 210*d* and 220*d*, and the like of the uneven portions 211 and 221 of the first and second prism sheets 210 and 220 can be appropriately set.
(Light Guide Plate)

The backlight 20 of this embodiment desirably includes the light guide plate 240. The light guide plate 240 has a plate shape and is formed of a transparent resin such as a polycarbonate resin or polymethyl methacrylate resin. The observation side of the light guide plate 240 is a light exit surface from which light is emitted. The light guide plate 240 guides light introduced from the light source 250 into the light guide plate 240, and guides the light to the light exit surface to cause the entire light exit surface to uniformly glow.
(Diffusion Sheet)

The backlight 20 of this embodiment desirably includes the diffusion sheet 230. The diffusion sheet 230 is a semi-transparent resin film and has a function of diffusing the light emitted from the light exit surface of the light guide plate 240 to widen the directivity characteristic of the light.

In this embodiment, the diffusion sheet 230 and the light guide plate 240 are provided, but either one of the diffusion sheet 230 and the light guide plate 240 may be provided. In this embodiment, the edge-lit type is adopted in which the light source 250 is disposed on the side surface of the light guide plate 240, but the direct-lit type may be adopted in which the light source 250 is disposed on an entire surface of the liquid crystal panel 10. In this case, the diffusion sheet and the light guide plate 240 can be omitted.

Hereinafter, a liquid crystal module will be described with reference to a more specific and suitable layered structure of the liquid crystal panel of the liquid crystal module 1 of this embodiment.

Second Embodiment

Figure 5:
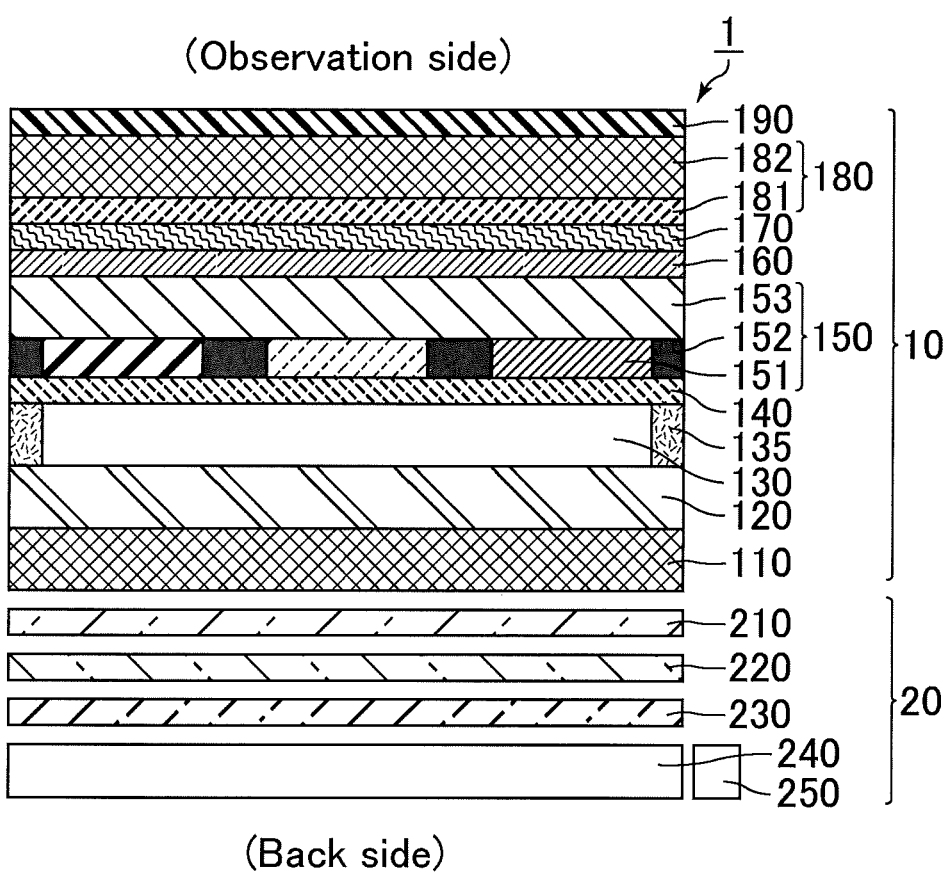
FIG. 5 is a schematic cross-sectional view of a liquid crystal module of Embodiment 2.

In this embodiment, more specific and suitable embodiment of the liquid crystal panel 10 of the liquid crystal module 1 of Embodiment 1 will be described. FIG. 5 is a schematic cross-sectional view of a liquid crystal module of Embodiment 2. As shown in FIG. 5, the liquid crystal panel 10 of the liquid crystal module 1 of this embodiment includes, in order from the back side toward the observation side, the first polarizer 110, the first substrate 120, the liquid crystal layer 130, the in-cell retardation layer 140, the second substrate 150, the transparent conductive film 160, a positive C plate 170 as a viewing angle compensation film, the circularly polarizing plate 180, and the antireflection film 190. The circularly polarizing plate 180 is a left circularly polarizing plate and has the out-cell retardation layer 181 and the second polarizer 182 in order from the back side toward the observation side. That is, in addition to the layered structure of the liquid crystal panel 10 of the liquid crystal module 1 of Embodiment 1, the liquid crystal panel 10 of the liquid crystal module 1 of this embodiment further includes the positive C plate 170 between the second substrate 150 and the out-cell retardation layer 181. The backlight 20 of the liquid crystal module 1 of this embodiment is similar to the backlight 20 of the liquid crystal module 1 of Embodiment 1.

FIG. 6 is a schematic perspective exploded view of the liquid crystal panel of the liquid crystal module of Embodiment 2. As shown in FIG. 6, the absorption axis 182*a* of the second polarizer 182 is orthogonal to the absorption axis 110*a* of the first polarizer 110. In the liquid crystal layer 130, the alignment azimuth 130*a* of liquid crystal molecules during black display is parallel to the absorption axis 110*a* of the first polarizer 110. The slow axis 140*a* of the in-cell retardation layer 140 forms an angle of about 45° with respect to the absorption axis 110*a* of the first polarizer 110. The slow axis 181*a* of the out-cell retardation layer 181 is orthogonal to the slow axis 140*a* of the in-cell retardation layer 140. More specifically, assuming that the azimuth angle of the absorption axis 182*a* of the second polarizer 182 is 0°, the azimuth angle of the absorption axis 110*a* of the first polarizer 110 is approximately 90°, the azimuth angle of the alignment azimuth 130a of the liquid crystal molecules during black display is approximately 90°, the azimuth angle of the slow axis 140a of the in-cell retardation layer 140 is approximately 135°, and the azimuth angle of the slow axis 181a of the out-cell retardation layer 181 is approximately 45°. In this specification, "the azimuth angle is approximately 45°" means that the azimuth angle is within a range of 45±3°, desirably within a range of 45±1°, more desirably within a range of 45±0.5°, and particularly desirably 45°. "The azimuth angle is approximately 90°" means that the azimuth angle is within a range of 90±3°, desirably within a range of 90±1°, more desirably within a range of 90±0.5°, and particularly desirably 90°. "The azimuth angle is approximately 135°" means that the azimuth angle is within a range of 135±3°, desirably within a range of 135±1°, more desirably within a range of 135±0.5°, and particularly desirably 135°.

Figure 7A:
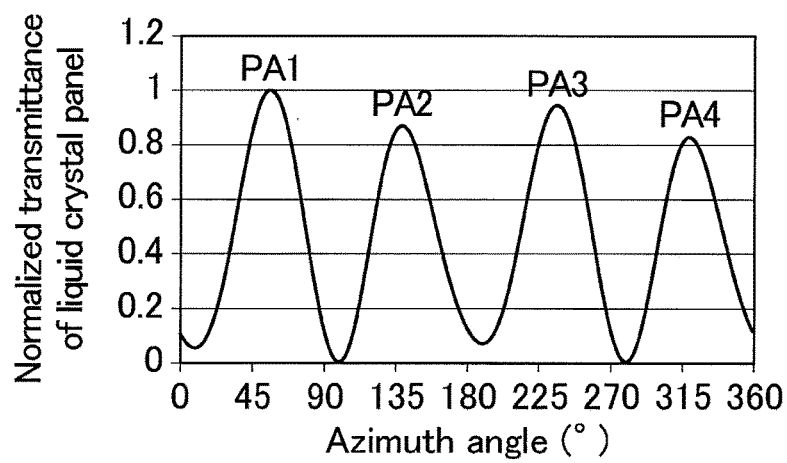
Figure 7B:
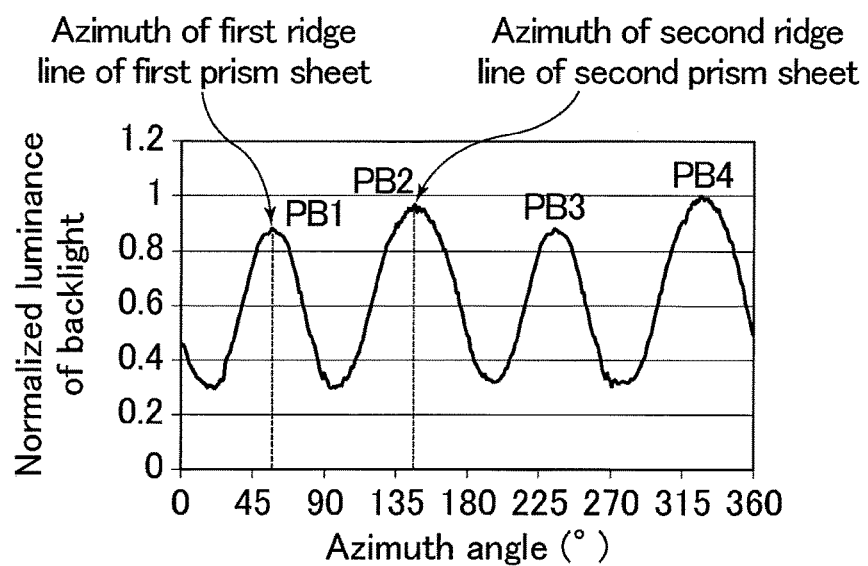
Figure 7C:
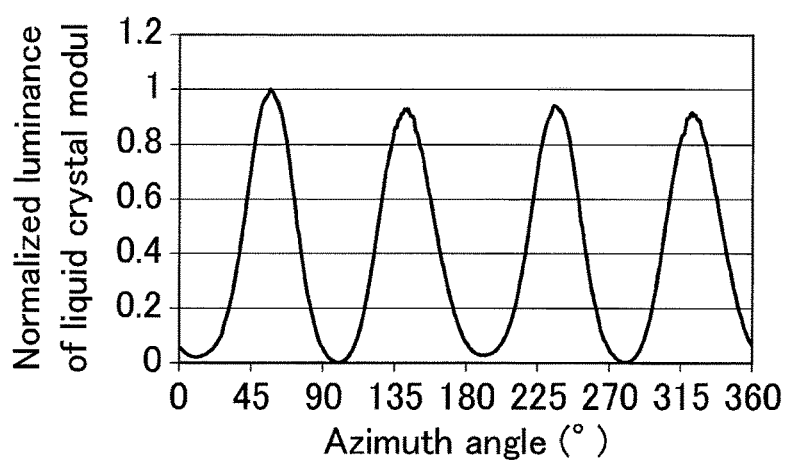

FIGS. 7A to 7C are views relating to the liquid crystal module of Embodiment 2, in which FIG. 7A is a graph showing an example of normalized transmittance of the liquid crystal panel during black display, FIG. 7B is a graph showing an example of normalized luminance of the backlight, and FIG. 7C is a graph showing an example of normalized luminance of the liquid crystal module during black display.

When the polar angle is large, for example, at a polar angle of 60°, in the normalized transmittance of the liquid crystal panel 10 during black display, the normalized transmittance differs depending on the azimuth angle φ as shown in FIG. 7A. More specifically, the normalized transmittance graph of the liquid crystal panel 10 during black display when the polar angle is large (e.g., at a polar angle of 60° or more) has two peaks (peaks PA1 and PA3) having the maximum peak transmittance, and the azimuths at which the two peaks PA1 and PA3 having the maximum peak transmittance appear form an angle of approximately 180° with each other. Furthermore, the normalized transmittance graph has one peak PA2 with a lower peak transmittance than the maximum peak transmittance between the azimuth at which the peak PA1 appears and the azimuth at which the peak PA3 appears counterclockwise, and has one peak PA4 with a lower peak transmittance than the maximum peak transmittance between the azimuth at which the peak PA3 appears and the azimuth at which the peak PA1 appears counterclockwise. The azimuth at which the peak PA2 appears is mutually orthogonal to the azimuths at which the peak PA1 and the peak PA3 appear, while the azimuth at which the peak PA4 appears is mutually orthogonal to the azimuths at which the peak PA1 and the peak PA3 appear. This is because, as described above, both the in-cell retardation layer 140 and the out-cell retardation layer 181 are A plates satisfying the relation of nx>ny≥nz, and are provided with the positive C plate 170. In this specification, "the azimuths at which the two peaks appear in the normalized transmittance graph are orthogonal to each other" means that the angle (absolute value) between the two is within a range of 90±3°, desirably within a range of 90±1°, more desirably within a range of 90±0.5°, and particularly desirably 90°.

When the polar angle is large, for example, at a polar angle of 60°, in the normalized luminance of the backlight 20 as shown in FIG. 7B, the luminance at the azimuth of the second ridge line 220a of the second prism sheet 220, which is a prism sheet farther from the observation side, is higher than the luminance at the azimuth of the first ridge line 210a of the first prism sheet 210, which is a prism sheet on the observation side. More specifically, the normalized luminance graph of the backlight 20 when the polar angle is large (e.g., a polar angle of 60° or more) has peaks PB1 and PB3 having the minimum peak luminance in two azimuths parallel to the first ridge line 210a of the first prism sheet 210. Further, the normalized luminance graph has peaks PB2 and PB4 having a peak luminance higher than the minimum peak luminance (having the maximum peak luminance) in two azimuths parallel to the second ridge line 220a of the second prism sheet 220. Since the first ridge line 210a is orthogonal to the second ridge line 220a as described above, the peak PB2 and the peak PB4 are respectively located between the azimuth at which the peak PB1 appears and the azimuth at which the peak PB3 appears counterclockwise, and between the azimuth at which the peak PB3 appears and the azimuth at which the peak PB1 appears counterclockwise. Each of the azimuth at which the peak PB1 appears and the azimuth at which the peak PB3 appears is orthogonal to the azimuth at which the peak PB2 appears, and each of the azimuth at which the peak PB1 appears and the azimuth at which the peak PB3 appears is orthogonal to the azimuth at which the peak PB4 appears.

In this embodiment, the liquid crystal module 1 is designed to, when the polar angle is large (e.g., a polar angle is 60° or more), mutually compensate for the amplitude of the transmittance of the liquid crystal panel 10 during black display with respect to the azimuth angle and the amplitude of the luminance of the backlight 20 with respect to the azimuth angle. More specifically, the first ridge line 210a of the first prism sheet 210 disposed closest to the observation side is arranged so as to be parallel to the maximum transmittance azimuth of the liquid crystal panel 10 in an oblique direction during black display. Adopting such an embodiment allows the peaks (peaks PA1 and PA3) having the maximum peak transmittance in the normalized transmittance graph shown in FIG. 7A to be superimposed on the peaks (peaks PB1 and PB3) having the minimum peak luminance in the normalized luminance graph shown in FIG. 7B. That is, when the polar angle is large, the azimuth at which the liquid crystal panel 10 has a maximized transmittance during black display can be aligned to the azimuth at which the backlight 20 has a minimized peak luminance, and, as shown in FIG. 7C, the luminance of the liquid crystal module 1 can be suppressed at an azimuth at which the liquid crystal panel 10 has a maximized peak transmittance during black display.

Further, when the polar angle is large, in a range where the transmittance of the liquid crystal panel 10 is lower than the maximum peak transmittance during black display (in the normalized transmittance graph, between the azimuth at which the peak PA1 appears and the azimuth at which the peak PA3 appears counterclockwise, and between the azimuth at which the peak PA3 appears and the azimuth at which the peak PA1 appears counterclockwise), the azimuth at which the backlight 20 has a maximized peak luminance can be arranged, and the luminance of the liquid crystal module 1 can be increased in a range where the transmittance of the liquid crystal panel 10 is lower than the maximum transmittance during black display. In particular, in this embodiment, the peaks (peaks PA2 and PA4) having the minimum peak transmittance in the normalized transmittance graph can be superimposed on the peaks (peaks PB1 and PB3) having the maximum peak luminance in the normalized luminance graph. That is, the azimuth at which the liquid crystal panel 10 has a minimized peak transmittance during black display can be aligned to the azimuth at which the backlight 20 has a maximized peak luminance. Therefore, the luminance of the liquid crystal module 1 can be increased in the azimuth at which the liquid crystal panel 10 has a minimized peak transmittance during black display.

As a result, when the polar angle is large, the difference between the maximum peak luminance and the minimum peak luminance of the liquid crystal module 1 can be suppressed, and variations in peak luminance of the liquid crystal module 1 that are caused depending on the azimuth angle during black display can be suppressed without a negative A plate having problems in manufacturing cost and durability. Therefore, the liquid crystal module 1 is allowed to be excellent in durability and manufacturing cost and exhibit variations in peak luminance that are caused depending on the azimuth angle during black display. Further, this embodiment can avoid superimposing of the luminance peak of the backlight 20 with the azimuth angle at which the liquid crystal panel 10 during black display has a minimized transmittance, that is, the azimuth angle at which the contrast ratio of the liquid crystal panel 10 is high when the polar angle is large. This enables improvement of viewing angle characteristics during black display while suppressing reduction in contrast ratio.

The peak transmittance ratio of the liquid crystal panel 10 in this embodiment is desirably 0.70 or more and 0.90 or less, and more desirably 0.75 or more and 0.85 or less.

The peak luminance ratio of the backlight 20 in this embodiment is desirably 0.75 or more and 0.95 or less, and more desirably 0.80 or more and 0.90 or less.

The liquid crystal module 1 of this embodiment with the absorption axis 182a of the second polarizer 182 having an azimuth angle of 0° desirably satisfies the following Equation 1, more desirably satisfies the following Equation 1-1, and even more desirably satisfies the following Equation 1-2:

$$10 \times \beta + 35 \leq \alpha \leq 10 \times \beta + 45 \quad \text{(Equation 1)}$$

$$10 \times \beta + 37 \leq \alpha \leq 10 \times \beta + 43 \quad \text{(Equation 1-1)}$$

$$\alpha = 10 \times \beta + 40 \quad \text{(Equation 1-2)}$$

wherein $\alpha$ represents the azimuth angle of the first ridge line 210a and $\beta$ represents the NZ coefficient of the out-cell retardation layer 181. In this embodiment provided with the positive C plate 170 and the left circularly polarizing plate, since the azimuth angle at which the liquid crystal panel 10 has a maximized transmittance during black display (hereinafter also referred to as maximum transmittance azimuth angle) can be approximated by $10 \times \beta + 40$. Therefore, the angle formed by the first ridge line 210a of the first prism sheet 210 and the maximum transmittance azimuth of the liquid crystal panel 10 during black display can be brought close to 0° by the azimuth angle $\alpha$ of the first ridge line 210a satisfying the equation. This enables suppression of variations in peak luminance that are caused depending on the azimuth angle during black display when the polar angle is large, for the liquid crystal module 1 having the positive C plate and the left circularly polarizing plate.

(Positive C Plate)

The positive C plate 170 of the liquid crystal module 1 of this embodiment has three principal refractive indexes satisfying the relationship of nz>nx=ny.

When the in-plane retardation Re of the positive C plate 170 is sufficiently small such as 15 nm or less, it can be regarded as substantially optically isotropic in the plane. Therefore, the arrangement direction in the plane of the positive C plate 170 is not particularly limited. The in-plane retardation of the positive C plate 170 is desirably 15 nm or less, and more desirably 10 nm or less.

The positive C plate 170 can be formed in the same manner as the in-cell retardation layer 140. The positive C plate 170 can be formed, for example, by applying a liquid crystal material containing a liquid crystal compound on a vertical alignment film subjected to alignment treatment for vertically aligning the liquid crystal compound, fixing the alignment, and transferring a film containing the liquid crystal compound. The liquid crystal compound may be a polymerizable liquid crystal compound.

The thickness retardation Rth of the positive C plate 170 is desirably 100 nm or more and 250 nm or less, and more desirably 120 nm or more and 230 nm or less. Further, when the thickness retardation of the positive C plate 170 is $\gamma$ nm and the NZ coefficient of the out-cell retardation layer 181 is $\beta$, $\beta$ and $\gamma$ desirably satisfy the following Equation 1A, more desirably satisfy the following Equation 1A-1, and more desirably satisfy the following Equation 1A-2. Viewing angle compensation of the positive A plate requires a negative A plate, but the negative A plate has a problem such as in cost as described above. In this embodiment, since the out-cell retardation layer 181 and the positive C plate 170 can be added together to apparently act as a pseudo negative A plate by the NZ coefficient $\beta$ of the out-cell retardation layer 181 and the thickness retardation $\gamma$ of the positive C plate 170 satisfying the following Equation 1A. This enables further suppression of variations in peak luminance that are caused depending on the azimuth angle during black display when the polar angle is large, while suppressing cost.

$$115\beta - 7.5 \leq \gamma \leq 115\beta + 2.5 \quad \text{(Equation 1A)}$$

$$115\beta - 5 \leq \gamma \leq 115\beta \quad \text{(Equation 1A-1)}$$

$$\gamma = 115\beta - 2.5 \quad \text{(Equation 1A-2)}$$

(Left Circularly Polarizing Plate)

The circularly polarizing plate 180 in this embodiment has the out-cell retardation layer 181 and the second polarizer 182 in order from the back side toward the observation side. The slow axis 181a of the out-cell retardation layer 181 forms an angle of approximately 45° counterclockwise with respect to the absorption axis 182a of the second polarizer 182. The circularly polarizing plate 180 in this embodiment is a left circularly polarizing plate and has a function of converting light incident from the observation side into counterclockwise circularly polarized light. In this specification, in observing light while facing the advancing direction of light, circularly polarized light in which the vibration direction of an electric displacement vector of the light wave rotates clockwise as the light wave advances is referred to as clockwise circularly polarized light, while circularly polarized light in which the vibration direction of an electric displacement vector of the light wave rotates counterclockwise as the light wave advances is referred to as counterclockwise circularly polarized light.

Third Embodiment

In this embodiment, a more specific and suitable embodiment of the liquid crystal panel 10 of the liquid crystal module 1 of Embodiment 1 will be described. The liquid crystal module of this embodiment has a similar configuration to the liquid crystal module 1 of Embodiment 2 except that the slow axes of the in-cell retardation layer and the out-cell retardation layer of the liquid crystal panel are arranged differently, and the circularly polarizing plate 180 is a right circularly polarizing plate.

FIG. 8 is a schematic perspective exploded view of the liquid crystal panel of the liquid crystal module of Embodiment 3. As shown in FIG. 8, the absorption axis 182a of the second polarizer 182 is orthogonal to the absorption axis 110a of the first polarizer 110. In the liquid crystal layer 130, the alignment azimuth 130a of liquid crystal molecules during black display is parallel to the absorption axis 110a of the first polarizer 110. The slow axis 140a of the in-cell retardation layer 140 forms an angle of about 45° with respect to the absorption axis 110a of the first polarizer 110. The slow axis 181a of the out-cell retardation layer 181 is orthogonal to the slow axis 140a of the in-cell retardation layer 140. More specifically, assuming that the azimuth angle of the absorption axis 182a of the second polarizer 182 is 0°, the azimuth angle of the absorption axis 110a of the first polarizer 110 is approximately 90°, the azimuth angle of the alignment azimuth 130a of the liquid crystal molecules during black display is approximately 90°, the azimuth angle of the slow axis 140a of the in-cell retardation layer 140 is approximately 45°, and the azimuth angle of the slow axis 181a of the out-cell retardation layer 181 is approximately 135°.

Adopting such an embodiment allows, when the polar angle is large (e.g., a polar angle of 60° or more), the azimuth at which the liquid crystal panel 10 has a maximized transmittance during black display to be aligned to the azimuth at which the backlight 20 has a minimized peak luminance. Therefore, the luminance of the liquid crystal module 1 can be suppressed in the azimuth at which the liquid crystal panel 10 has a maximized peak transmittance during black display. Furthermore, when the polar angle is large, the azimuth at which the liquid crystal panel 10 has a minimized peak transmittance during black display can be aligned to the azimuth at which the backlight 20 has a maximized peak luminance. Therefore, the luminance of the liquid crystal module 1 can be increased in the azimuth at which the liquid crystal panel 10 has a minimized peak transmittance during black display. As a result, when the polar angle is large, the difference between the maximum peak luminance and the minimum peak luminance of the liquid crystal module 1 can be suppressed, and variations in peak luminance of the liquid crystal module 1 that are caused depending on the azimuth angle during black display can be suppressed without a negative A plate having problems in manufacturing cost and durability. Therefore, the liquid crystal module 1 is allowed to be excellent in durability and manufacturing cost and exhibit variations in peak luminance that are caused depending on the azimuth angle during black display when the polar angle is large. Further, this embodiment can avoid superimposing of the luminance peak of the backlight 20 with the azimuth angle at which the liquid crystal panel 10 during black display has a minimized transmittance, that is, the azimuth angle at which the contrast ratio of the liquid crystal panel 10 is high when the polar angle is large. This enables improvement of viewing angle characteristics during black display while suppressing reduction in contrast ratio.

The liquid crystal module 1 of this embodiment with the absorption axis 182a of the second polarizer. 182 having an azimuth angle of 0° desirably satisfies the following Equation 2, more desirably satisfies the following Equation 2-1, and even more desirably satisfies the following Equation 2-2:

$$-10\times\beta+135\leq\alpha\leq-10\times\beta+145 \quad \text{(Equation 2)}$$

$$-10\times\beta+137\leq\alpha\leq-10\times\beta+143 \quad \text{(Equation 2-1)}$$

$$\alpha=-10\times\beta+140 \quad \text{(Equation 2-2)}$$

wherein α represents the azimuth angle of a first ridge line 210a and β represents the NZ coefficient of the out-cell retardation layer 181. In this embodiment provided with the positive C plate 170 and the right circularly polarizing plate, the maximum transmittance azimuth angle of the liquid crystal panel 10 during black display can be approximated by −10×β+140. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the equation. This enables suppression of variations in peak luminance that are caused depending on the azimuth angle during black display when the polar angle is large, for the liquid crystal module 1 having the positive C plate and the right circularly polarizing plate.

The thickness retardation (γ) of the positive C plate 170 and the NZ coefficient (β) of the out-cell retardation layer 181 desirably satisfy the above Equation 1A, more desirably satisfy the above Equation 1A-1, and even more desirably satisfy the above Equation 1A-2 as in Embodiment 2.

The peak transmittance ratio of the liquid crystal panel 10 in this embodiment is desirably 0.70 or more and 0.90 or less, and more desirably 0.75 or more and 0.85 or less.

The peak luminance ratio of the backlight 20 in this embodiment is desirably 0.75 or more and 0.95 or less, and more desirably 0.80 or more and 0.90 or less.

(Right Circularly Polarizing Plate)

The circularly polarizing plate 180 in this embodiment has the out-cell retardation layer 181 and the second polarizer 182 in order from the back side toward the observation side. The slow axis 181a of the out-cell retardation layer 181 forms an angle of approximately 45° clockwise with respect to the absorption axis 182a of the second polarizer 182. The circularly polarizing plate 180 in this embodiment is a right circularly polarizing plate and has a function of converting light incident from the observation side into clockwise circularly polarized light.

Fourth Embodiment

In this embodiment, a more specific and suitable embodiment of the liquid crystal panel 10 of the liquid crystal module 1 of Embodiment 1 will be described. FIG. 9 is a schematic cross-sectional view of a liquid crystal module of Embodiment 4. As shown in FIG. 9, the liquid crystal panel 10 of the liquid crystal module 1 of this embodiment has, in order from the back side toward the observation side, the first polarizer 110, the first substrate 120, the liquid crystal layer 130, the in-cell retardation layer 140, the second substrate 150, the transparent conductive film 160, the circularly polarizing plate 180, and the antireflection film 190. The circularly polarizing plate 180 is a right circularly polarizing plate and has the out-cell retardation layer 181 and the second polarizer 182 in order from the back side toward the observation side. The backlight 20 of the liquid crystal module 1 of this embodiment is similar to the backlight 20 of the liquid crystal module 1 of Embodiment 1.

Figures 2A, 10:
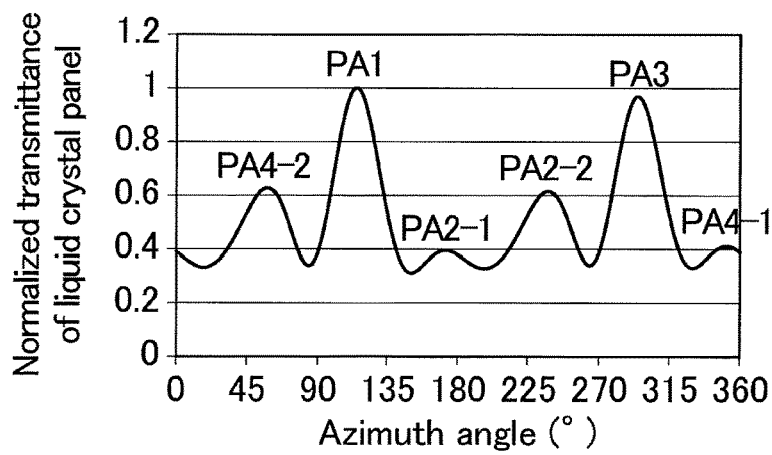

FIG. 10-1 is a schematic perspective exploded view of the liquid crystal panel of the liquid crystal module of Embodiment 4. As shown in FIG. 10-1, the absorption axis 182a of the second polarizer 182 is orthogonal to the absorption axis 110a of the first polarizer 110. In the liquid crystal layer 130, the alignment azimuth 130a of liquid crystal molecules during black display is orthogonal to the absorption axis 110*a* of the first polarizer 110. The slow axis 140*a* of the in-cell retardation layer 140 forms an angle of about 45° with respect to the absorption axis 110*a* of the first polarizer 110. The slow axis 181*a* of the out-cell retardation layer 181 is orthogonal to the slow axis 140*a* of the in-cell retardation layer 140. More specifically, assuming that the azimuth angle of the absorption axis 110*a* of the first polarizer 110 is 0°, the azimuth angle of the absorption axis 182*a* of the second polarizer 182 is approximately 90°, the azimuth angle of the alignment azimuth 130*a* of the liquid crystal molecules during black display is approximately 90°, the azimuth angle of the slow axis 140*a* of the in-cell retardation layer 140 is approximately 135°, and the azimuth angle of the slow axis 181*a* of the out-cell retardation layer 181 is approximately 45°.

Figures 2B, 10:
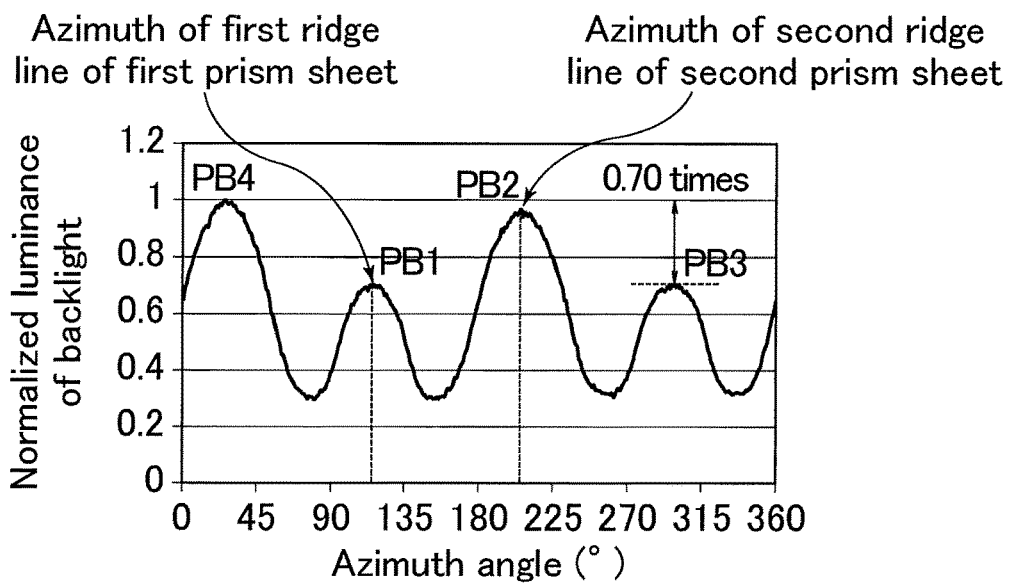
Figures 2C, 10:
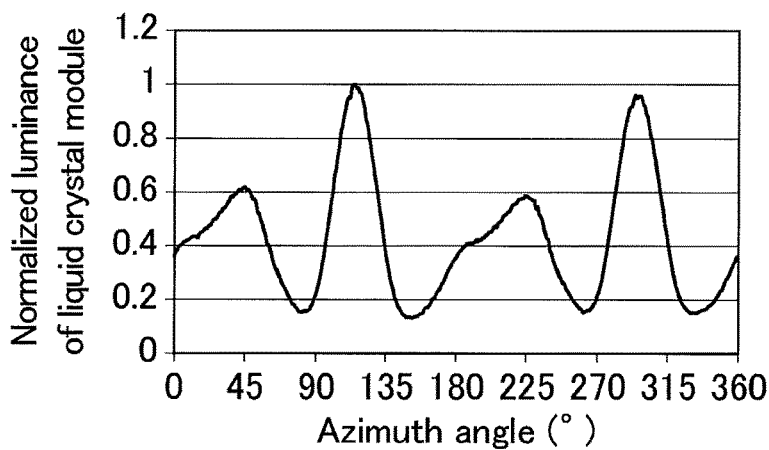

FIGS. 10-2A to 10-2C are views relating to the liquid crystal module of Embodiment 4, in which FIG. 10-2A is a graph showing an example of normalized transmittance of the liquid crystal panel during black display, FIG. 10-2B is a graph showing an example of normalized luminance of the backlight, and FIG. 10-2C is a graph showing an example of normalized luminance of the liquid crystal module during black display.

When the polar angle is large, for example, at a polar angle of 60°, in the normalized transmittance of the liquid crystal panel 10 during black display, the normalized transmittance differs depending on the azimuth angle φ as shown in FIG. 10-2A. More specifically, the normalized transmittance graph of the liquid crystal panel 10 during black display when the polar angle is large (e.g., at a polar angle of 60° or more) has two peaks (peaks PA1 and PA3) having the maximum peak transmittance, and the azimuths at which the two peaks PA1 and PA3 having the maximum peak transmittance appear form an angle of approximately 180° with each other. Furthermore, the normalized transmittance graph has two peaks PA2 (PA2-1, PA2-2) with a lower peak transmittance than the maximum peak transmittance between the azimuth at which the peak PA1 appears and the azimuth at which the peak PA3 appears counterclockwise, and has two peaks PA4 (PA4-1, PA4-2) with a lower peak transmittance than the maximum peak transmittance between the azimuth at which the peak PA3 appears and the azimuth at which the peak PA1 appears counterclockwise. The azimuths at which the peaks PA2-1 and PA4-1 appear form an angle of approximately 180° with each other, and the azimuths at which the peaks PA2-2 and PA4-2 appear form an angle of approximately 180° with each other. This is because, as described above, both the in-cell retardation layer 140 and the out-cell retardation layer 181 are A plates satisfying the relation of nx>ny≥nz.

Further, when the polar angle is large, for example, at a polar angle of 60°, the normalized luminance of the backlight 20 is as shown in FIG. 10-2B, the luminance at the azimuth of the second ridge line 220*a* of the second prism sheet 220, which is a prism sheet farther from the observation side, is higher than the luminance at the azimuth of the first ridge line 210*a* of the first prism sheet 210, which is a prism sheet on the observation side. More specifically, the normalized luminance graph of the backlight 20 when the polar angle is large (e.g., a polar angle of 60° or more) has peaks PB1 and PB3 having the minimum peak luminance in two azimuths parallel to the first ridge line 210*a* of the first prism sheet 210. Further, the normalized luminance graph has peaks PB2 and PB4 having a peak luminance higher than the minimum peak luminance (having the maximum peak luminance) in two azimuths parallel to the second ridge line 220*a* of the second prism sheet 220. Since the first ridge line 210*a* is orthogonal to the second ridge line 220*a* as described above, the peak PB2 and the peak PB4 are respectively located between the azimuth at which the peak PB1 appears and the azimuth at which the peak PB3 appears counterclockwise, and between the azimuth at which the peak PB3 appears and the azimuth at which the peak PB1 appears counterclockwise. Each of the azimuth at which the peak PB1 appears and the azimuth at which the peak PB3 appears is orthogonal to the azimuth at which the peak PB2 appears, and each of the azimuth at which the peak PB1 appears and the azimuth at which the peak PB3 appears is orthogonal to the azimuth at which the peak PB4 appears.

In this embodiment, the liquid crystal module 1 is designed to, when the polar angle is large (e.g., a polar angle is 60° or more), mutually compensate for the amplitude of the transmittance of the liquid crystal panel 10 during black display with respect to the azimuth angle and the amplitude of the luminance of the backlight 20 with respect to the azimuth angle. More specifically, the first ridge line 210*a* of the first prism sheet 210 disposed closest to the observation side is arranged so as to be parallel to the maximum transmittance azimuth of the liquid crystal panel 10 in an oblique direction during black display. Adopting such an embodiment allows the peaks (peaks PA1 and PA3) having the maximum peak transmittance in the normalized transmittance graph shown in FIG. 10-2A to be superimposed on the peaks (peaks PB1 and PB3) having the minimum peak luminance in the normalized luminance graph shown in FIG. 10-2B. That is, when the polar angle is large, the azimuth at which the liquid crystal panel 10 has a maximized transmittance during black display can be aligned to the azimuth at which the backlight 20 has a minimized peak luminance, and, as shown in FIG. 10-2C, the luminance of the liquid crystal module 1 can be suppressed at an azimuth at which the liquid crystal panel 10 has a maximized peak transmittance during black display.

Further, when the polar angle is large, in a range where the transmittance of the liquid crystal panel 10 is lower than the maximum peak transmittance during black display (in the normalized transmittance graph, between the azimuth at which the peak PA1 appears and the azimuth at which the peak PA3 appears counterclockwise, and between the azimuth at which the peak PA3 appears and the azimuth at which the peak PA1 appears counterclockwise), the azimuth at which the backlight 20 has a maximized peak luminance can be arranged, and the luminance of the liquid crystal module 1 can be increased as shown in FIG. 10-2C in a range where the transmittance of the liquid crystal panel 10 is lower than the maximum transmittance during black display. Particularly, in this embodiment, each of between the azimuth at which the peak PA1 appears and the azimuth at which the peak PA3 appears counterclockwise, and between the azimuth at which the peak PA3 appears and the azimuth at which the peak PA1 appears counterclockwise, the luminance peak of the liquid crystal module 1 corresponding to the peaks PA2-1 and PA4-1 having a lower peak transmittance can be absorbed to disappear in the luminance peak of the liquid crystal module 1 corresponding to the peaks PA2-2 and PA4-2 having a higher peak transmittance. This enables increase of the minimum peak luminance in the liquid crystal module 1.

This allows mutual compensation for the transmittance of the liquid crystal panel 10 and the luminance of the backlight 20 when the polar angle is large, suppression of the difference between the maximum peak luminance and the minimum peak luminance of the liquid crystal module 1, and suppression of variations in peak luminance of the liquid crystal module 1 that are caused depending on the azimuth angle during black display, without a negative A plate having problems in manufacturing cost and durability. Therefore, the liquid crystal module is allowed to be excellent in durability and manufacturing cost and exhibit variations in peak luminance that are caused depending on the azimuth angle during black display. Further, in this embodiment, the number of peaks in the normalized luminance graph of the liquid crystal module 1 is smaller than the number of peaks in the normalized transmittance graph of the liquid crystal panel 10. Such a decrease in the number of peaks can also be considered as suppression of variations in peak luminance that are caused depending on the azimuth angle during black display when the polar angle is large.

In the liquid crystal module 1 of this embodiment, when the azimuth angle of the absorption axis 110a of the first polarizer 110 is 0°, the azimuth angle α of the first ridge line 210a is desirably 110° or more and 120° or less, more desirably 112° or more and 118° or less, and even more desirably 115°. In this embodiment provided with the right circularly polarizing plate, the maximum transmittance azimuth angle of the liquid crystal panel 10 can be 115° during black display. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the above range. This enables suppression of variations in peak luminance that are caused depending on the azimuth angle during black display when the polar angle is large, for the liquid crystal module 1 having the right circularly polarizing plate.

The peak transmittance ratio of the liquid crystal panel 10 in this embodiment is desirably 0.35 or more and 0.65 or less, and more desirably 0.4 or more and 0.6 or less.

The peak luminance ratio of the backlight 20 in this embodiment is desirably 0.60 or more and 0.80 or less, and more desirably 0.65 or more and 0.75 or less.

Fifth Embodiment

In this embodiment, a more specific and suitable embodiment of the liquid crystal panel 10 of the liquid crystal module 1 of Embodiment 1 will be described. The liquid crystal module of this embodiment has a similar configuration to the liquid crystal module 1 of Embodiment 4 except that the slow axes of the in-cell retardation layer and the out-cell retardation layer of the liquid crystal panel are arranged differently, and the circularly polarizing plate 180 is a left circularly polarizing plate.

FIG. 11 is a schematic perspective exploded view of a liquid crystal panel of the liquid crystal module of Embodiment 5. As shown in FIG. 11, the absorption axis 182a of the second polarizer 182 is orthogonal to the absorption axis 110a of the first polarizer 110. In the liquid crystal layer 130, the alignment azimuth 130a of liquid crystal molecules during black display is orthogonal to the absorption axis 110a of the first polarizer 110. The slow axis 140a of the in-cell retardation layer 140 forms an angle of about 45° with respect to the absorption axis 110a of the first polarizer 110. The slow axis 181a of the out-cell retardation layer 181 is orthogonal to the slow axis 140a of the in-cell retardation layer 140. More specifically, assuming that the azimuth angle of the absorption axis 110a of the first polarizer 110 is 0°, the azimuth angle of the absorption axis 182a of the second polarizer 182 is approximately 90°, the azimuth angle of the alignment azimuth 130a of the liquid crystal molecules during black display is approximately 90°, the azimuth angle of the slow axis 140a of the in-cell retardation layer 140 is approximately 45°, and the azimuth angle of the slow axis 181a of the out-cell retardation layer 181 is approximately 135°.

Adopting such an embodiment allows, when the polar angle is large (e.g., a polar angle of 60° or more), the azimuth at which the liquid crystal panel 10 has a maximized transmittance during black display to be aligned to the azimuth at which the backlight 20 has a minimized peak luminance. Therefore, the luminance of the liquid crystal module 1 can be suppressed at the azimuth at which the liquid crystal panel 10 has a maximized peak transmittance during black display. Furthermore, when the polar angle is large, the luminance of the liquid crystal module 1 can be increased in a range where the transmittance of the liquid crystal panel 10 is lower than the maximum transmittance during black display. This allows mutual compensation for the transmittance of the liquid crystal panel 10 and the luminance of the backlight 20 when the polar angle is large, suppression of the difference between the maximum peak luminance and the minimum peak luminance of the liquid crystal module 1, and suppression of variations in peak luminance of the liquid crystal module 1 that are caused depending on the azimuth angle during black display, without a negative A plate having problems in manufacturing cost and durability. Therefore, the liquid crystal module that is allowed to be excellent in durability and manufacturing cost and exhibit variations in peak luminance that are caused depending on the azimuth angle during black display when the polar angle is large.

In the liquid crystal module 1 of this embodiment, when the azimuth angle of the absorption axis 110a of the first polarizer 110 is 0°, the azimuth angle α of the first ridge line 210a is desirably 60° or more and 70° or less, more desirably 62° or more and 68° or less, and even more desirably 65°. In this embodiment provided with the left circularly polarizing plate, the maximum transmittance azimuth angle of the liquid crystal panel 10 can be 65° during black display. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the above range. This enables suppression of variations in peak luminance that are caused depending on the azimuth angle during black display when the polar angle is large, for the liquid crystal module 1 having the left circularly polarizing plate.

Hereinafter, the present invention will be described in more detail with reference to examples and comparative examples, but the present invention is not limited by these examples.

Examples 1-1 to 1-4

Figure 12A:
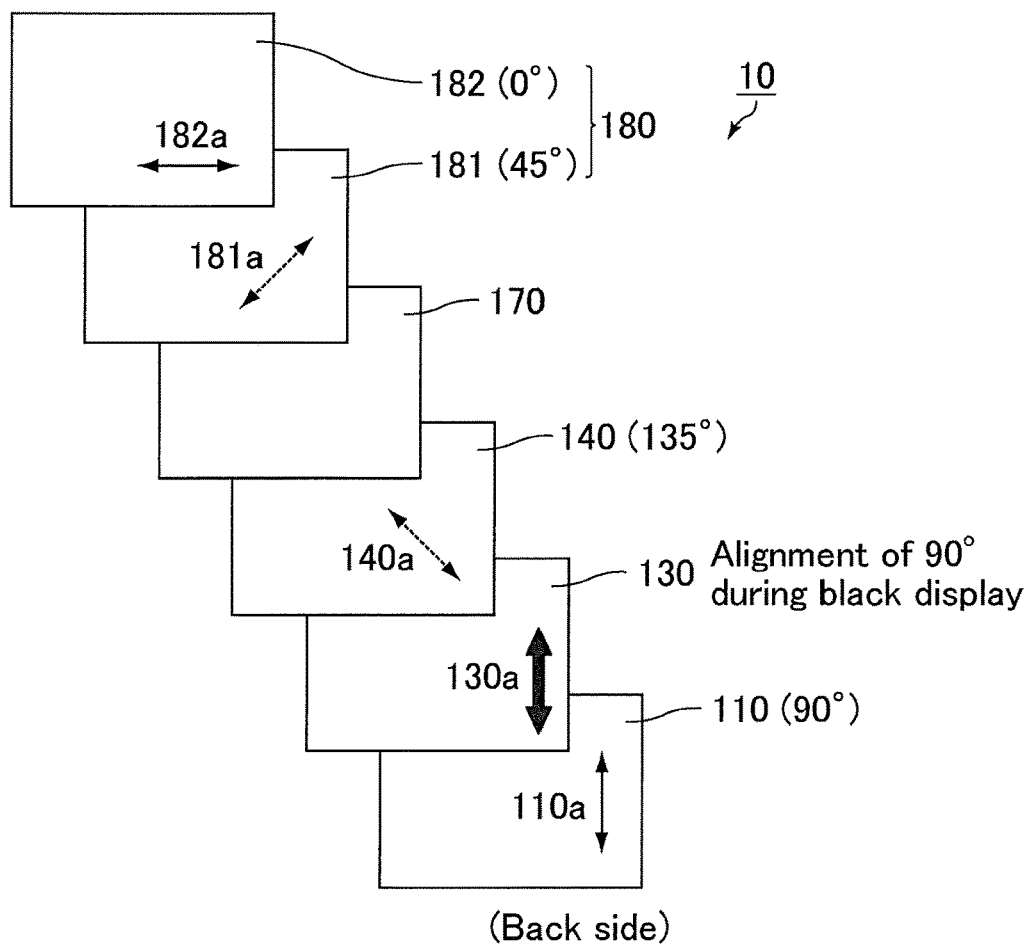
Figure 12B:
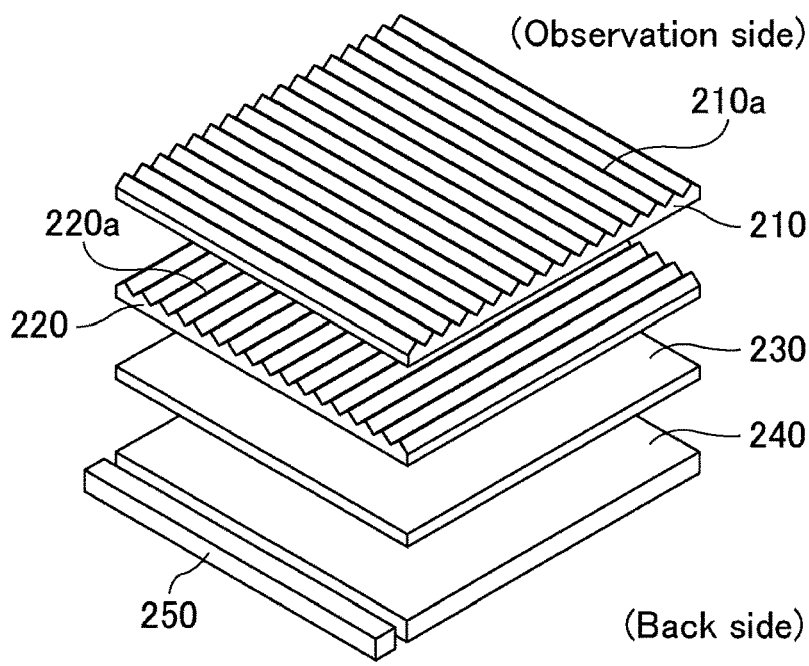

In Examples 1-1 to 1-4, a liquid crystal module having a configuration corresponding to that of Embodiment 2 was produced. FIGS. 12A and 12B are views relating to a liquid crystal module of Examples 1-1 to 1-4, in which FIG. 12A is a schematic perspective exploded view of a liquid crystal panel of Examples 1-1 to 1-4, and FIG. 12B is a schematic cross-sectional view of a backlight of Examples 1-1 to 1-4. Details will be described below. In Examples 1-1 to 1-4, the absorption axis of the second polarizer was set as the azimuth angle reference (0°).

(Liquid Crystal Panel of Examples 1-1 to 1-4)

As shown in FIG. 12A, in the liquid crystal panel 10 of Examples 1-1 to 1-4, the azimuth angle of the absorption axis 182a of the second polarizer 182 was set as 0°, the azimuth angle of the absorption axis 110a of the first polarizer 110 was set as 90°, the azimuth angle of the alignment azimuth 130a of the liquid crystal molecules during black display was set as 90°, the azimuth angle of the slow axis 140a of the in-cell retardation layer 140 was set as 135°, and the azimuth angle of the slow axis 181a of the out-cell retardation layer 181 was set as 45°. In the liquid crystal panel 10 of Examples 1-1 to 1-4, the circularly polarizing plate 180 including the out-cell retardation layer 181 and the second polarizer 182 was a left circularly polarizing plate. In the liquid crystal panel 10 of Examples 1-1 to 1-4, the in-plane retardation and the NZ coefficient of the out-cell retardation layer 181, the thickness retardation of the positive C plate 170, and the in-plane retardation and the NZ coefficient of the in-cell retardation layer 140 was set as shown in the following Table 1. The in-plane retardation of the positive C plate 170 was set to 0 nm.

TABLE 1

| | | Example 1-1 | Example 1-2 | Example 1-3 | Example 1-4 |
|---|---|---|---|---|---|
| Out-cell retardation layer | In-plane retardation | 140 nm | | | |
| | NZ coefficient | 1.2 | 1.4 | 1.6 | 1.8 |
| Positive C plate | Thickness retardation | 135 nm | 160 nm | 180 nm | 205 nm |
| In-cell retardation layer | In-plane retardation | 140 nm | | | |
| | NZ coefficient | 1.0 | | | |

With the azimuth angle of the absorption axis 182a of the second polarizer 182 set as 0°, the azimuth angle at which the transmittance during black display is maximized (hereinafter also referred to as maximum transmittance azimuth angle) when the polar angle was set to 60° was simulated using LCD-Master manufactured by Shintech Co., Ltd. for each of the liquid crystal panels 10 of Examples 1-1 to 1-4. The results are shown in Table 2 below.

TABLE 2

| | Example 1-1 | Example 1-2 | Example 1-3 | Example 1-4 |
|---|---|---|---|---|
| Maximum transmittance azimuth angle | 52° | 54° | 56° | 58° |

The results in Table 2 show that the maximum transmittance azimuth angle during black display varies depending on the value of the NZ coefficient. Linear approximation based on the results in Table 2 shows that the relationship of the following Equation A:

$$\delta = 10\beta + 40 \quad \text{(Equation A)}$$

(wherein δ represents the maximum transmittance azimuth angle during black display and β represents the NZ coefficient) is satisfied with the polar angle set to 60°.

(Backlight of Examples 1-1 to 1-4)

Next, the configuration of the backlight of each of Examples 1-1 to 1-4 will be described. As shown in FIG. 12B, in Examples 1-1 to 1-4, the backlight 20 used includes the first prism sheet 210, the second prism sheet 220, the diffusion sheet 230, and the light guide plate 240 arranged in order from the observation side, and an LED is disposed as the light source 250 on a side surface of the light guide plate 240.

Figure 13:
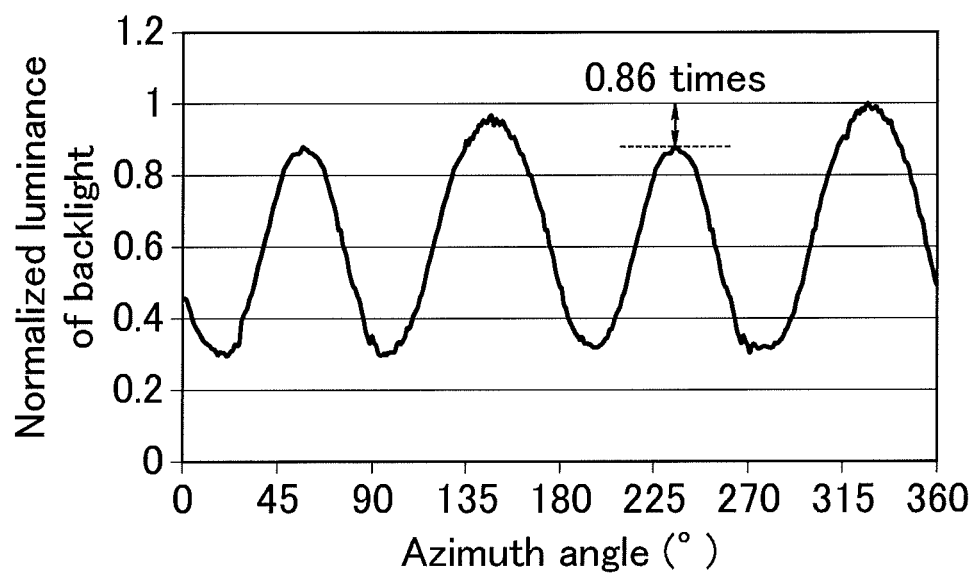
FIG. 13 is a graph showing the result of simulating the normalized luminance of the backlight of the liquid crystal module of Examples 1-1 to 1-4.

FIG. 13 is a graph showing the result of simulating the normalized luminance of the backlight of the liquid crystal module of Examples 1-1 to 1-4. As shown in FIG. 13, in the backlight of the liquid crystal module of Examples 1-1 to 1-4, the peak luminance ratio at a polar angle θ=60° was 0.86 times.

The result of simulating the normalized transmittance of the liquid crystal panel, the result of simulating the normalized luminance of the backlight, and the result of simulating the liquid crystal module that are shown in this specification are all the results of the simulation performed at a polar angle of 60°.

(Liquid Crystal Module of Examples 1-1 to 1-4)

The liquid crystal panel 10 and the backlight 20 were arranged and the liquid crystal module of each of Examples 1-1 to 1-4 was set such that the maximum transmittance azimuth of the liquid crystal panel 10 of each of Examples 1-1 to 1-4 during black display when the polar angle was set to 60° was parallel to the first ridge line 210a of the first prism sheet 210 in the backlight 20 of each of Examples 1-1 to 1-4. That is, the liquid crystal module of Examples 1-1 to 1-4 was set such that the azimuth angle α of the first ridge line 210a satisfied the following Equation B. In the following, δ represents the maximum transmittance azimuth angle of the liquid crystal panel 10.

$$\alpha = \delta = 10\beta + 40 \quad \text{(Equation B)}$$

(Liquid Crystal Module of Example 1-3)

Figure 14A:
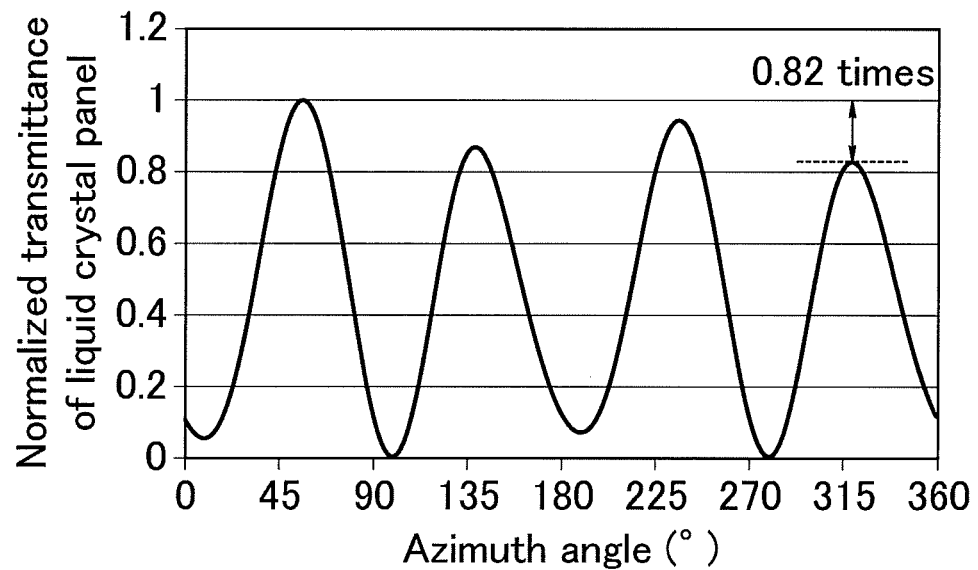
Figure 14B:
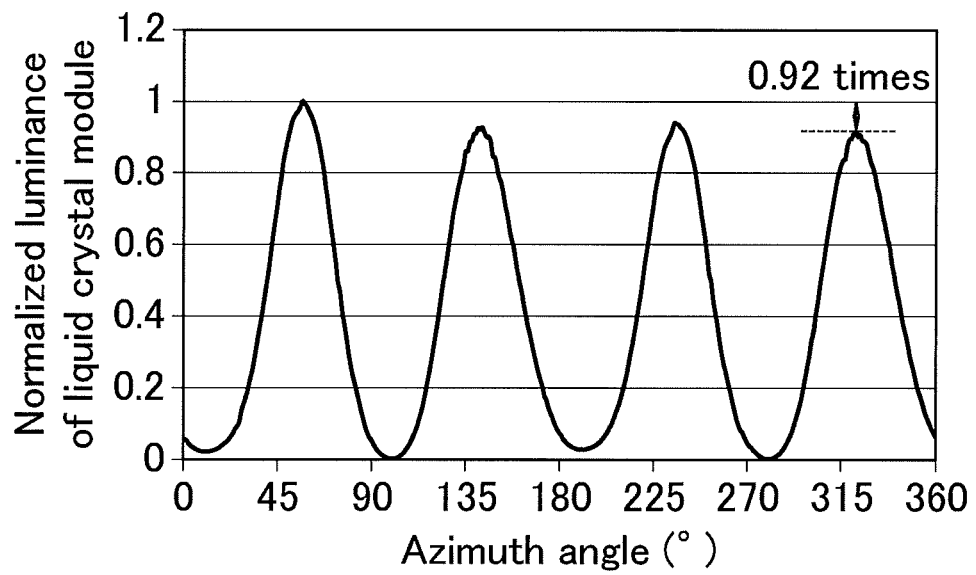

The luminance of the liquid crystal module of Example 1-3 in which the NZ coefficient of the out-cell retardation layer is 1.6 will be described in detail below. FIGS. 14A and 14B are views relating to a liquid crystal module of Example 1-3, in which FIG. 14A is a graph showing the result of simulating the normalized transmittance during black display of the liquid crystal panel, and FIG. 14B is a graph showing the result of simulating the normalized luminance during black display of the liquid crystal module.

As shown in FIG. 14A, the peak transmittance ratio of the liquid crystal panel 10 of Example 1-3 was 0.82 times. On the other hand, the peak luminance ratio was 0.92 times in the liquid crystal module of Example 1-3 arranged with the liquid crystal panel 10 and the backlight 20 such that the maximum transmittance azimuth angle (56°) during black display of the liquid crystal panel 10 of Example 1-3 was parallel to the first ridge line 210a of the first prism sheet 210. From the above, by arranging the first ridge line 210a of the first prism sheet 210 disposed closest to the observation side to be parallel to the azimuth at which the liquid crystal panel 10 has a maximized transmittance in an oblique direction during black display, variations in peak luminance of the liquid crystal module 1 that are caused depending on the azimuth angle during black display can be suppressed without a negative A plate having problems in manufacturing cost and durability. This allows the liquid crystal module to be excellent in durability and manufacturing cost and exhibit variations in peak luminance that are caused depending on the azimuth angle during black display when the polar angle is large. For the liquid crystal module of Examples 1-1 to 1-2 and 1-4, a similar effect to that of the liquid crystal module of Example 1-3 can be obtained.

Examples 2-1 to 2-4

Figure 15:
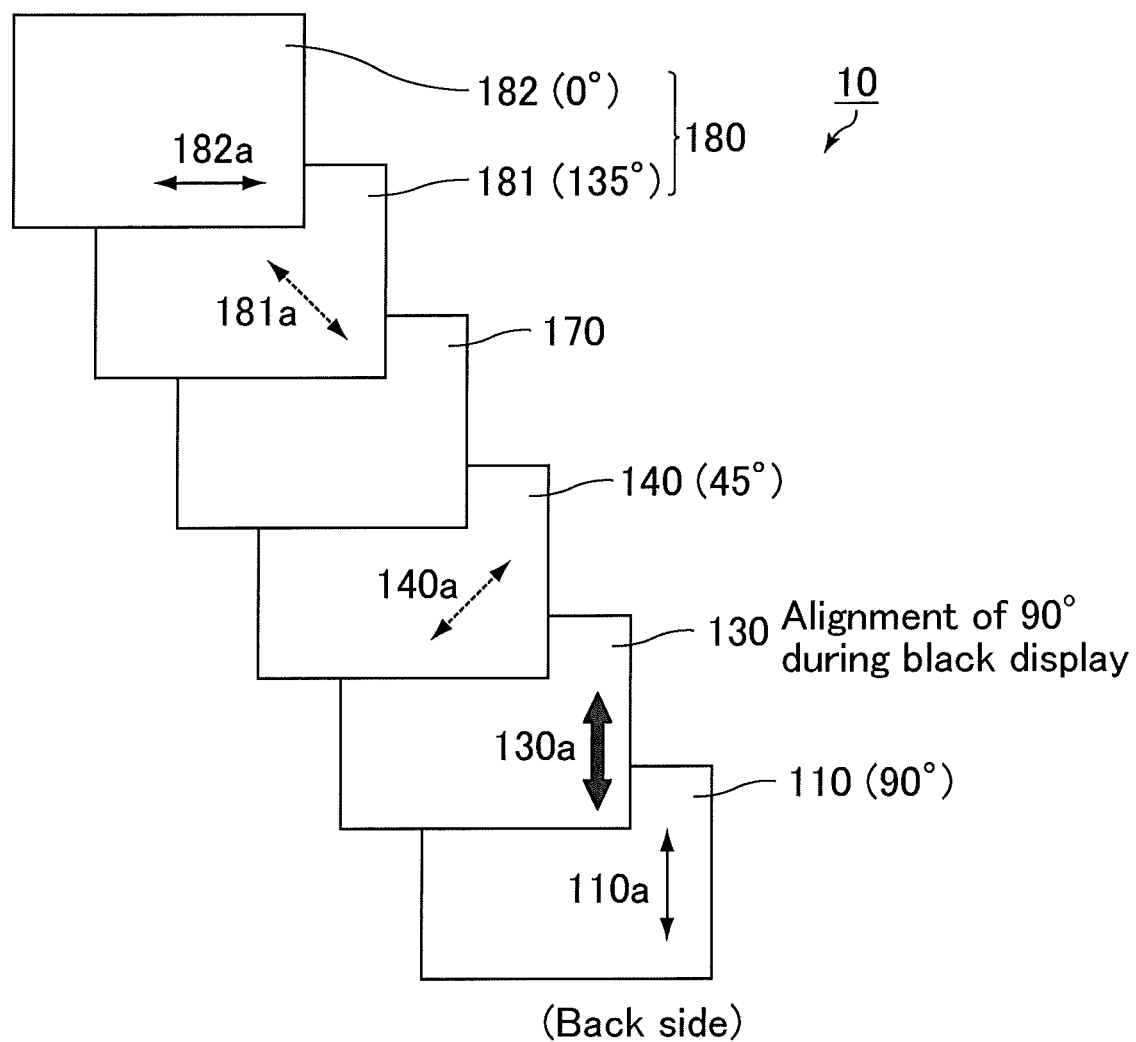
FIG. 15 is a schematic perspective exploded view of a liquid crystal panel of a liquid crystal module of Examples 2-1 to 2-4.

In Examples 2-1 to 2-4, a liquid crystal module having a configuration corresponding to that of Embodiment 3 was produced. Details will be described below. In Examples 2-1 to 2-4, the absorption axis of the second polarizer was set as the azimuth angle reference (0°).
(Liquid Crystal Panel of Examples 2-1 to 2-4)
FIG. 15 is a schematic perspective exploded view of the liquid crystal panel of the liquid crystal module of Examples 2-1 to 2-4. The Liquid crystal panel 10 of each of Examples 2-1 to 2-4 was set in the same manner as in the liquid crystal panel 10 of Examples 1-1 to 1-4, except that the azimuth angle of the slow axis 181a of the out-cell retardation layer 181 was set as 135° and the azimuth angle of the slow axis 140a of the in-cell retardation layer 140 was set as 45° as shown in FIG. 15. In the liquid crystal panel 10 of each of Examples 2-1 to 2-4, the circularly polarizing plate 180 including the out-cell retardation layer 181 and the second polarizer 182 was a right circularly polarizing plate. In the liquid crystal panel 10 of each of Examples 2-1 to 2-4, the in-plane retardation and the NZ coefficient of the out-cell retardation layer 181, the thickness retardation of the positive C plate 170, and the in-plane retardation and the NZ coefficient of the in-cell retardation layer 140 were set as shown in the following Table 3. The in-plane retardation of the positive C plate 170 was set to 0 nm.

TABLE 3

|  |  | Example 2-1 | Example 2-2 | Example 2-3 | Example 2-4 |
|---|---|---|---|---|---|
| Out-cell retardation layer | In-plane retardation | 140 nm | | | |
| | NZ coefficient | 1.2 | 1.4 | 1.6 | 1.8 |
| Positive C plate | Thickness retardation | 135 nm | 160 nm | 180 nm | 205 nm |
| In-cell retardation layer | In-plane retardation | 140 nm | | | |
| | NZ coefficient | 1.0 | | | |

With the azimuth angle of the absorption axis 182a of the second polarizer 182 set as 0°, the maximum transmittance azimuth angle during black display when the polar angle was set to 60° was simulated using LCD-Master manufactured by Shintech Co., Ltd. for each of the liquid crystal panels 10 of Examples 2-1 to 2-4. The results are shown in Table 4 below.

TABLE 4

|  | Example 2-1 | Example 2-2 | Example 2-3 | Example 2-4 |
|---|---|---|---|---|
| Maximum transmittance azimuth angle | 128° | 126° | 124° | 122° |

The results in Table 4 show that the maximum transmittance azimuth angle during black display varies depending on the value of the NZ coefficient. Linear approximation based on the results in Table 4 shows that the relationship of the following Equation C:

$$\delta = -10\beta + 140 \quad \text{(Equation C)}$$

(wherein δ represents the maximum transmittance azimuth angle during black display is and β represents the NZ coefficient) is satisfied with the polar angle set to 60°.

For the above Equation C derived from the liquid crystal panels 10 of Examples 2-1 to 2-4 and the Equation A derived from Examples 1-1 to 1-4, the absolute values of the inclinations are the same as each other while the positive/negative signs of the inclinations are different from each other, and the intercepts are 140 (Equation C) and 40 (Equation A). Thus, it was found that the Equations A and C are symmetric with respect to the straight line of y=90.
(Liquid Crystal Module of Examples 2-1 to 2-4)
A similar effect to that of the liquid crystal module of Example 1-3 can be obtained by arranging the liquid crystal panel 10 and the backlight 20 such that the maximum transmittance azimuth of the liquid crystal panel 10 of each of Examples 2-1 to 2-4 during black display when the polar angle was set to 60° was parallel to the first ridge line 210a of the first prism sheet 210 in the backlight 20 of each of Examples 1-1 to 1-4, that is, such that the azimuth angle α of the first ridge line 210a satisfies the following Equation D to make the liquid crystal module of each of Examples 2-1 to 2-4.

$$\alpha = \delta = -10\beta + 140 \quad \text{(Equation D)}$$

Examples 3-1 to 3-5

Figure 16:
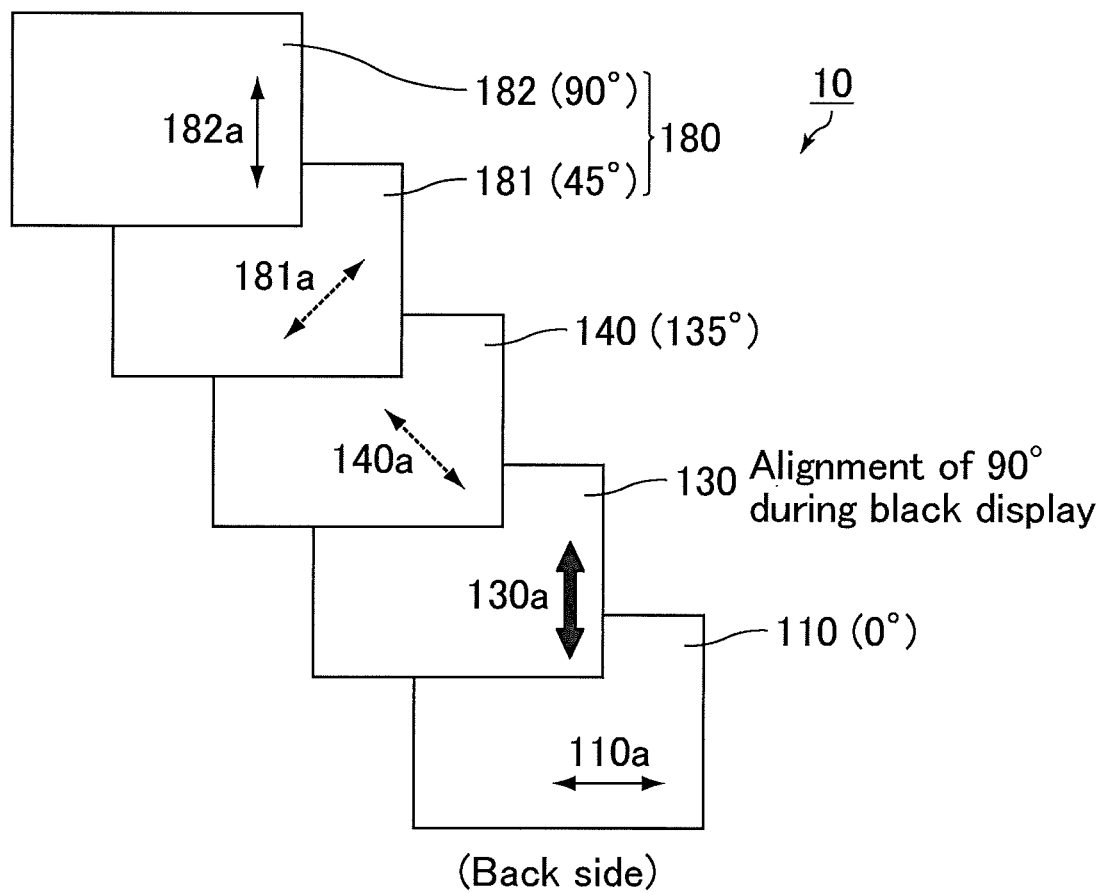
FIG. 16 is a schematic perspective exploded view of a liquid crystal panel of a liquid crystal module of Examples 3-1 to 3-5.

In Examples 3-1 to 3-5, a liquid crystal module having a configuration corresponding to that of Embodiment 4 was produced. Details will be described below. In Examples 3-1 to 3-5, the absorption axis of the first polarizer was set as the azimuth angle reference (0°).
(Liquid Crystal Panel of Examples 3-1 to 3-5)
FIG. 16 is a schematic perspective exploded view of the liquid crystal panel of the liquid crystal module of Examples 3-1 to 3-5. As shown in FIG. 16, in the liquid crystal panel 10 of each of Examples 3-1 to 3-5, the azimuth angle of the absorption axis 110a of the first polarizer 110 was set as 0°, the azimuth angle of the absorption axis 182a of the second polarizer 182 was set as 90°, the azimuth angle of the alignment azimuth 130a of the liquid crystal molecules during black display was set as 90°, the azimuth angle of the slow axis 140a of the in-cell retardation layer 140 was set as 135°, and the azimuth angle of the slow axis 181a of the out-cell retardation layer 181 was set as 45°. In the liquid crystal panel 10 of each of Examples 3-1 to 3-5, the circularly polarizing plate 180 including the out-cell retardation layer 181 and the second polarizer 182 was a right circularly polarizing plate. In the liquid crystal panel of each of Examples 3-1 to 3-5, the in-plane retardation and the NZ coefficient of the out-cell retardation layer 181, the thickness retardation of the positive C plate 170, and the in-plane retardation and the NZ coefficient of the in-cell retardation layer 140 were set as shown in the following Table 5.

TABLE 5

|  |  | Example 3-1 | Example 3-2 | Example 3-3 | Example 3-4 | Example 3-5 |
|---|---|---|---|---|---|---|
| Out-cell retardation layer | In-plane retardation |  |  | 140 nm |  |  |
|  | NZ coefficient | 1.0 | 1.2 | 1.4 | 1.6 | 1.8 |
| In-cell retardation layer | In-plane retardation |  |  | 140 nm |  |  |
|  | NZ coefficient |  |  | 1.0 |  |  |

With the azimuth angle of the absorption axis 110a of the first polarizer 110 set as 0°, the maximum transmittance azimuth angle during black display when the polar angle was set to 60° was simulated using LCD-Master manufactured by Shintech Co., Ltd. for each of the liquid crystal panels 10 of Examples 3-1 to 3-5. The results are shown in Table 6 below.

TABLE 6

|  | Example 3-1 | Example 3-2 | Example 3-3 | Example 3-4 | Example 3-5 |
|---|---|---|---|---|---|
| Maximum transmittance azimuth angle |  |  | 115° |  |  |

The results in Table 6 show that the maximum transmittance azimuth angle (δ) during black display does not vary depending on the value of the NZ coefficient.

(Backlight of Examples 3-1 to 3-5)

Figure 17:
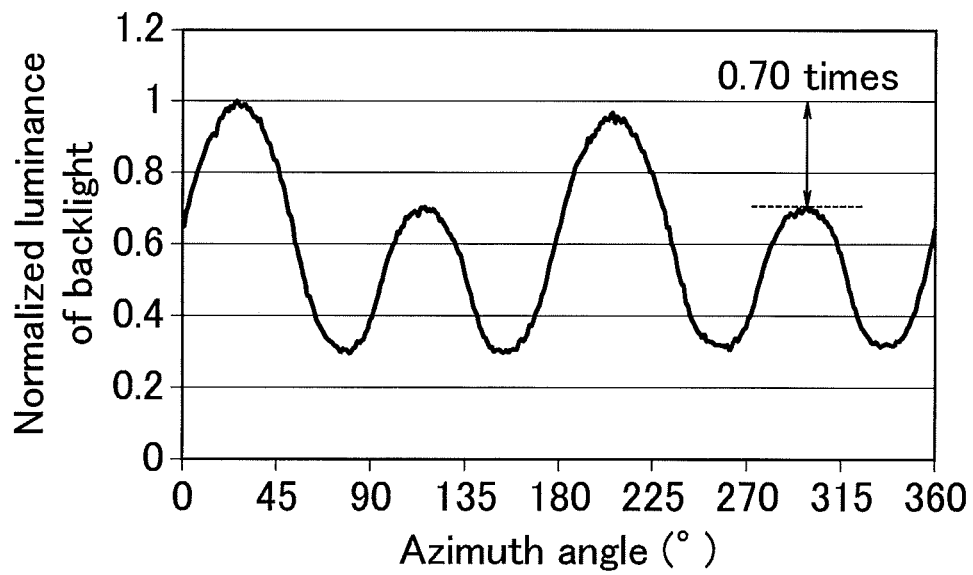
FIG. 17 is a graph showing the result of simulating the normalized luminance of a backlight of the liquid crystal module of Examples 3-1 to 3-5.

Next, the configuration of the backlight of each of Examples 3-1 to 3-5 will be described. FIG. 17 is a graph showing the result of simulating the normalized luminance of the backlight of the liquid crystal module of Examples 3-1 to 3-5. As shown in FIG. 17, the backlight of each of Examples 3-1 to 3-5 was designed in the same manner as the backlight of each of Examples 1-1 to 1-4, except that the peak luminance ratio was 0.70 times.

(Liquid Crystal Module of Examples 3-1 to 3-5)

The liquid crystal panel 10 and the backlight 20 were arranged and the liquid crystal module of each of Examples 3-1 to 3-5 was set such that the maximum transmittance azimuth of the liquid crystal panel 10 of each of Examples 3-1 to 3-5 during black display when the polar angle was set to 60° was parallel to the first ridge line 210a of the first prism sheet 210 in the backlight 20 of each of Examples 3-1 to 3-5, that is, such that the azimuth angle α of the first ridge line 210a was 115°.

(Liquid Crystal Module of Example 3-4)

Figure 18A:
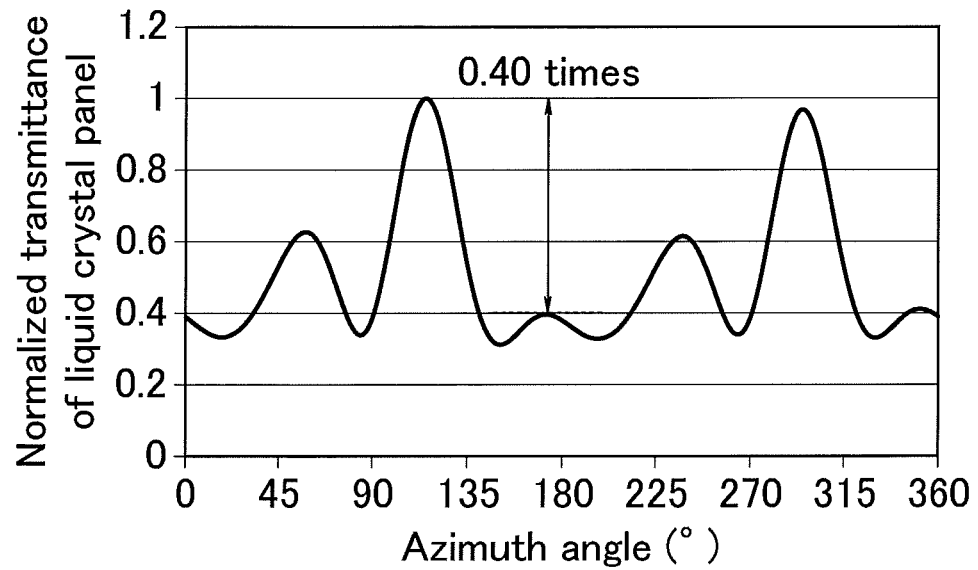
Figure 18B:
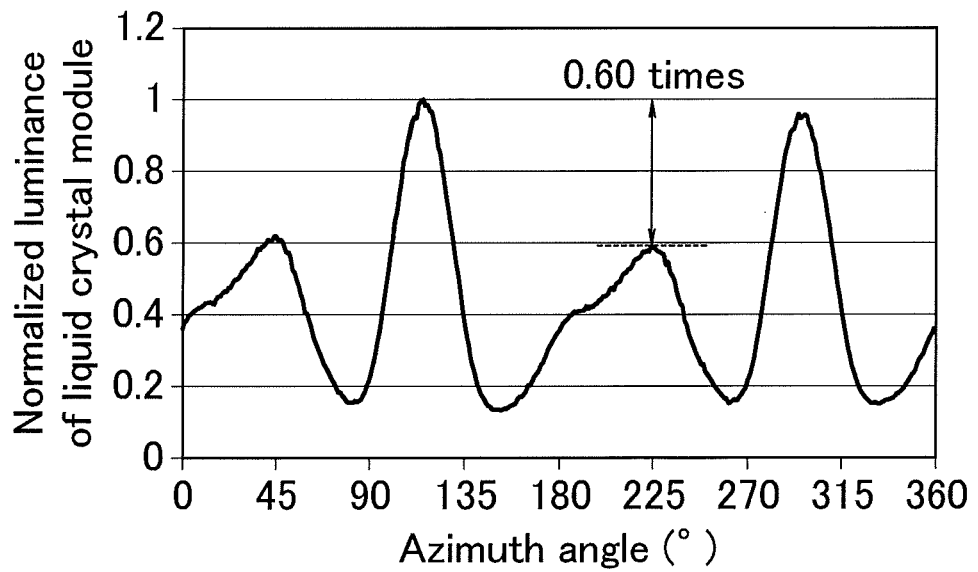

The luminance of the liquid crystal module of Example 3-4 in which the NZ coefficient of the out-cell retardation layer is 1.6 will be described in detail below. FIGS. 18A and 18B are views relating to the liquid crystal module of Example 3-4, in which FIG. 18A is a graph showing the result of simulating the normalized transmittance during black display of the liquid crystal panel, and FIG. 18B is a graph showing the result of simulating the normalized luminance during black display of the liquid crystal module. Table 7 below shows the normalized transmittance of the liquid crystal panel 10 and the normalized luminance of the liquid crystal module at azimuth angles of 0° and 180°, and the ratio (T) of the normalized transmittance (or normalized luminance) at an azimuth angle of 0° to the normalized transmittance (or normalized luminance) at an azimuth angle of 180°.

TABLE 7

|  | Normalized transmittance of liquid crystal panel | Normalized luminance of liquid crystal module |
|---|---|---|
| Azimuth angle 0° | 0.390 | 0.360 |
| Azimuth angle 180° | 0.380 | 0.355 |
| T | 1.026 | 1.014 |

As shown in FIG. 18A, the peak transmittance ratio of the liquid crystal panel 10 of each of Example 3-4 was 0.40 times. On the other hand, the peak luminance ratio was 0.60 times in the liquid crystal module of Example 3-4 arranged with the liquid crystal panel 10 and the backlight 20 such that the maximum transmittance azimuth angle (56°) during black display of the liquid crystal panel 10 of Example 3-4 was parallel to the first ridge line 210a of the first prism sheet 210. From the above, by arranging the first ridge line 210a of the first prism sheet 210 disposed closest to the observation side to be parallel to the azimuth at which the liquid crystal panel 10 has a maximized transmittance in an oblique direction during black display, variations in peak luminance of the liquid crystal module 1 that are caused depending on the azimuth angle during black display when the polar angle is large can be suppressed without a negative A plate having problems in manufacturing cost and durability. This allows the liquid crystal module of be excellent in durability and manufacturing cost and exhibit variations in peak luminance that are caused depending on the azimuth angle during black display when the polar angle is large.

Further, as shown in FIGS. 18A and 18B and Table 7, in the liquid crystal panel 10 of Example 3-4, the ratio (T) of the normalized transmittance at an azimuth angle of 0° to the normalized transmittance at an azimuth angle of 180° was 1.026. On the other hand, in the liquid crystal module of Example 3-4, the ratio (T) of the normalized luminance at an azimuth angle of 0° to the normalized luminance at an azimuth angle of 180° was 1.014. From the above, the liquid crystal module of Example 3-4 can improve the appearance by reducing the luminance difference in the right-left direction during black display, without a negative A plate having problems in manufacturing cost and durability. Since the directions of azimuth angles of 0° and 180° are directions that are relatively easy to incline in using a portable device such as a smartphone, improvement of the viewing angle characteristics at azimuth angles of 0° and 180° is considered to be desirable.

Examples 4-1 to 4-5

Figure 19:
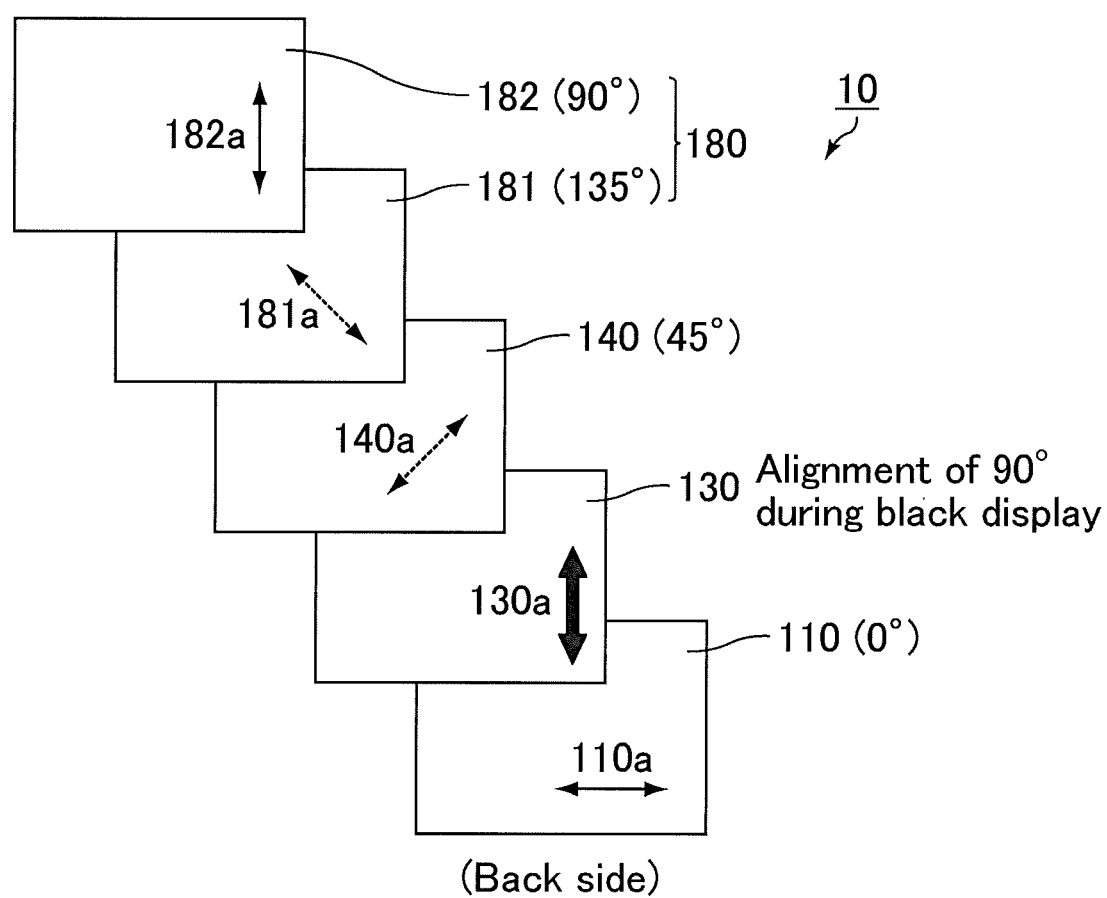
FIG. 19 is a schematic perspective exploded view of a liquid crystal panel of a liquid crystal module of Examples 4-1 to 4-5.
Figure 20:
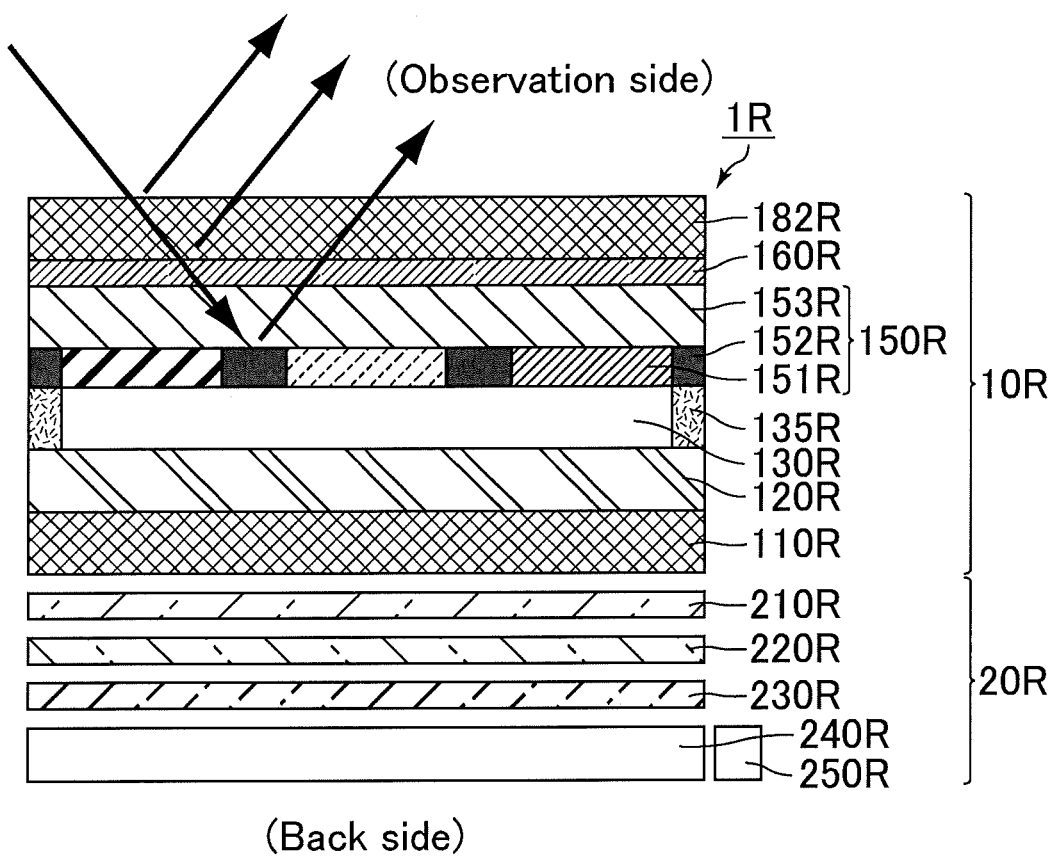
FIG. 20 is a schematic cross-sectional view of a liquid crystal module of Comparative Embodiment 1.
Figure 22A:
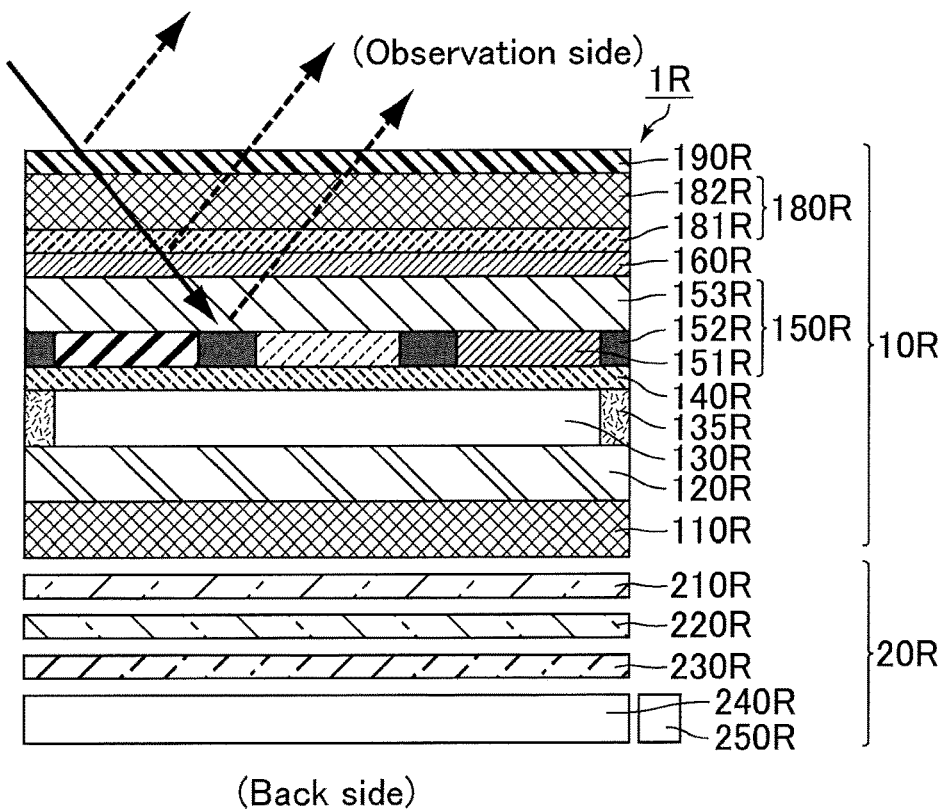
Figure 22B:
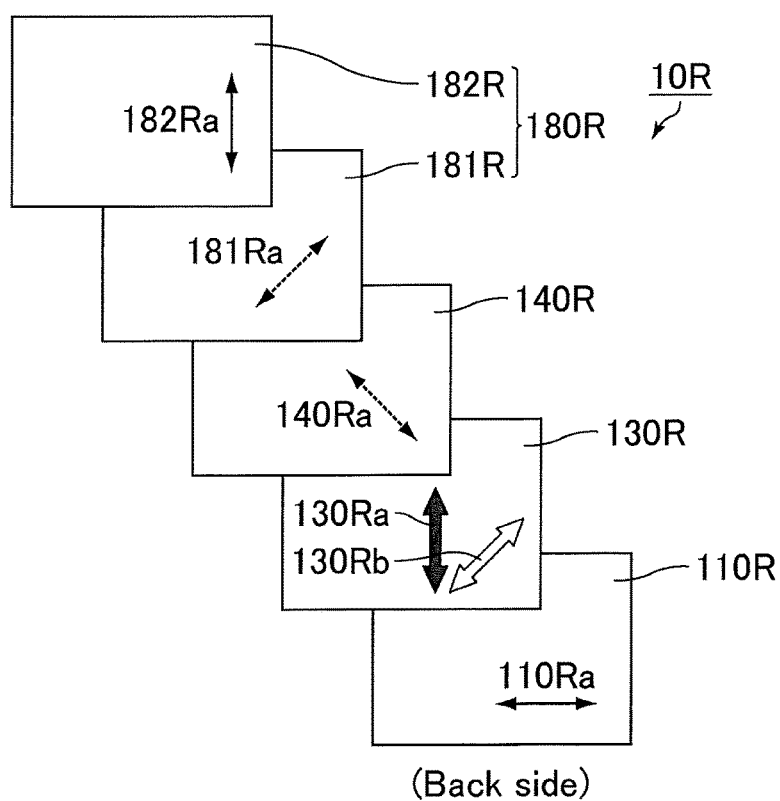
Figure 23:
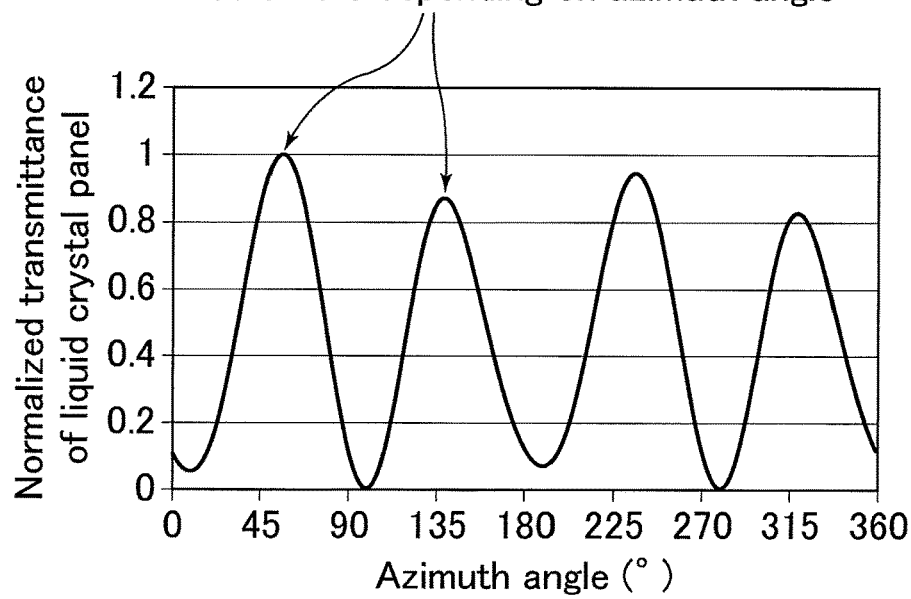
FIG. 23 is a graph showing the result of simulating the normalized transmittance during black display of a liquid crystal panel of the liquid crystal module of Comparative Embodiment 3.

In Examples 4-1 to 4-5, a liquid crystal module having a configuration corresponding to that of Embodiment 5 was produced. Details will be described below. In Examples 4-1 to 4-5, the absorption axis of the first polarizer was set as the azimuth angle reference (0°).
(Liquid Crystal Panel of Examples 4-1 to 4-5)
FIG. 19 is a schematic perspective exploded view of the liquid crystal panel of the liquid crystal module of Examples 4-1 to 4-5. The Liquid crystal panel 10 of each of Examples 4-1 to 4-5 was set in the same manner as in the liquid crystal panel 10 of each of Examples 3-1 to 3-5, except that the azimuth angle of the slow axis 181a of the out-cell retardation layer 181 was set as 135° and the azimuth angle of the slow axis 140a of the in-cell retardation layer 140 was set as 45° as shown in FIG. 19. In the liquid crystal panel 10 of Examples 4-1 to 4-5, the circularly polarizing plate 180 including the out-cell retardation layer 181 and the second polarizer 182 was a left circularly polarizing plate. In the liquid crystal panel 10 of each of Examples 4-1 to 4-5, the in-plane retardation and the NZ coefficient of the out-cell retardation layer 181, the thickness retardation of the positive C plate 170, and the in-plane retardation and the NZ coefficient of the in-cell retardation layer 140 were set as shown in the following Table 8.

TABLE 8

|  |  | Example 4-1 | Example 4-2 | Example 4-3 | Example 4-4 | Example 4-5 |
|---|---|---|---|---|---|---|
| Out-cell retardation layer | In-plane retardation | | | 140 nm | | |
|  | NZ coefficient | 1.0 | 1.2 | 1.4 | 1.6 | 1.8 |
| In-cell retardation layer | In-plane retardation | | | 140 nm | | |
|  | NZ coefficient | | | 1.0 | | |

With the azimuth angle of the absorption axis 110a of the first polarizer 110 set as 0°, the maximum transmittance azimuth angle during black display when the polar angle was set to 60° as simulated using LCD-Master manufactured by Shintech Co., Ltd. for each of the liquid crystal panels 10 of Examples 4-1 to 4-5. The results are shown in Table 9 below.

TABLE 9

|  | Example 4-1 | Example 4-2 | Example 4-3 | Example 4-4 | Example 4-5 |
|---|---|---|---|---|---|
| Maximum transmittance azimuth angle | | | 65° | | |

The results in Table 9 show that the maximum transmittance azimuth angle during black display does not vary depending on the value of the NZ coefficient. In addition, it was found that, when the polar angle was set to 60°, the maximum transmittance azimuth angle 115° during black display of the liquid crystal panel 10 of each of Examples 3-1 to 3-5 and the maximum transmittance azimuth angle 65° during black display of the liquid crystal panel of each of Examples 4-1 to 4-5 were mutually line-symmetrical with respect to the straight line connecting 90° and 270°. This relationship was similar to the relationship between Equation A derived from Examples 1-1 to 1-4 and Equation C derived from Examples 2-1 to 2-4.
(Liquid Crystal Module of Examples 4-1 to 4-5)
A similar effect to that of the liquid crystal module of Example 3-4 can be obtained by arranging the liquid crystal panel 10 and the backlight 20 such that the maximum transmittance azimuth of the liquid crystal panel 10 of each of Examples 4-1 to 4-5 during black display when the polar angle was set to 60° was parallel to the first ridge line 210a of the first prism sheet 210 in the backlight 20 of each of Examples 3-1 to 3-5, that is, such that the azimuth angle α of the first ridge line 210a becomes 65°, to make the liquid crystal module of each of Examples 4-1 to 4-5.

Comparative Example 1

Figure 24:
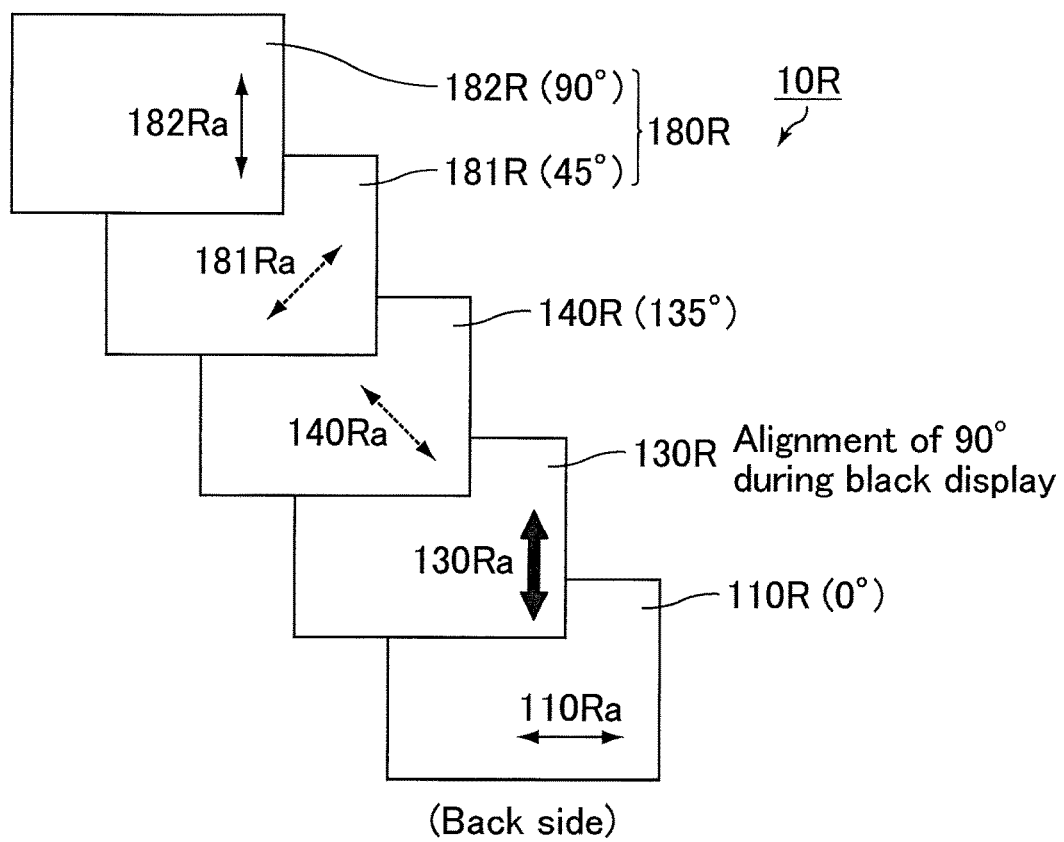
FIG. 24 is a schematic perspective exploded view of a liquid crystal panel of a liquid crystal module of Comparative Example 1.

Details of Comparative Example 1 will be described below. In Comparative Example 1, the absorption axis of the first polarizer was set as the azimuth angle reference (0°).
(Liquid Crystal Panel of Comparative Example 1)
FIG. 24 is a schematic perspective exploded view of a liquid crystal panel of a liquid crystal module of Comparative Example 1. As shown in FIG. 24, in a liquid crystal panel 10R of Comparative Example 1, the azimuth angle of an absorption axis 110Ra of a first polarizer 110R was set as 0°, the azimuth angle of an absorption axis 182Ra of a second polarizer 182R was set as 90°, the azimuth angle of an alignment azimuth 130Ra during black display of liquid crystal molecules of a liquid crystal layer 130R was set as 90°, the azimuth angle of a slow axis 140Ra of an in-cell retardation layer 140R was set as 135°, and the azimuth angle of a slow axis 181Ra of an out-cell retardation layer 181R was set as 45°. The out-cell retardation layer 181R and the second polarizer 182R can be combined to function as a circularly polarizing plate 180R. Further, the in-plane retardation of the out-cell retardation layer 181R was set to 140 nm, the NZ coefficient was set to 1.6, the in-plane retardation of the in-cell retardation layer 140R was set to 140 nm, and the NZ coefficient was set to 1.0. As a result of simulation using LCD-Master manufactured by Shintech Co., the maximum transmittance azimuth angle was 115° during black display of the liquid crystal panel of Comparative Example 1 when the polar angle was set to 60°.

(Backlight of Comparative Example 1)

Figure 25:
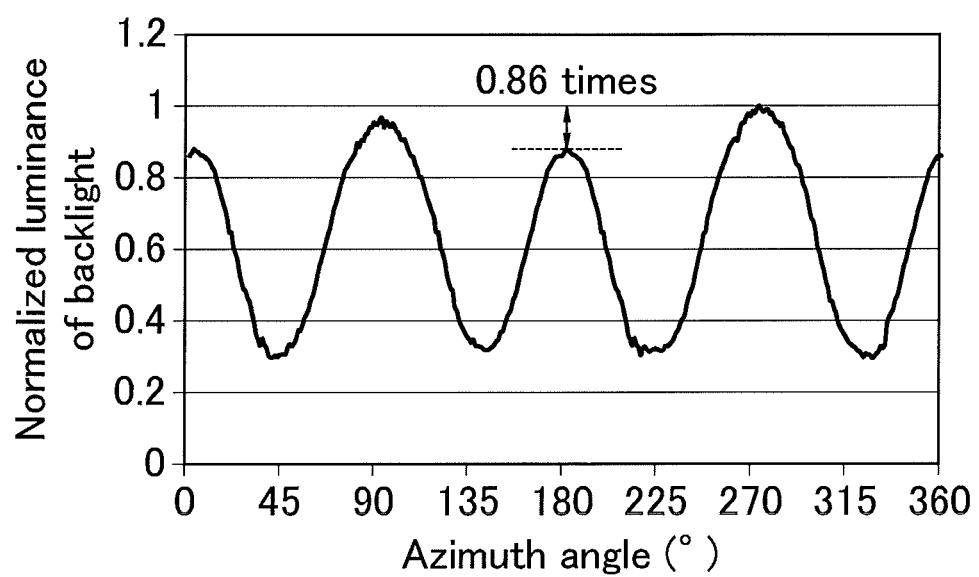
FIG. 25 is a graph showing the result of simulating the normalized luminance of a backlight of the liquid crystal module of Comparative Example 1.

Next, the configuration of the backlight of Comparative Example 1 will be described. FIG. 25 is a graph showing the result of simulating the normalized luminance of the backlight of the liquid crystal module of Comparative Example 1. In Comparative Example 1, the backlight used has a similar configuration to the backlight of each of Examples 1-1 to 1-4 except that the peak luminance ratio is 0.86 times and the normalized luminance curve shown in FIG. 25 is provided.

(Liquid Crystal Module of Comparative Example 1)

The backlight of Comparative Example 1 was arranged on the liquid crystal panel 10R of Comparative Example 1 such that the azimuth angle of the first ridge line of the first prism sheet in the backlight of Comparative Example 1 is 90°, that is, such that the maximum transmittance azimuth of the liquid crystal panel of Comparative Example 1 when the polar angle is set to be 60° is not parallel to the first ridge line of the first prism sheet in the backlight of Comparative Example 1, to obtain the liquid crystal module of Comparative Example 1.

Figure 26A:
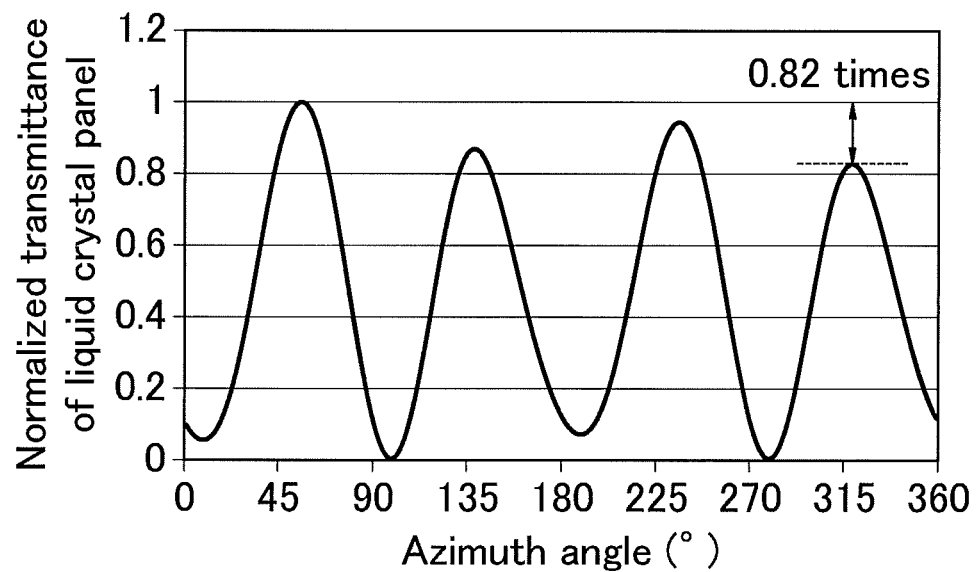
Figure 26B:
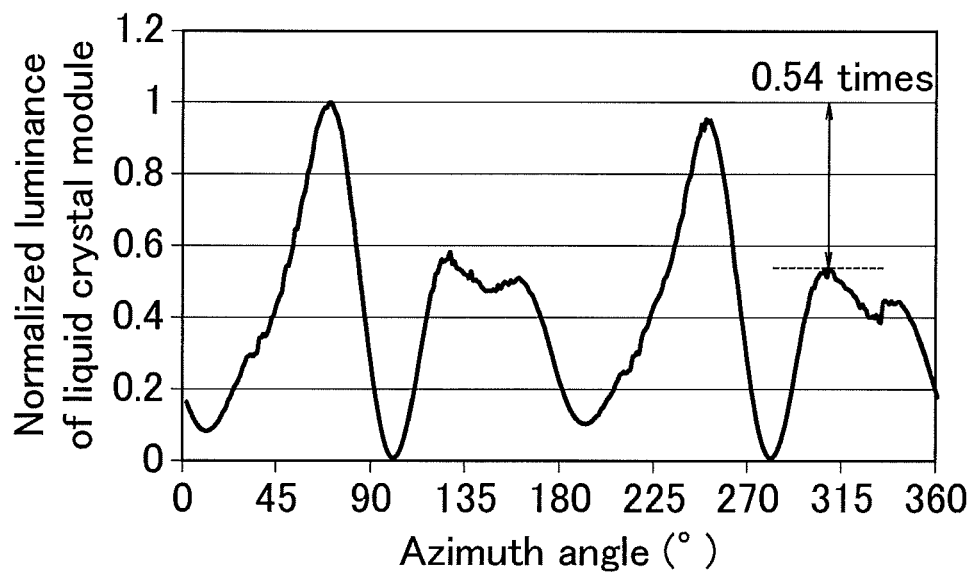

FIGS. 26A and 26B are views relating to the liquid crystal module of Comparative Example 1, in which FIG. 26A is a graph showing the result of simulating the normalized transmittance during black display of the liquid crystal panel, and FIG. 26B is a graph showing the result of simulating the normalized luminance during black display of the liquid crystal module. As shown in FIGS. 26A and 26B, the peak transmittance ratio of the liquid crystal panel 10 of Comparative Example 1 was 0.82 times. On the other hand, the peak luminance ratio was 0.54 times in the liquid crystal module of Comparative Example 1, resulting in an increase in variations in peak luminance that are caused depending on the azimuth angle during black display.

Comparative Example 2

A liquid crystal module of Comparative Example 2 was produced in the same manner as in Comparative Example 1, except for changing the azimuth angle of the slow axis 181Ra of the out-cell retardation layer 181R, the azimuth angle of the slow axis 140Ra of the in-cell retardation layer 140R, and the backlight. Details will be described below. In Comparative Example 2, the absorption axis of the first polarizer was set as the azimuth angle reference (0°).

(Liquid Crystal Panel of Comparative Example 2)

Figure 27:
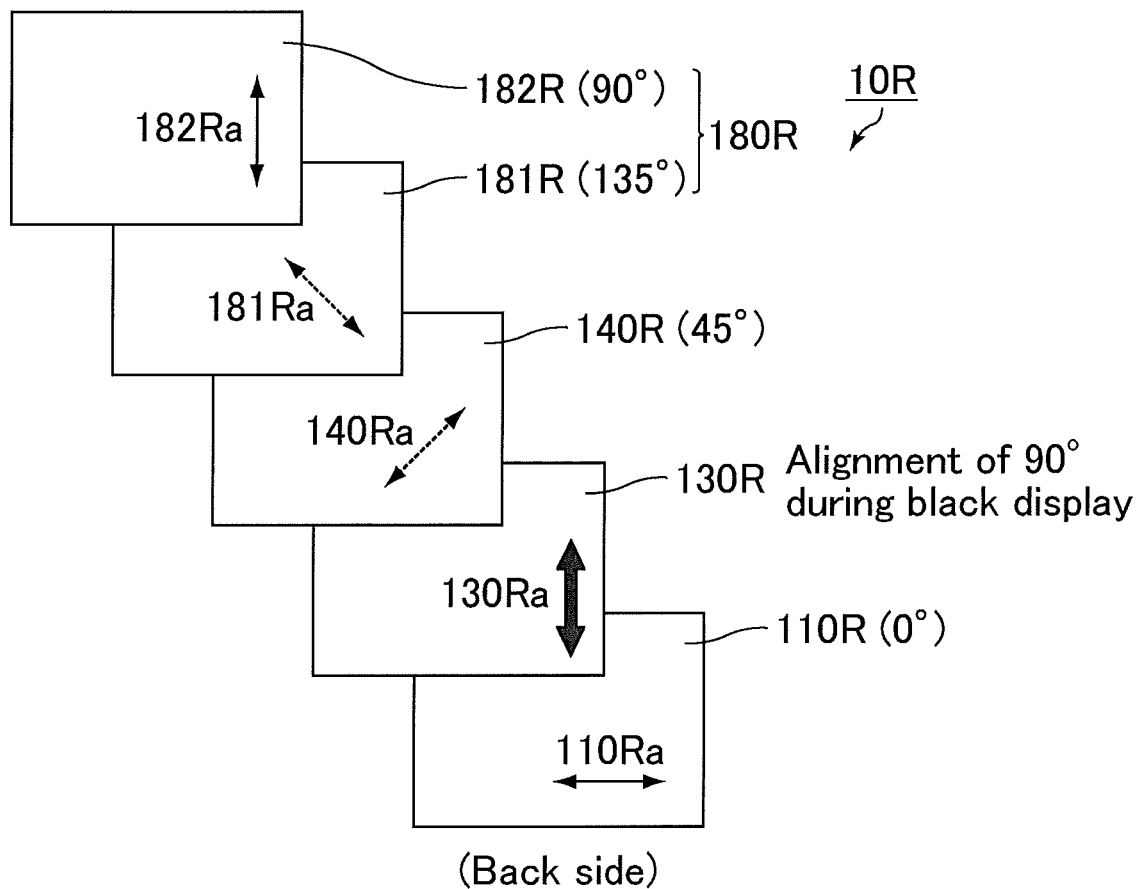
FIG. 27 is a schematic perspective exploded view of a liquid crystal panel of a liquid crystal module of Comparative Example 2.

FIG. 27 is a schematic perspective exploded view of the liquid crystal panel of the liquid crystal module of Comparative Example 2. The liquid crystal panel 10R of Comparative Example 2 was set in the same manner as in the liquid crystal panel 10R of Comparative Example 1, except that the azimuth angle of the slow axis 181Ra of the out-cell retardation layer 181R was set as 135° and the azimuth angle of the slow axis 140Ra of the in-cell retardation layer 140R was set as 45° as shown in FIG. 27. As a result of simulation using LCD-Master manufactured by Shintech Co., the maximum transmittance azimuth angle was 65° during black display of the liquid crystal panel of Comparative Example 2 when the polar angle was set to 60°.

(Backlight of Comparative Example 2)

Figure 28:
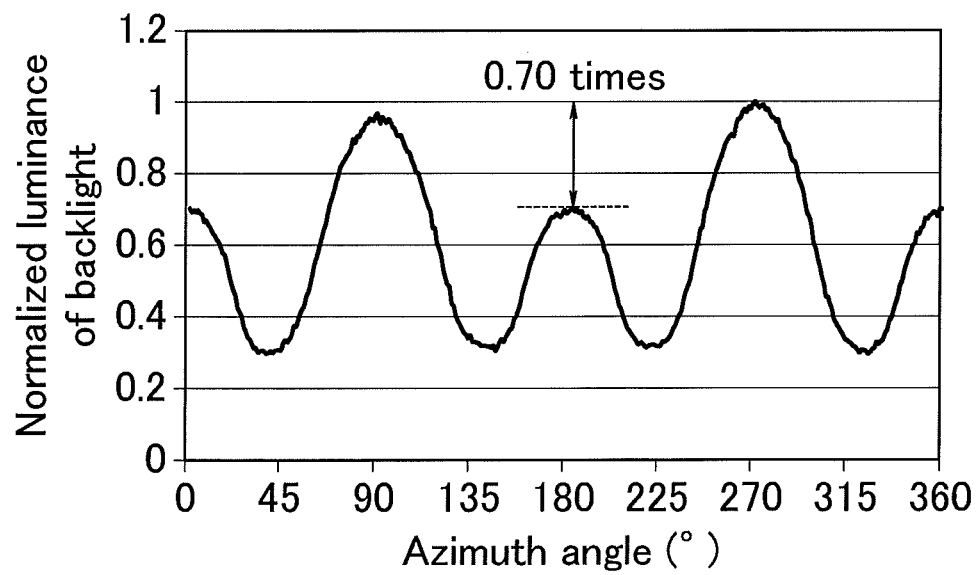
FIG. 28 is a graph showing the result of simulating the normalized luminance of a backlight of the liquid crystal module of Comparative Example 2.

FIG. 28 is a graph showing the result of simulating the normalized luminance of the backlight of the liquid crystal module of Comparative Example 2. In Comparative Example 2, the backlight used has a similar configuration to the backlight of each of Examples 1-1 to 1-4 except that the peak luminance ratio is 0.70 times and the normalized luminance curve shown in FIG. 28 is provided.

(Liquid Crystal Module of Comparative Example 2)

The backlight of Comparative Example 2 was arranged on the liquid crystal panel 10R of Comparative Example 2 such that the azimuth angle of the first ridge line of the first prism sheet in the backlight of Comparative Example 2 is 90°, that is, such that the maximum transmittance azimuth of the liquid crystal panel of Comparative Example 2 when the polar angle is set to be 60° is not parallel to the first ridge line of the first prism sheet in the backlight of Comparative Example 2, to obtain the liquid crystal module of Comparative Example 2.

Figure 29A:
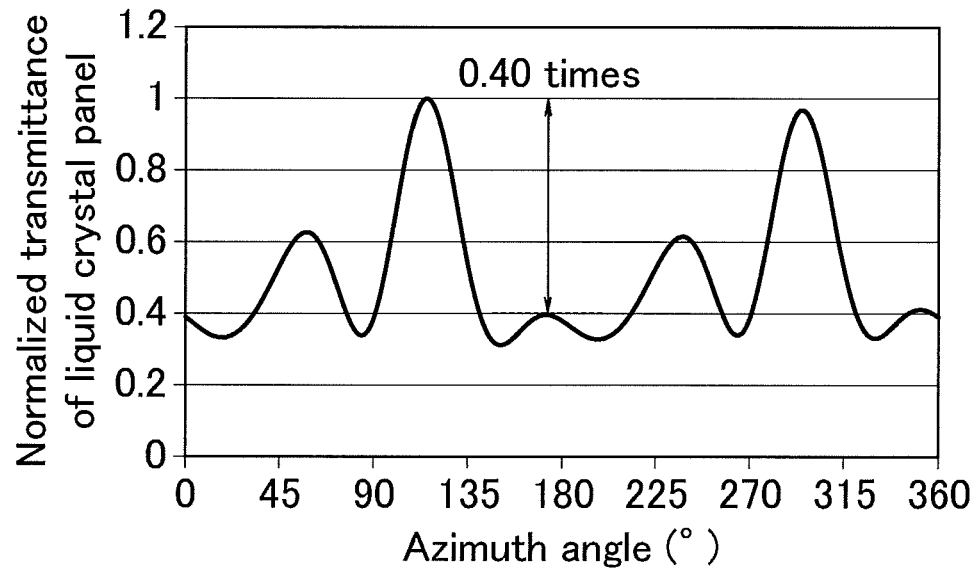
Figure 29B:
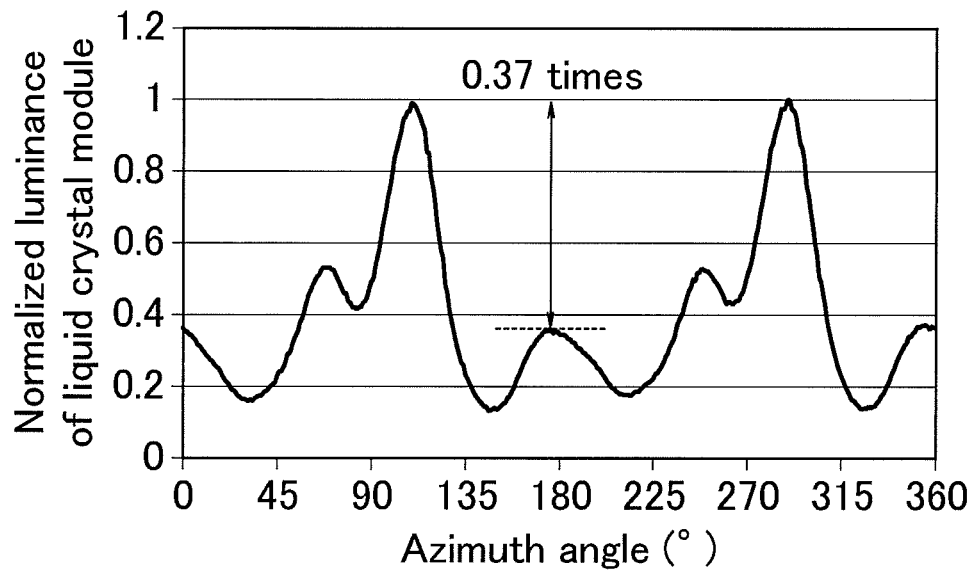

FIGS. 29A and 29B are views relating to the liquid crystal module of Comparative Example 2, in which FIG. 29A is a graph showing the result of simulating the normalized transmittance during black display of the liquid crystal panel, and FIG. 29B is a graph showing the result of simulating the normalized luminance during black display of the liquid crystal module. Table 10 below shows the normalized transmittance of the liquid crystal panel 10R and the normalized luminance of the liquid crystal module at azimuth angles of 0° and 180°, and the ratio (T) of the normalized transmittance (or normalized luminance) at an azimuth angle of 0° to the normalized transmittance (or normalized luminance) at an azimuth angle of 180°.

TABLE 10

|  | Normalized transmittance of liquid crystal panel | Normalized luminance of liquid crystal module |
| --- | --- | --- |
| Azimuth angle 0° | 0.390 | 0.363 |
| Azimuth angle 180° | 0.380 | 0.346 |
| T | 1.026 | 1.049 |

As shown in FIGS. 29A and 29B, the peak transmittance ratio of the liquid crystal panel of Comparative Example 2 was 0.40 times. On the other hand, the peak luminance was 0.37 times in the liquid crystal module of Comparative Example 2 arranged such that the azimuth angle of the first ridge line of the first prism sheet in the backlight of Comparative Example 2 is 90°, that is, such that the maximum transmittance azimuth of the liquid crystal panel of Comparative Example 2 when the polar angle is set to be 60° is not parallel to the first ridge line of the first prism sheet in the backlight of Comparative Example 2. From the above, in Comparative Example 2, the peak luminance ratio of the liquid crystal module is considered not to be improved when the polar angle is large.

As shown in FIGS. 29A and 29B and Table 10, in the liquid crystal panel of Comparative Example 2, the ratio (T) of the normalized transmittance at an azimuth angle of 0° to the normalized transmittance at an azimuth angle of 180° was 1.026. On the other hand, in the liquid crystal module of Comparative Example 2, the ratio (T) of the normalized luminance at an azimuth angle of 0° to the normalized luminance at an azimuth angle of 180° was 1.049. From the above, in the liquid crystal module of Comparative Example 2, the luminance difference in the right-left direction increases, that is, variations in the peak luminance that are caused depending on the azimuth angle in the right-left direction during black display increases, deteriorating the appearance.

Additional Remarks

One aspect of the present invention may be a liquid crystal module 1 including: a liquid crystal panel 10 including a first substrate 120, a second substrate 150 provided on an observation side of the first substrate 120, a liquid crystal layer 130 provided between the first substrate 120 and the second substrate 150, a first polarizer 110 provided on a back side of the first substrate 120, an in-cell retardation layer 140 provided between the second substrate 150 and the liquid crystal layer 130, and a circularly polarizing plate 180 provided on an observation side of the second substrate 150; and a backlight 20 provided on a back side of the liquid crystal panel 10, wherein the circularly polarizing plate 180 includes a second polarizer 182 and an out-cell retardation layer 181 provided between the second substrate 150 and the second polarizer 182; the in-cell retardation layer 140 is a λ/4 plate, and has three principal refractive indexes satisfying a relationship of nx>ny=nz; the out-cell retardation layer 181 is a λ/4 plate, and has three principal refractive indexes satisfying a relationship of nx>ny≥nz; the backlight 20 includes a first prism sheet 210 provided with an uneven portion 211 including a first ridge line 210a, and a second prism sheet 220 provided on a back side from the first prism sheet 210 and provided with an uneven portion 221 including a second ridge line 220a orthogonal to the first ridge line 210a; and the first ridge line 210a is parallel to an azimuth at which the liquid crystal panel 10 has a maximized transmittance in an oblique direction during black display.

Such an aspect allows the azimuth at which the liquid crystal panel 10 has a maximized peak transmittance during black display to be aligned to the azimuth at which the backlight 20 has a minimized peak luminance when the polar angle is large. Therefore, the luminance of the liquid crystal module 1 can be suppressed in the azimuth at which the liquid crystal panel 10 has a maximized transmittance during black display.

Furthermore, when the polar angle is large, the azimuth at which the backlight 20 has a maximized peak luminance can be disposed in a range where the transmittance of the liquid crystal panel 10 during black display is lower than the maximum peak transmittance, and the luminance of the liquid crystal module 1 can be increased in a range where the transmittance of the liquid crystal panel 10 is lower than the maximum transmittance during black display.

This allows mutual compensation for the transmittance of the liquid crystal panel 10 and the luminance of the backlight 20, and the liquid crystal module 1 can be obtained that exhibits variations in peak luminance that are caused depending on the azimuth angle during black display when the polar angle is large, without a negative A plate having problems in manufacturing cost and durability.

The liquid crystal panel 10 may further include a positive C plate 170 between the second substrate 150 and the out-cell retardation layer 181; the circularly polarizing plate 180 may be a left circularly polarizing plate; liquid crystal molecules in the liquid crystal layer 130 during black display may have an alignment azimuth 130a parallel to an absorption axis 110a of the first polarizer 110; and the liquid crystal module with an absorption axis 182a of the second polarizer 182 having an azimuth angle of 0° may satisfy the following Equation 1:

$$10 \times \beta + 35 \leq \alpha \leq 10 \times \beta + 45 \qquad \text{(Equation 1)}$$

wherein α represents an azimuth angle of the first ridge line 210a and β represents an NZ coefficient of the out-cell retardation layer 181. In an embodiment provided with the positive C plate 170 and the left circularly polarizing plate, the maximum transmittance azimuth angle of the liquid crystal panel 10 during black display can be approximated by 10×β+40. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the following equation. This enables suppression of variations in peak luminance that are caused depending on the azimuth angle during black display when the polar angle is large, for the liquid crystal module 1 having the positive C plate and the left circularly polarizing plate.

The liquid crystal panel 10 may further include a positive C plate 170 between the second substrate 150 and the out-cell retardation layer 181; the circularly polarizing plate 180 may be a right circularly polarizing plate; liquid crystal molecules in the liquid crystal layer 130 during black display may have an alignment azimuth 130a parallel to the absorption axis 110a of the first polarizer 110; and the liquid crystal module with an absorption axis 182a of the second polarizer 182 having an azimuth angle of 0° satisfies the following Equation 2:

$$-10 \times \beta + 135 \leq \alpha \leq -10 \times \beta + 145 \qquad \text{(Equation 2)}$$

wherein α represents an azimuth angle of the first ridge line 210a and β represents an NZ coefficient of the out-cell retardation layer 181. In an embodiment provided with the positive C plate 170 and the right circularly polarizing plate, the maximum transmittance azimuth angle of the liquid crystal panel 10 during black display can be approximated by −10×β+140. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the following equation. This enables suppression of variations in peak luminance that are caused depending on the azimuth angle during black display when the polar angle is large, for the liquid crystal module 1 having the positive C plate and the right circularly polarizing plate.

The circularly polarizing plate 180 may be a right circularly polarizing plate; a liquid crystal molecule in the liquid crystal layer 130 during black display may have an alignment azimuth 130a orthogonal to an absorption axis 110a of the first polarizer 110; and when the absorption axis 110a of the first polarizer 110 is at an azimuth angle of 0°, the first ridge line 210a may be at an azimuth angle α of 110° or more and 120° or less. In an embodiment provided with the right circularly polarizing plate, the maximum transmittance azimuth angle of the liquid crystal panel 10 can be 115° during black display. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the above range. This enables suppression of variations in peak luminance that are caused depending on the azimuth angle during black display when the polar angle is large, for the liquid crystal module 1 having the right circularly polarizing plate.

The circularly polarizing plate 180 may be a left circularly polarizing plate; the liquid crystal molecules in the liquid crystal layer 130 during black display may have an alignment azimuth 130a orthogonal to an absorption axis 110a of the first polarizer 110; and when the absorption axis 110a of the first polarizer 110 is at an azimuth angle of 0°, the first ridge line 210a may be at an azimuth angle α of 60° or more and 70° or less. In an embodiment provided with the left circularly polarizing plate, the maximum transmittance azimuth angle of the liquid crystal panel 10 can be 65° during black display. Therefore, the angle formed by the first ridge line 210a of the first prism sheet 210 and the maximum transmittance azimuth of the liquid crystal panel 10 during black display can be brought close to 0° by the azimuth angle α of the first ridge line 210a satisfying the above range. This enables suppression of variations in peak luminance that are caused depending on the azimuth angle during black display when the polar angle is large, for the liquid crystal module 1 having the left circularly polarizing plate.

What is claimed is:

1. A liquid crystal module comprising:
a liquid crystal panel including
a first substrate,
a second substrate provided on an observation side of the first substrate,
a liquid crystal layer provided between the first substrate and the second substrate,
a first polarizer provided on a back side of the first substrate,
an in-cell retardation layer provided between the second substrate and the liquid crystal layer, and
a circularly polarizing plate provided on an observation side of the second substrate; and
a backlight provided on a back side of the liquid crystal panel,
wherein
the circularly polarizing plate includes a second polarizer and an out-cell retardation layer provided between the second substrate and the second polarizer;
the in-cell retardation layer is a λ/4 plate, and has three principal refractive indexes satisfying a relationship of nx>ny=nz;
the out-cell retardation layer is a λ/4 plate, and has three principal refractive indexes satisfying a relationship of nx>ny≥nz;
the backlight includes a first prism sheet provided with an uneven portion including a first ridge line, and a second prism sheet provided on a back side from the first prism sheet and provided with an uneven portion including a second ridge line orthogonal to the first ridge line; and
the first ridge line is parallel to an azimuth at which the liquid crystal panel has a maximized transmittance in an oblique direction during black display.

2. The liquid crystal module according to claim 1,
wherein the liquid crystal panel further includes a positive C plate between the second substrate and the out-cell retardation layer;
the circularly polarizing plate is a left circularly polarizing plate;
a liquid crystal molecule in the liquid crystal layer during black display has an alignment azimuth parallel to an absorption axis of the first polarizer; and
the liquid crystal module with an absorption axis of the second polarizer having an azimuth angle of 0° satisfies the following Equation 1:

$$10\times\beta+35\leq\alpha\leq10\times\beta+45 \qquad \text{(Equation 1)}$$

wherein α represents an azimuth angle of the first ridge line and β represents an NZ coefficient of the out-cell retardation layer.

3. The liquid crystal module according to claim 1,
wherein the liquid crystal panel further includes a positive C plate between the second substrate and the out-cell retardation layer;
the circularly polarizing plate is a right circularly polarizing plate;
a liquid crystal molecule in the liquid crystal layer during black display has an alignment azimuth parallel to an absorption axis of the first polarizer; and
the liquid crystal module with an absorption axis of the second polarizer having an azimuth angle of 0° satisfies the following Equation 2:

$$-10\times\beta+135\leq\alpha\leq-10\times\beta+145 \qquad \text{(Equation 2)}$$

wherein α represents an azimuth angle of the first ridge line and β represents an NZ coefficient of the out-cell retardation layer.

4. The liquid crystal module according to claim 1,
wherein the circularly polarizing plate is a right circularly polarizing plate;
a liquid crystal molecule in the liquid crystal layer during black display has an alignment azimuth orthogonal to an absorption axis of the first polarizer; and
when the absorption axis of the first polarizer is at an azimuth angle of 0°, the first ridge line is at an azimuth angle α of 110° or more and 120° or less.

5. The liquid crystal module according to claim 1,
wherein the circularly polarizing plate is a left circularly polarizing plate;
a liquid crystal molecule in the liquid crystal layer during black display has an alignment azimuth orthogonal to an absorption axis of the first polarizer; and
when the absorption axis of the first polarizer is at an azimuth angle of 0°, the first ridge line is at an azimuth angle α of 60° or more and 70° or less.

* * * * *